(12) United States Patent
Hirano et al.

(10) Patent No.: US 7,506,365 B2
(45) Date of Patent: Mar. 17, 2009

(54) DOCUMENT DISTRIBUTION METHOD AND DOCUMENT MANAGEMENT METHOD

(75) Inventors: Hideyuki Hirano, Kawasaki (JP); Shinji Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 377 days.

(21) Appl. No.: 10/301,784

(22) Filed: Nov. 22, 2002

(65) Prior Publication Data

US 2003/0105950 A1    Jun. 5, 2003

(30) Foreign Application Priority Data

Nov. 27, 2001 (JP) ............................. 2001-361470
Jul. 15, 2002  (JP) ............................. 2002-205669

(51) Int. Cl.
G06F 7/00   (2006.01)
G06F 12/16  (2006.01)
H04L 9/00   (2006.01)
G07F 7/12   (2006.01)

(52) U.S. Cl. ............................. 726/5; 726/17; 713/182; 340/5.86

(58) Field of Classification Search ................ 380/399; 715/513, 900; 726/5, 17; 713/182; 340/5.86
See application file for complete search history.

(56) References Cited

U.S. PATENT DOCUMENTS

| | | | | |
|---|---|---|---|---|
| 5,235,642 | A * | 8/1993 | Wobber et al. | 713/156 |
| 5,787,175 | A * | 7/1998 | Carter | 713/165 |
| 6,044,373 | A * | 3/2000 | Gladney et al. | 707/10 |
| 6,044,378 | A * | 3/2000 | Gladney | 707/103 R |
| 6,141,754 | A * | 10/2000 | Choy | 726/1 |
| 6,236,996 | B1 * | 5/2001 | Bapat et al. | 707/9 |
| 6,381,602 | B1 * | 4/2002 | Shoroff et al. | 707/9 |
| 6,446,093 | B2 * | 9/2002 | Tabuchi | 707/205 |
| 6,606,633 | B1 * | 8/2003 | Tabuchi | 707/102 |
| 6,647,388 | B2 * | 11/2003 | Numao et al. | 707/9 |
| 6,829,368 | B2 * | 12/2004 | Meyer et al. | 382/100 |
| 6,845,383 | B1 * | 1/2005 | Kraenzel et al. | 707/200 |
| 6,937,741 | B1 * | 8/2005 | Miyashita | 382/100 |
| 7,031,954 | B1 * | 4/2006 | Kirsch | 707/3 |

(Continued)

FOREIGN PATENT DOCUMENTS

JP           10-011509           1/1998

(Continued)

*Primary Examiner*—Matthew B Smithers
*Assistant Examiner*—Techane J Gergiso
(74) *Attorney, Agent, or Firm*—Staas & Halsey LLP

(57) ABSTRACT

A document distributing method is proposed using access control information separated into invisible data embedded as an electronic watermark and visible data described in a structured document to achieve prevention of unauthorized alteration of document data, authentication thereof, and prevention of unauthorized access thereto. The method has a step of separating access control information into a first access control information and a second access control information, a step of embedding the first access control information into administrative information-enclosing data, a step of setting an administrative identifier for making the administrative information-enclosing data in which the first access control information has been embedded be an information item in the document data, and a step of enclosing, in the administrative identifier, information content of the administrative information-enclosing data and the second access control information for creating the access control information for accessing the document data together with the first access control information.

10 Claims, 68 Drawing Sheets

U.S. PATENT DOCUMENTS

| | | | |
|---|---|---|---|
| 2001/0042075 A1* | 11/2001 | Tabuchi | 707/500 |
| 2001/0056421 A1* | 12/2001 | Tada et al. | 707/9 |
| 2003/0084027 A1* | 5/2003 | Brandin et al. | 707/3 |
| 2003/0084171 A1* | 5/2003 | de Jong et al. | 709/229 |

FOREIGN PATENT DOCUMENTS

| | | |
|---|---|---|
| JP | 2000-076360 | 3/2000 |
| JP | 2000-078125 | 3/2000 |
| JP | 2000-138671 | 5/2000 |
| JP | 2000-331077 | 11/2000 |
| JP | 2000-331088 | 11/2000 |
| JP | 2001-134180 | 5/2001 |

* cited by examiner

|  | Range of unauthorized alteration detection (tag sp1) | Type of info. recorded in image (tag sp2) | Type of algorithm of encryption/ authentication/ signature (tag sp3) | Image info. sp access policy (tag sp4) |
|---|---|---|---|---|
| Tag element content 1 | All tags | Signature, Authentication info., Encryption key, Configuration | Elliptic curve cryptosystem/ Public key | +R+Today (read, only today) |
| Tag element content 2 | Tag 1, Tag 2 | Signature, Parameter Channel | Triple DES/ Common key (password) | +R+Forever (read, any day) |

*Fig. 6*

|  | Range of unauthorized alteration detection (attribute1) | Type of info. recorded in image (attribute2) | Type of algorithm of encryption/ authentication/ signature (attribute3) | Image info. sp access policy (tag sp4) |
|---|---|---|---|---|
| Attribute content 1 | All tags | Signature, Authentication info., Encryption key, | Elliptic curve cryptosystem/ Public key | +R+Today (read, only today) |
| Attribute content 2 | Tag 1, Tag 2 | Signature, | Triple DES/ Common key (password) | +R+Forever (read, any day) |

*Fig. 7*

| Tag/Attribute Name | Function | Example of Description<br>〈tag name〉 attribute=attribute value |
|---|---|---|
| Watermark Control | Parameter related to watermark processing | 〈watermark control〉attribute=EMBED〈/watermark control〉<br>(watermark embedding) |
| Watermark Control | Parameter related to watermark processing | 〈watermark control〉attribute=1-S0〈/watermark control〉<br>(watermark type 1: strong attack resistance mode) |
| Invisible Info.-Embedded Data Name | Name of target file of watermark-embedding/extracting | 〈watermark target name〉Content1.jpg〈/watermark target name〉 |
| Parameter*2 | Operating condition of enclosed object (control program) | 〈parameter〉program attribute=a |
| Parameter*2 | Designation of enclosed object (encrypted image) | 〈parameter〉image |
| Configuration*1 | Type of data enclosure | 〈configuration〉data enclosure (1)〈/configuration〉<br>*format by data format (another example of description)<br>〈tag1〉configuration attribute=data enclosure (1)〈/tag1〉 |

Fig. 8

| Expiration | Remaining number of times of access | User Attribute | Process Permission |
|---|---|---|---|
| ~YY.MM.DD | Count down | Single access (+S) | Read only (+R) |
| ~Forever | | Group access (+G) | Rewrite permitted (+W) |
| Today(only today) | | | Addition permitted (+A) |

Fig. 18

| Identifying info./ Channel info. | Channel (From) | Channel 1 (Through) | Channel 2 (Through) | Channel (To) |
|---|---|---|---|---|
| URL info. | URL1 | URL2 | URL3 | URL4 |
| MAC info. | MAC address 1 | MAC address 2 | MAC address 3 | MAC address 4 |
| Terminal info. | Terminal identifying info. 1 | Terminal identifying info. 2 | Terminal identifying info. 3 | Terminal identifying info. 4 |

*Fig. 21*

| | visual authentication |
|---|---|
| Facial image (Photograph, Illustration) | |
| Handwritten signature, Signature (Turned into image) | visual authentication |
| Fingerprint image | |

Fig. 26

| Data Format | Info. Type |
|---|---|
| Characteristic info. of whole data (0) | Signature (hash value), timestamp |
| Characteristic info. of data (1) | Signature (hash value), timestamp |
| Access policy for data (1) | User name, time period, read/write |
| Characteristic info. of data (2) | Signature (Hash Value), partial character, timestamp |
| Access policy for data (2) | User name, time period, read/write, owner ID, contact detail, URL, expiration date, number of times access permitted |
| Program | Java program etc. |

Fig. 40

| | |
|---|---|
| Type1 | Signature info. turned into watermark (data 1X) |
| Type2 | Signature info. and encryption key turned into watermark (data 1X)<br>Signature/encryption target info. data recorded in extension portion (data 2X) |
| Type3 | Signature info. turned into watermark (data 1X)<br>Encryption key and signature/encryption target info. data recorded in extension portion (data 2X) |
| Type4 | Encryption key turned into watermark (data 1X)<br>Signature info. and signature/encryption target info. data recorded in extension portion (data 2X) |

Input data (signature info. for text portion and image portion, encryption key for text portion, signature /encryption range

Fig. 47

| Administrative info. submitted by author A | | | Administrative info. created by administrator | |
|---|---|---|---|---|
| Document name | Control info. | Amount billed | User log (User name, Date, Time) | Popularity rank |
| Doc1 | Access policy | 100 yen | A,2001.8.20,1 | 1 |
| Doc2 | Access policy | 20 yen | B,2001.8.21,2 | 2 |

Fig. 52

Example of XML code (demo.xml)

```
<?xml version="1.0"?>
<?xml-stylesheet type="text/xsl"href="demo.xsl"?>
<xmldocument>
    <open1>The secret will show as below </open1>
    <security authenticate="password"info_type="secret,authentication"> ****** </security>   (1)
    <security wm_verification="2001.8.30"a_encrypted="DES"></security>                        (2)
    <mark_filewm_in="t0"security_method="invisible_watermark_f">mark.gif </mark_file>          (3)
</xmldocument>
```

Fig. 55

Example of style sheet (demo.xsl)

```
<?xml version="1.0"?>
<xsl:stylesheet xmlns:xsl="http://www.w3.org/TR/WD-xsl">
<xsl:template match="/">
<html>
    <body>
        <xsl:apply-templates select="xmldocument"/>
    </body>
</html>
</xsl:template>
<xsl:template match="xmldocument">
<xsl:value-of select="open1"/>
<xsl:value-of select="security"/>
<img>
    <xsl:attribute name="src">
        <xsl:value-of select="mark_file"/>
    </xsl:attribute>
</img>
</xsl:template>
</xsl:stylesheet>
```

Fig. 56

```
<?xml version="1.0"?>
<?xml-stylesheet type="text/xsl" href="demo.xsl"?>
<xmldocument>
    <open1>The secret will show as below </open1>
    <security authenticate="password"info_type="secret,authentication,sign"> ****** </security>
    <security wm_verification="2001.8.30"a_encrypted="DES"></security>
    <mark_file wm_in="t0"security_method="invisible_watermark_f">mark.gif </mark_file>
    <security sign_target="all"></security>    (4)
</xmldocument>
```

*Fig. 60*

```
<?xml version="1.0"?>
<?xml-stylesheet type="text/xsl" href="demo.xsl"?>
<xmldocument>
  <open1>The visible will show as below </open1>
  <security authenticate="password" wm_remove="@password"></security>   (5)
  <security wm_verification="2001.8.30" a_encrypted="DES"></security>
  <mark_file v_wm="FJ" security_method="visible_watermark_f">mark.gif </mark_file>   (6)
</xmldocument>
```

*Fig. 64*

DOCUMENT DISTRIBUTION METHOD AND DOCUMENT MANAGEMENT METHOD

BACKGROUND OF THE INVENTION

1. Field of the Invention

The present invention relates to methods of distributing document data containing such data as image data and music data, apparatus for creating the document data, apparatus for accessing the document data, and programs thereof. The invention also relates to methods of managing the documents, apparatus for managing the documents, and programs thereof.

2. Description of Related Art

Electronic signature is known as a technique that can certify authenticity of document data containing digitized data such as image data and music data.

For example, a hash value of digitized data is computed and is then encrypted using a private key to produce an electronic signature, and the digitized data are distributed with the electronic signature appended thereto. A user who receives the distributed digitized data decrypts the electronic signature using a public key encryption and at the same time computes a hash value of the digitized data, and by verifying if they match or not, the user can authenticate the received digitized data.

With this technique, unauthorized alteration to distributed document data can be detected, and unauthorized data distribution can thus be prevented.

The encrypted data that are appended as an electronic signature are, however, visible data, and there is a possibility that they may be deciphered if a plurality of such data are analyzed through algorithmic analysis.

Another technique has been suggested in which an encryption key or the like is embedded as an invisible electronic watermark into image data that constitute the document data. However, in order to extract the electronic watermark from the document data to perform access control, a device equipped with a special application program is necessary.

The present invention proposes a document distribution method that achieves combined functions of concealing or hiding of, preventing unauthorized alteration of, authenticating of, and preventing unauthorized access to document data by using access control information that is separated into invisible data that are embedded as an electronic watermark in digitized data and visible data that are described in a structured text.

BRIEF SUMMARY OF THE INVENTION

The foregoing and other objects are accomplished in accordance with a first aspect of the present invention by providing a method of distributing a structured document in which identifiers are respectively set for a plurality of information items in document data made of digitized data including text data, image data, music data, and/or other digitized data, and information content of each information item is enclosed in each respective identifier, the method comprising: (A) a step of creating access control information necessary to access the document data and separating the access control information into a first access control information and a second access control information, the first access control information and the second access control information complimentarily constituting the access control information; (B) a step of specifying given data as administrative information-enclosing data and embedding the first access control information into the administrative information-enclosing data; (C) a step of setting an administrative identifier for making the administrative information-enclosing data in which the first access control information is embedded be an information item in the document data; and (D) a step of enclosing, in the administrative identifier, information content of the administrative information-enclosing data in which the first access control information is embedded, and the second access control information for extracting the first access control information from the administrative information-enclosing data to create the access control information for accessing the document data together with the first access control information.

Preferably, the administrative information-enclosing data comprises digitized data including image data or music data, and in the step (B), the first access control information is embedded as visually or auditorily unrecognizable watermark data into the administrative information-enclosing data.

Alternatively, the administrative information-enclosing data comprises digitized data including image data or music data, and in the step (B), the first access control information is embedded as visually or auditorily recognizable watermark data into the administrative information enclosing data.

Preferably, the administrative information-enclosing data has a first data portion and a second data portion, each portion comprising digitized data such as image data or music data; and in the step (B), encrypted access control information in which the first access control information has been encrypted is created and enclosed in the second data portion, and an encryption key information used to create the encrypted access control information is embedded as visually or auditorily unrecognizable watermark data into the first data portion.

Preferably, the second access control information comprises at least one of range-specifying information specifying the range of unauthorized alteration prevention in the document data, data type-indicating information indicating the type of the digitized data in which the watermark data have been embedded, control type-indicating information indicating the type of information of the first access control information, access policy information for digitized data contained in the document data, watermark control information used when converting the first access control information into a watermark data, and a data name of the first access control information.

Preferably, the first access control information includes at least one of image data, music data, encryption/authentication/signature-related data, and a control program, and has a file format of image data or music data.

Preferably, the above-described method of distributing a document further comprises a step of creating duplicate information by duplicating the information content enclosed in the administrative identifier and embedding the duplicate information as an electronic watermark into the administrative information-enclosing data.

Preferably, digitized data contained in a predetermined range of the digitized data in the document data are extracted as secret information, digitized data in which the secret information is replaced with other information for display are assigned as the administrative information-enclosing data, and the secret information is enclosed in the administrative information-enclosing data.

Preferably, the secret information is embedded as visually or auditorily unrecognizable watermark data into the administrative information-enclosing data.

Preferably, the secret information is encrypted and is then enclosed in the administrative information-enclosing data.

Preferably, in the above-described method, a signature value is computed of digitized data within a predetermined range of the digitized data in the document data, and the signature value is enclosed in the administrative information-enclosing data.

The present invention also provides an apparatus for creating data of a structured document in which identifiers are respectively set for a plurality of information items in document data made of digitized data including text data, image data, music data, and/or other digitized data, and information content of each information item is enclosed in each respective identifier, the apparatus comprising: an access control information-creating means for creating access control information necessary to access the document data; a first administrative information-enclosing means for specifying given data as administrative information-enclosing data and enclosing a first access control information that constitutes a portion of the access control information in the administrative information-enclosing data; a document structure-creating means for setting identifiers respectively for information items of the digitized data contained in the document data and enclosing information content of each information item in each respective identifier; and a second administrative information-enclosing means for setting an administrative identifier for making the administrative information-enclosing data be an information item in the document data, and enclosing as an information content of the administrative identifier a second access control information that complimentarily constitutes the access control information together with the first access control information.

The present invention also provides an apparatus for accessing data of a structured document in which identifiers are respectively set for a plurality of information items in document data made of digitized data including text data, image data, music data, and/or other digitized data, and information content of each information item is enclosed in each respective identifier, the apparatus comprising: a document parsing means for parsing document structure distributed document data; a second access control information-extracting means for extracting a second access control information from an administrative identifier contained in the document data; and a document data-accessing means for allowing access to the document data based on the second access control information and a first control information enclosed in administrative information-enclosing data contained in the document data.

The present invention also provides a computer executable program for executing a method of distributing a structured document in which identifiers are respectively set for a plurality of information items in document data made of digitized data including text data, image data, music data, and/or other digitized data, and information content of each information item is enclosed in each respective identifier, comprising: (A) a step of creating access control information necessary to access the document data and separating the access control information into a first access control information and a second access control information, the first access control information and the second access control information complimentarily constituting the access control information; (B) a step of specifying given data as administrative information-enclosing data and embedding the first access control information into the administrative information-enclosing data; (C) a step of setting an administrative identifier for making the administrative information-enclosing data in which the first access control information is embedded be an information item in the document data; and (D) a step of enclosing, in the administrative identifier, information content of the administrative information-enclosing data in which the first access control information is embedded, and the second access control information for extracting the first access control information from the administrative information-enclosing data to create the access control information for accessing the document data together with the first access control information.

The present invention also provides a method of managing a document comprising: (A) a step of acquiring as digitized data information in which access control information is embedded as visually or auditorily unrecognizable watermark data; (B) a step of extracting the access control information from the digitized data; (C) a step of acquiring document information of the document data made of at least one of specific text data, image data, music data, and other digitized data that correspond to the access control information; and (D) a step of creating a structured document in which identifiers are respectively set for a plurality of information items in the document information and information content of each information item is enclosed in each respective identifier.

The present invention also provides a document management apparatus comprising: a data acquiring means for acquiring as digitized data information in which access control information is embedded as visually or auditorily unrecognizable watermark data; an access control information-extracting means for extracting the access control information from the digitized data acquired by the data acquiring means; a document information acquiring means for acquiring document information of the document data made of at least one of specific text data, image data, music data, and other digitized data that correspond to the access control information extracted from the access control information-extracting means; and a structure text-creating means for creating a structured document in which identifiers are respectively set for a plurality of information items in the document information acquired by the document information acquiring means and information content of each information item is enclosed in each respective identifier.

Preferably, the data acquiring means acquires digitized data of the image in which access control information is embedded as visually unrecognizable watermark, the digitized data having been converted by a digital camera or an image scanner.

Preferably, the access control information is a link address in a website that is accessible via the Internet.

The present embodiment further provides a computer executable program for executing a document management method comprising: (A) a step of acquiring as digitized data information in which access control information is embedded as visually or auditorily unrecognizable watermark data; (B) a step of extracting the access control information from the digitized data; (C) a step of acquiring document information of the document data made of at least one of specific text data, image data, music data, and other digitized data that correspond to the access control information; and (D) a step of creating a structured document in which identifiers are respectively set for a plurality of information items in the document information and information content of each information item is enclosed in each respective identifier.

According to the present invention, access control information, which is necessary to access document data, is separated into a first access control information and a second access control information, and one of them is embedded in digitized data whereas the other is enclosed in a structured document. This makes it possible to reliably carry out unauthorized alteration detection, certify authenticity, and perform access control such as control of access policy and user authentication.

From the following detailed description in conjunction with the accompanying drawings, the foregoing and other objects, features, aspects and advantages of the present invention will become readily apparent to those skilled in the art.

BRIEF DESCRIPTION OF THE DRAWINGS

FIG. 6 illustrates types of information enclosed as elements of the tag sp;

FIG. 7 illustrates types of information enclosed as attributes of the tag sp;

FIG. 8 illustrates formats of data enclosed as elements or attributes of the tag sp;

FIG. 18 illustrates types of access policies;

FIG. 21 is a flowchart depicting types of routing information;

FIG. 26 illustrates types of image data used for encrypted images;

FIG. 40 illustrates information types of data enclosed in the image information sp;

FIG. 47 illustrates types of image data to be enclosed in image information sp;

FIG. 52 illustrates administrative information used in an information publishing system;

FIG. 55 illustrates an example of tag sp to be described in an XML document;

FIG. 56 illustrates an example of the XSL style sheets;

FIG. 60 illustrates an example of tag sp to be described in an XML document;

FIG. 64 illustrates an example of tag sp to be described in an XML document;

DETAILED DESCRIPTION OF THE PREFERRED EMBODIMENTS

Preferred embodiments of the present invention are described below.

Document Data-creating Apparatus

Figure 1:
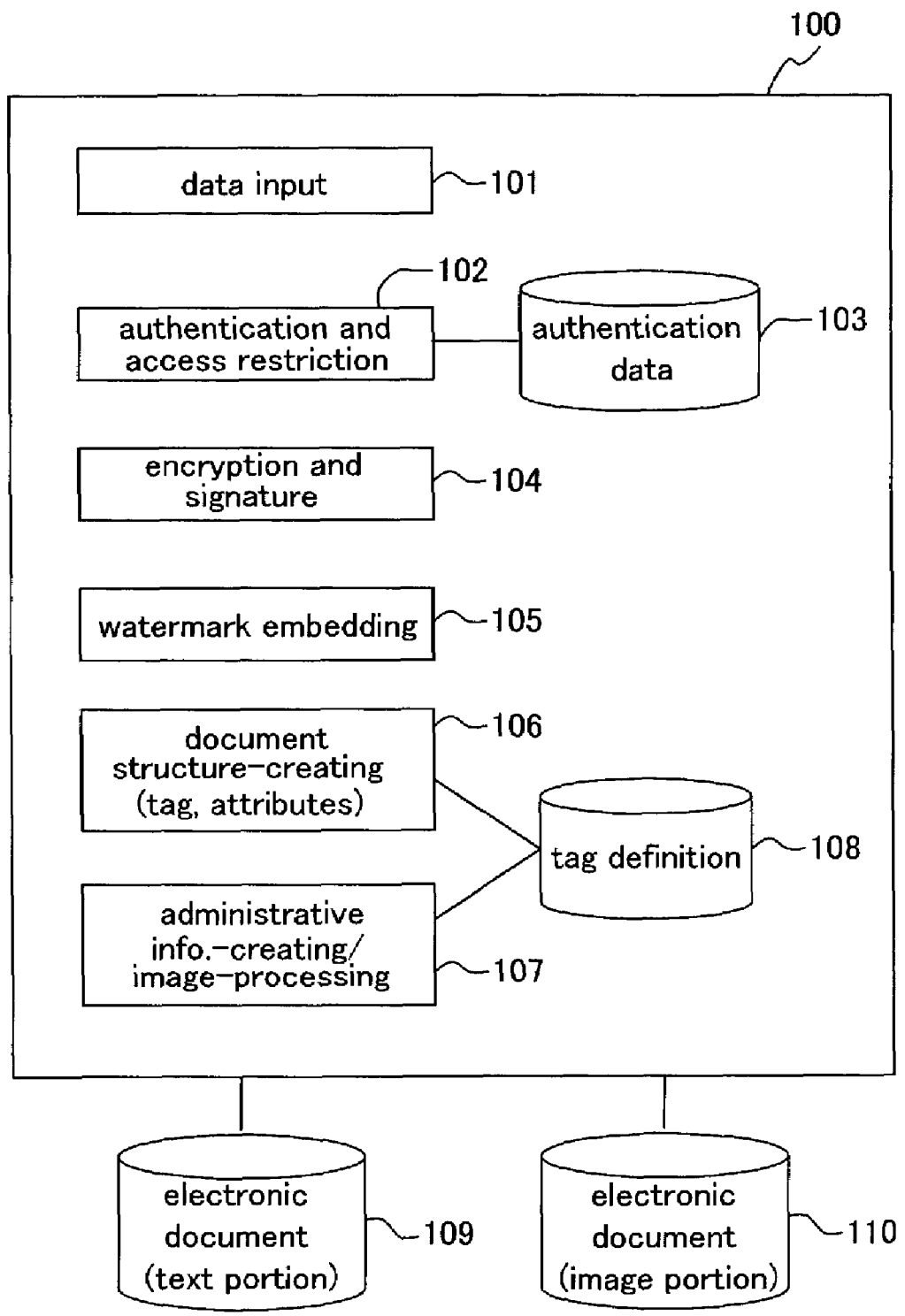
FIG. 1 is a functional block diagram of a data creating apparatus.

A publisher side that distributes document data produces a structured document using a document data-creating apparatus 100 as shown in FIG. 1.

The document data-creating apparatus 100 has a data input section 101, an authentication and access-restriction section 102. The data input section 101 is for inputting various data. The authentication and access-restriction section 102 manages authentication data and access control data and updates the content of an authentication data-managing database 103. The document data-creating apparatus 100 also has an encryption and signature section 104 and a watermark-embedding section 105. The encryption and signature section 104 encrypts data and creates signature data. The watermark embedding section 105 is for creating visible or invisible electronic watermark data and embedding them into digitized data. The document data-creating apparatus 100 further has a document structure-creating section 106 and an administrative information-creating/image-processing section 107. The document structure-creating section 106 is for creating a document structure in a structured document such as XML and HTML, and the administrative information-creating/image-processing section 107 is for creating administrative information and processing image data.

The document data creating apparatus 100 retrieves digitized data from an electronic document database 109 in which text data are organized and an electronic document database 110 in which image data are organized, and creates authentication data such as authentication information and access restriction information based on various data input from the data input section 101 to create access control information for the document data.

A portion of the access control information that is the first access control information is encrypted by the encryption-signature section 104 as needed, is converted into invisible electronic watermark data by the watermark-embedding section 105, and is then embedded into image data obtained from the electronic document database 110.

For the text data obtained from an electronic document database 109 and the image data obtained from the electronic document database 110, tags are respectively set for information items in accordance with, for example, XML format and HTML format, and their information contents are enclosed as elements or attributes of the tags. The tag definition information of these tags is stored in a tag definition database 108.

At the same time, control information that is second access control information that complimentarily constitutes the access control information together with the first access control information is created by the administrative information-generating/image-processing section 107 based on the invisible electronic watermark data embedded in image data by the watermark embedding section 105. For the second access control information, a tag in accordance with a structured document such as the XML format and the HTML format is set, and the information content is enclosed as an element or attribute of the tag. In this case as well, the tag definition information of these tags is stored in the tag definition database 108.

Document Data-accessing Apparatus

Figure 2:
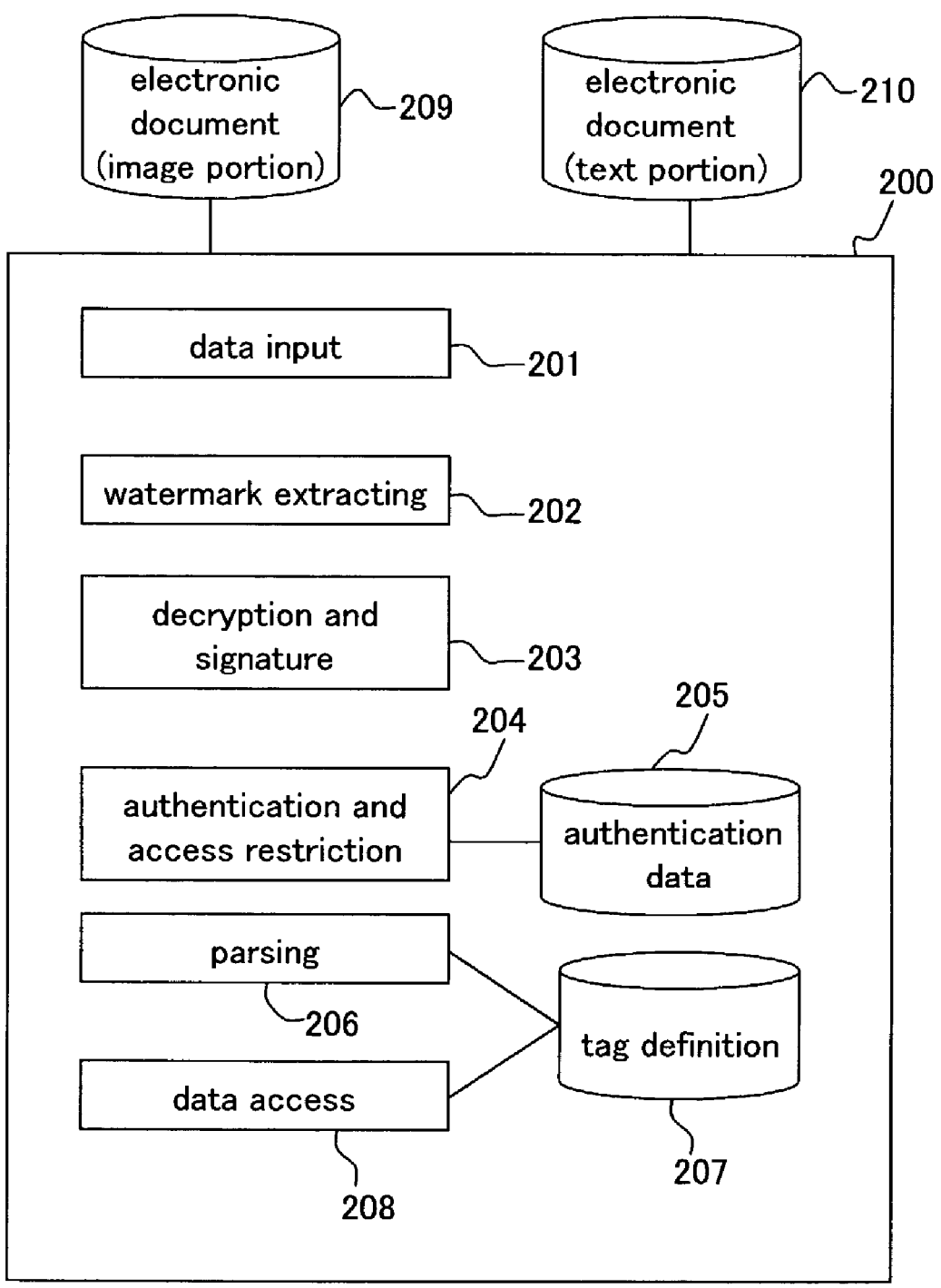
FIG. 2 is a functional block diagram of a data accessing apparatus.

FIG. 2 shows the schematic configuration of a document data-accessing apparatus that is necessary for a user to access document data that have been distributed.

A document data-accessing apparatus 200 comprises a data input section 201, a watermark-extracting section 202, a decrypting and signature-processing section 203, an authentication and access control-managing section 204, a document parsing section 206, a data access section 208, and so forth. The data input section 201 is for inputting various data. The watermark extracting section 202 is for extracting watermarks that are embedded in digitized data of the document data. The decrypting and signature-processing section 203 is for decrypting encrypted data and signature if they exist in the document data, and restoring signature data. The authentication and access control-managing section 204 analyzes authentication information and access restriction information and stores them in an authentication data-managing database 205. The document parsing section 206 parses distributed document data and encloses the results in a tag definition-managing database 207. The data access section 208 allows the user to access the document data.

Structured Document

Figure 3:
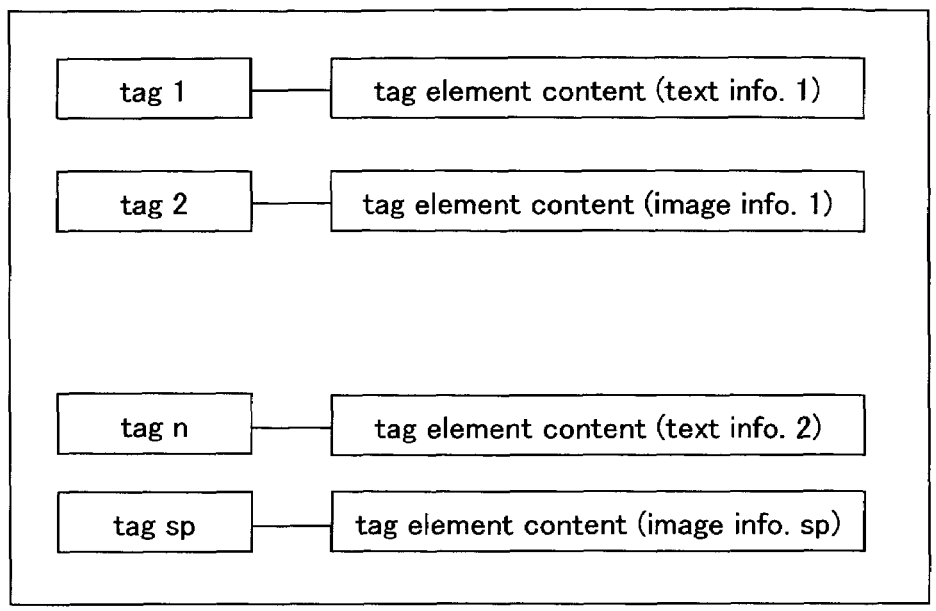
FIG. 3 illustrates a structured document.

A structured document as shown in FIG. 3 is created according to the tags defined by the document structure-creating section 106 and the administrative information-creating/image-processing section 107.

Text information 1, image information 1, . . . and text information 2, which are selected as information items in the document data, are given respective identifiers tag 1, tag 2, . . . tag n, and each information content is enclosed as an element in each of the tags.

If image information sp is specified as administrative information-enclosing data, a tag sp is set for designating it as an information item in the document data, and the information content is enclosed as an element of the tag sp.

It is also possible that the information contents, enclosed as the elements of the tag 1 to the tag n and the tag sp, are enclosed as the attributes of the respective tags.

Figure 4:
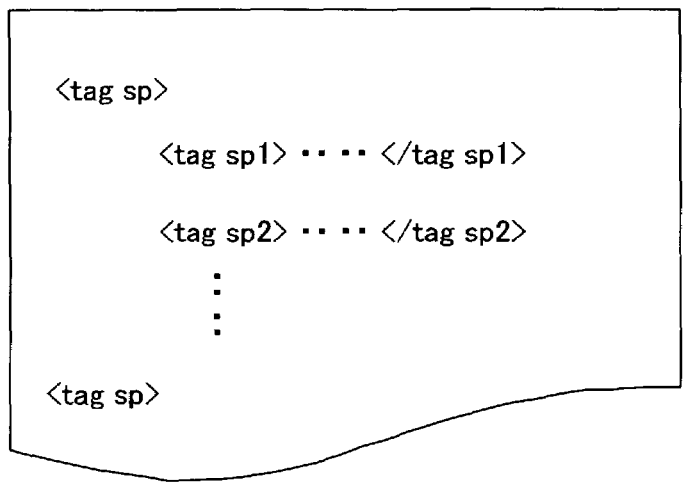
FIG. 4 illustrates the structure of a tag sp.
Figure 5:
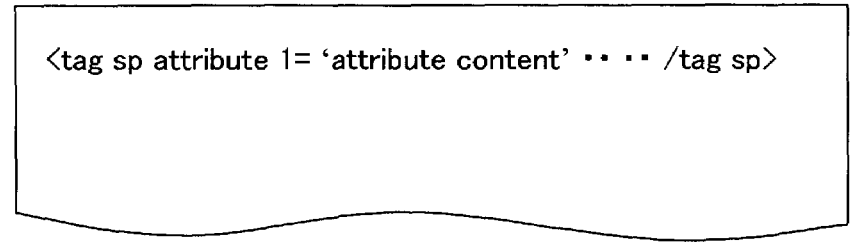
FIG. 5 illustrates the structure of the tag sp.

The tag sp may have a hierarchical structure having a plurality of subordinate tags according to the information contents to be enclosed; for example, it may have a structure in which a plurality of subordinate tags sp1, sp2, . . . etc. are included at a lower level of the tag sp, as shown in FIG. 4. In addition, the tag sp may have a structure provided with a plurality of attributes; it may have a structure including attribute 1, attribute 2, . . . and so on, which are the attributes of the tag sp, as shown in FIG. 5.

When the tag sp is configured to include a plurality of tags as shown in FIG. 4, elements in each of the tags can be set as shown in FIG. 6. In this case, tag sp1 specifies the target range of unauthorized alteration detection, tag sp2 specifies the information types recorded in the image, tag sp3 specifies the algorithm type of encryption/authentication/signature, and tag sp 4 specifies the access policy for the image information sp.

Regarding the target range of unauthorized alteration detection, which is specified in the tag sp1, by designating a tag that are set for each respective information item in the document data, the information content of the tag can be designated as the target range of unauthorized alteration detection. For example, tag element content 1 of FIG. 6 designates all the tags as the target range of unauthorized alteration detection, whereas tag element content 2 designates only the tag 1 and the tag 2 as the target range of unauthorized alteration detection.

The information type recorded in the image, which is specified in the tag sp2, indicates the types of the first access control information embedded as an electronic watermark, and it specifies that the information is which one of signature data, authentication data, encryption key, or other information type. It is also possible to configure the tag sp2 to enclose the configuration of the first access control information, the specification of parameter, and the route information indicating the distribution route of the document data, and so forth.

The information about algorithm type of encryption/authentication/signature, which is enclosed in the tag sp3, can be configured to enclose the type of the encryption key when the first access control information embedded as an invisible electronic watermark is encrypted, an algorithm regarding the authentication method of the authentication information, an algorithm regarding the authentication method of the signature information, and so forth.

The access policy for the image information sp, which is enclosed in the tag sp4, can be configured to specify the information about the restriction of access permission. Various settings are possible as shown in FIG. 6, such that browsing is permitted only today, or browsing is permitted irrespective of the date.

The settings of the tags sp1 to sp4 are not limited to those shown in the figure, and many other configurations are possible; for example, it is possible to set five tags or more, or it is possible to set three tags or less. It is also possible that more than one attributes are contained in a tag.

When the tag sp is configured so as to have a plurality of attributes as shown in FIG. 5, the attributes can be set as shown in FIG. 7. In this case, attribute 1 specifies the target range of unauthorized alteration detection, attribute 2 specifies the information type recorded in the image, attribute 3 specifies the algorithm type of encryption/authentication/signature, and attribute 4 specifies the access policy for the image information sp. The data specified in the attributes 1 to 4 are similar to those specified in the plurality of tags sp1 to sp4, so the detailed explanation is not given here.

The tag names of each tag may be the tag names shown in FIG. 8 when a plurality of tags, tag sp1, tag sp2, . . . etc. are designated at a lower level of the tag sp. The attribute names of each attribute may be the attribute names shown in FIG. 8 when the tag sp has a plurality of attributes, attribute 1, attribute 2, . . . etc.

For example, when a parameter related to watermark processing is described, the tag name can be <watermark control>. As shown in FIG. 8, when the watermark control information of the first access control information is "embed watermark", the description can be as follows:
    <watermark control> attribute=EMBED </watermark control>.

When the watermark control information of the first access control information is "watermark type 1: strong attack-resistance mode", the description can be as follows:
    <watermark control> attribute=1-S0 </watermark control>.

When these watermark controls are described as an attribute of the tag sp, the description can be as follows:
    <tag sp watermark control='EMBED' /tag sp>, and
    <tag sp watermark control='1-S0' /tag sp>.

When the name of the data in which invisible watermark data is embedded is described as an element of the tag, the tag is named <watermark target name> and "the name of the target file of watermark-embedding/extracting" is described as the element thereof. For instance, in the example shown in FIG. 8, the following description indicates that watermark data are embedded in the image data "Content1.jgp":
    <watermark target name>Content1.jgp</watermark target name>.

Likewise, when this description is described as an attribute of the tag sp, it can be as follows:
    <tag sp watermark target name='Content1.jpg' /tag sp>.

A tag <parameter> can be provided when a parameter is set to specify an operating condition of the enclosed object that is enclosed as the first access control information (parameter of the control program), a specification of the enclosed object (specification of the encrypted image), or the like. For example, as shown in FIG. 8, the description can be as follows:
    <parameter> program name attribute=a and
    <parameter> image file name .

When such parameters are designated as attributes of the tag sp, the attributes may be named "parameter".

Figure 9:
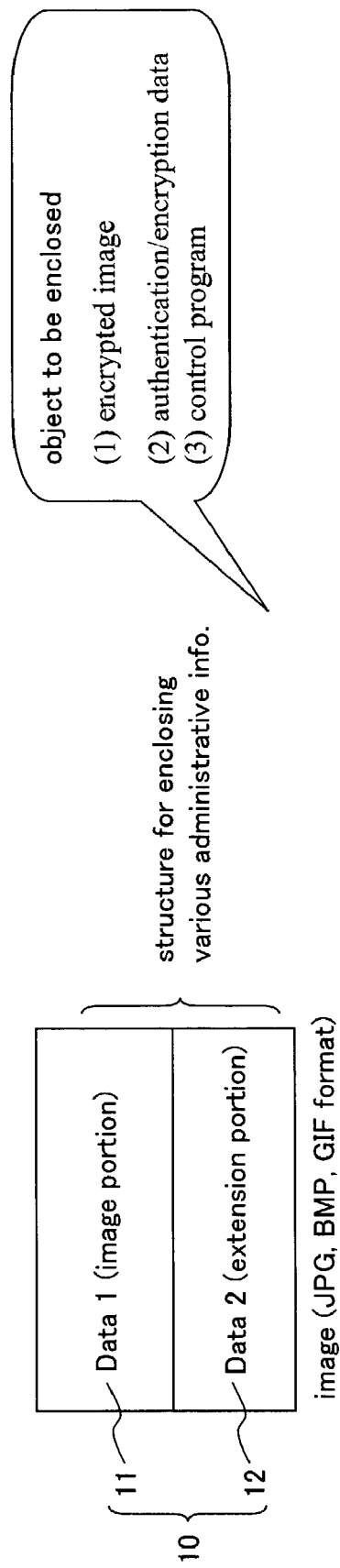
FIG. 9 illustrates data format of image information sp.

In addition, type of the data enclosure of the first access control information can be specified by a tag with a tag name <configuration>. This configuration tag indicates, when image data storing the first access control information is enclosed in a structure body comprising a plurality of data each enclosing various administrative information, the data format of the structure body and which of the data contains the embedded first access control information. For example, as shown in FIG. 9, when the image information sp is made of data in which data 1 containing image data in a data format of JPG, BMP, GIF, or other data formats are integrated with data 2 containing an extension portion enclosing various administrative information such as encrypted image, authentication and encryption data, and a control program, the data format and the data containing the embedded first access control information are described inside the tag <configuration>. For example, as shown in FIG. 8, it is possible to describe as follows:
    <configuration> data enclosure 1</configuration>;

or it may be as follows according to a format by data form:
    <tag 1>configuration attribute=data enclosure 1</tag 1>.

Image Information sp

As shown in FIG. 9, image information sp 10, which is designated as administrative information-enclosing data, can be configured to include a first data portion 11 that encloses image data that are actually displayed and a second data portion 12 that is an extension portion that encloses encrypted image data, control programs, and the like.

The image information sp 10 has an image data format such as JPG, BMP, GIF, or other image data format, and it encloses access control information, such as encrypted image data, authentication data, encryption key information, and a control program.

FIGS. 30 to 33 show a method of enclosing the first access control information in the image information sp 10.

Figure 30:
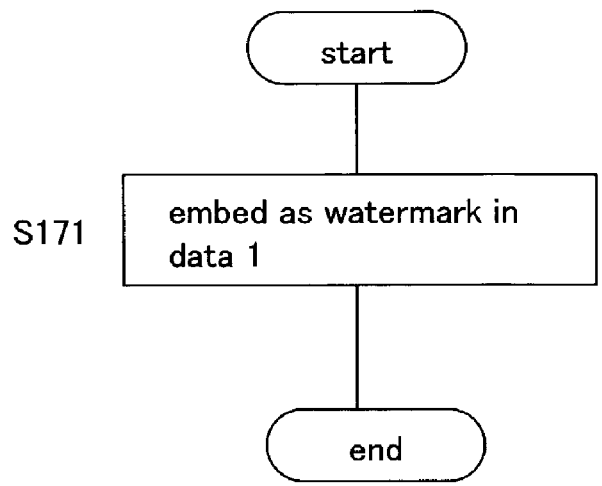
FIG. 30 is a flowchart of data enclosure in the image information sp.

As shown in FIG. 30, it is possible to configure the first access control information to be embedded as an electronic watermark into the first data portion 11 of the image information sp 10. In this case, in step S171, the first access control information is embedded as an electronic watermark into the first data portion 11 of the image information sp 10.

It is necessary that, if the first access control information is assigned as secret information, it should be embedded as an invisible watermark because the image data enclosed in the first data portion 11 are actually displayed on a monitor or the like.

Figure 31:
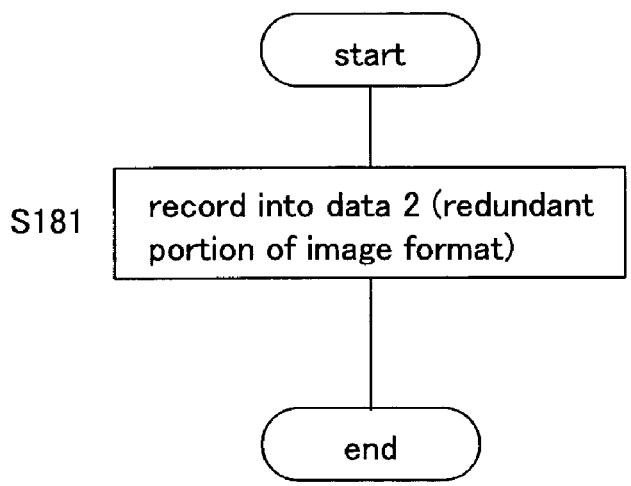
FIG. 31 is a flowchart of data enclosure in the image information sp.

As shown in FIG. 31, the first access control information can been closed in the second data portion 12 of the image information sp. If this is the case, in step S181, the first access control information is enclosed in the second data portion of 12 of the image information sp 10. The first access control information can be enclosed in a redundant portion of the image format of the second data portion 12 as invisible watermark data or visible watermark data.

Figure 32:
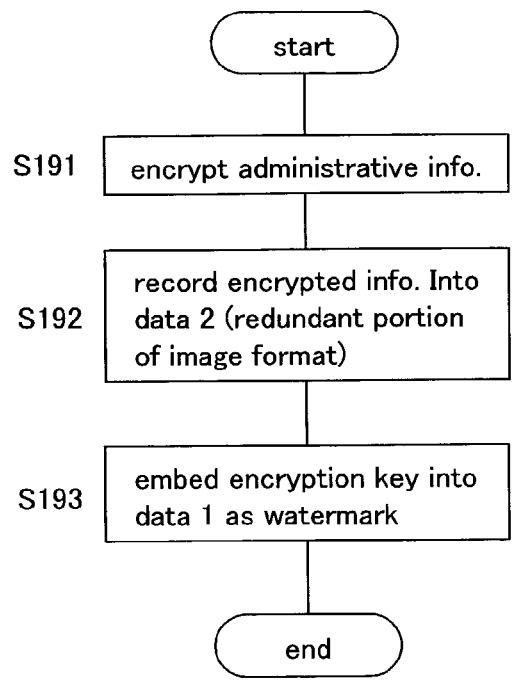
FIG. 32 is a flowchart of data enclosure in the image information sp.

As shown in FIG. 32, the first access control information can be encrypted and enclosed in the image information sp 10.

First, in step S191, the first access control information is encrypted. The encryption key used here is a common key of a private key encryption system, and by encrypting the first access control information using the common key, the first access control information can be assigned as secret information. When the first access control information is signature information, a private key of a public key encryption system can be used for the encryption.

In step S192, the encrypted data of the first access control information are enclosed in the second data portion 12. In this case, the encrypted data are embedded as invisible watermark data or visible watermark data into a redundant portion of the image format of the second data portion 12.

In step S193, the encryption key used when encrypting the first access control information is embedded in the first data portion 11. In this case as well, since the first data portion 11 is visible image data, the encryption key can be enclosed as secret information by embedding the encryption key as invisible watermark data into the first data portion 11. When the first access control information is encrypted with a private key of a public key encryption system, it is unnecessary to embed the encryption key into the first data portion 11.

Figure 33:
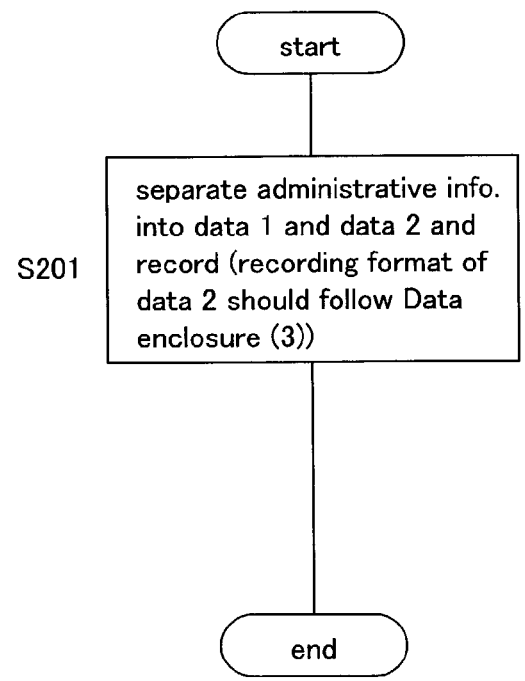
FIG. 33 is a flowchart of data enclosure in the image information sp.

As shown in step S201 of FIG. 33, it is possible to separate the first access control information and enclose the separated portions of the first access control information in the first data portion 11 and the second data portion 12 separately.

Figure 34:
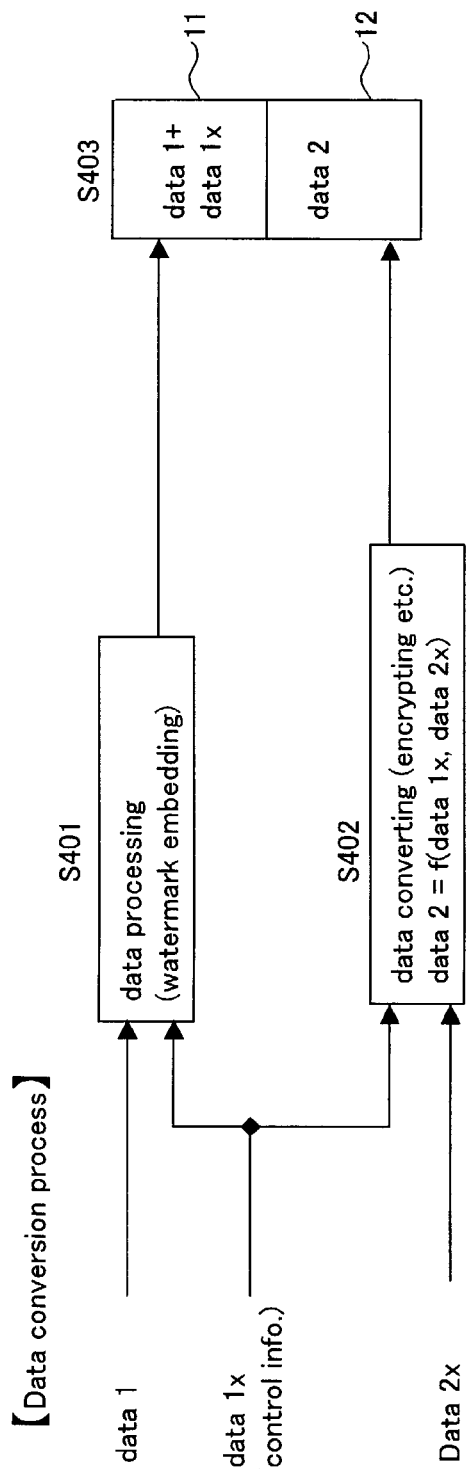
FIG. 34 is a flowchart for converting data of the image information sp.

For example, as shown in FIG. 34, data 1 to be enclosed in the first data portion 11 are prepared, and in addition, data $1x$ and data $2x$ that have been separated from the first access control information are prepared. In step S401, the data $1x$ are embedded as an invisible watermark into the data 1. In step S402, data conversion is performed using the data $1x$ and the data $2x$ to create data 2. In this case, a data conversion process is possible such as encrypting the data $2x$ using the data $1x$.

In step S403, the data 1 in which the data $1x$ have been embedded are enclosed in the first data portion 11 of the image information sp 10, and the data 2 that have been data-converted using the data $1x$ and the data $2x$ are enclosed in the second data portion 12.

Figure 35:
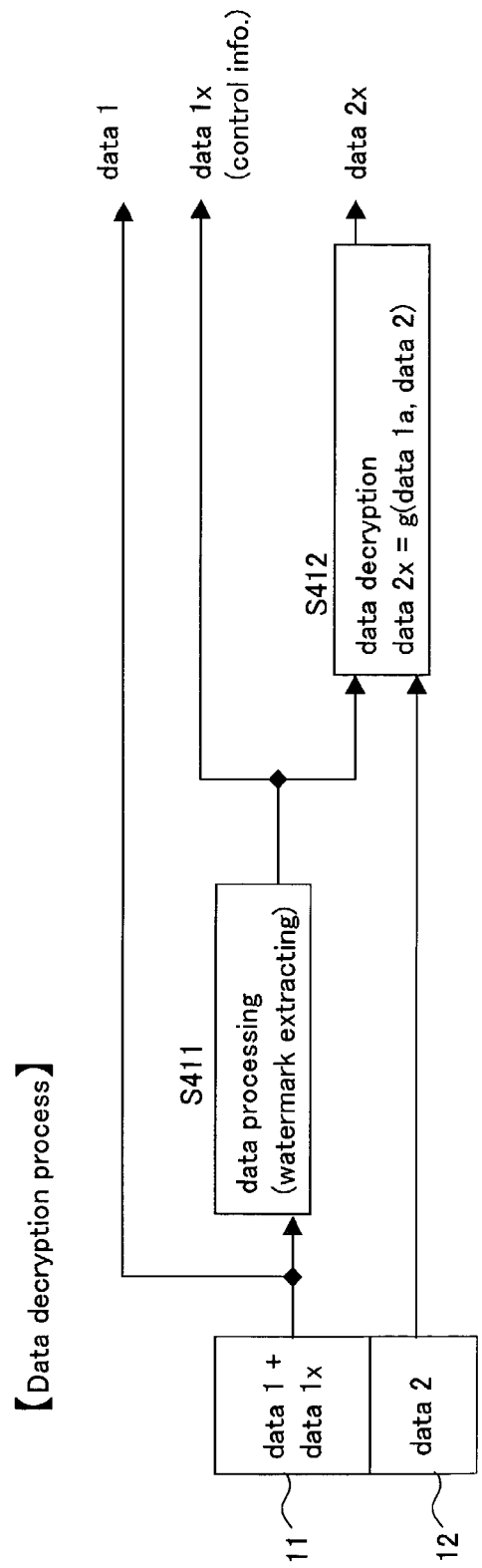
FIG. 35 is a flowchart depicting a process of decrypting the image information sp.

FIG. 35 shows a flowchart for restoring the first access control information enclosed in the image information sp 10. In step S411, the data $1x$ embedded as invisible watermark data are extracted from the data in the first data portion 11 of the image information sp 10. In step S412, the data $2x$ is decrypted based on the extracted data $1x$ and the data 2 that are enclosed in the second data portion 12. For example, when the data $2x$ are encrypted using the data $1x$ serving as a private key, the data $2x$ is decrypted with the use of the data $1x$ that are extracted from the watermark data.

Data Format of the Image Information sp

Figure 41:
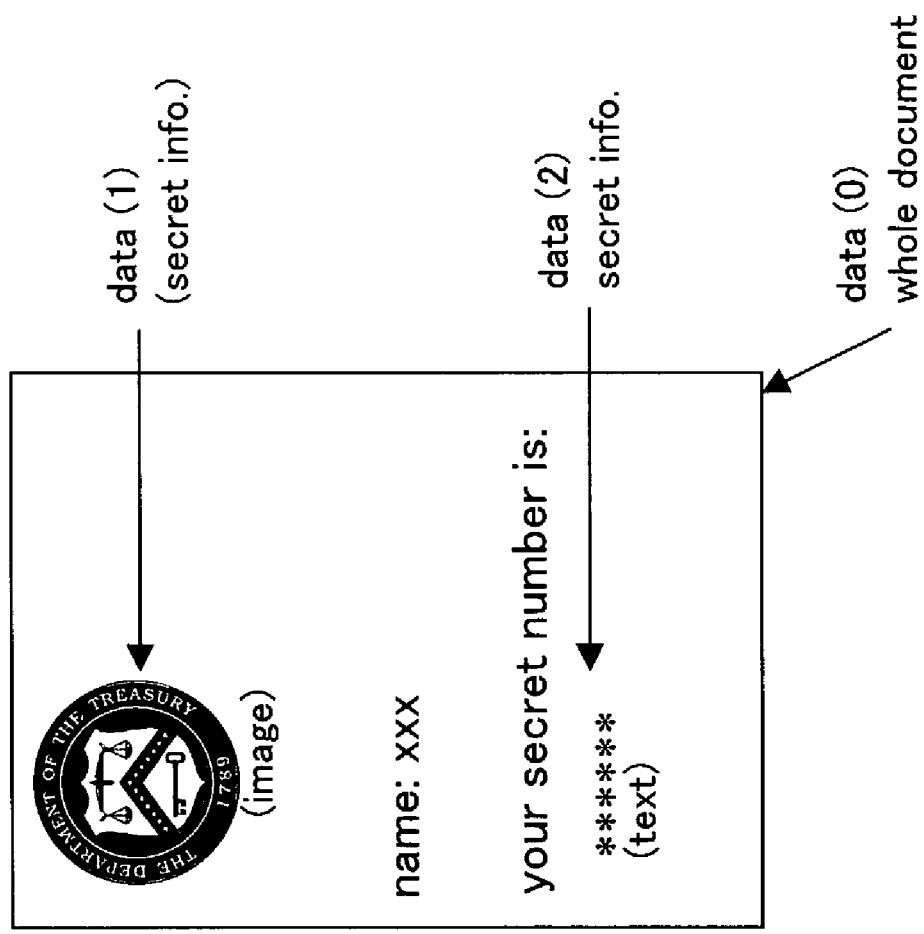
FIG. 41 illustrates a display image of the image information sp.

The image data for enclosing administrative information such as shown by data (1) in FIG. 41 are configured to have a data format made of the first data portion 11 and the second data portion 12 of the image information sp 10, and the following data are enclosed therein.

When the size of the administrative information-enclosing image is large enough so that all the watermark information such as a signature, a timestamp, and an access policy can be turned into watermarks, the information is enclosed in the first data portion 11 of the image information sp 10. On the other hand, when the size of the administrative information-enclosing image is small so that programs or the like with a large information content cannot be turned into watermarks, they are enclosed separately in the first data portion 11 and the second data portion 12 of the image information sp 10.

The data that are enclosed in the first data portion 11 of the image information sp 10 or are separately enclosed in the first data portion 11 and the second data portion 12 may be those shown in FIG. 40.

For example, as the characteristic information of the whole data (0), it is possible to enclose signature information such as a hash value, a timestamp indicating the date of publication, and the like. As the characteristic information of data (1), it is possible to enclose signature information such as a hash value, and a timestamp indicating the date of publication or the date of update. As the access policy of the data (1), it is possible to enclose a user name, a time period of access permitted, permission information about read/write such as "read only" and "editable", and the like. As the characteristic information of the data (2), it is possible to enclose signature information such as a hash value, a partial character, a timestamp indicating the date of publication or the date of update, and so forth. As the access policy for the data (2), a user name, a time period of access permitted, permission information about read/write, an owner ID, contact information such as address, telephone number, and URL, the number of times of access permitted, and the like. It is also possible to enclose programs such as JAVA (trade name) applications.

Flow of Electronic Document Creation

Creation of Digitally Signed Document

Figure 12:
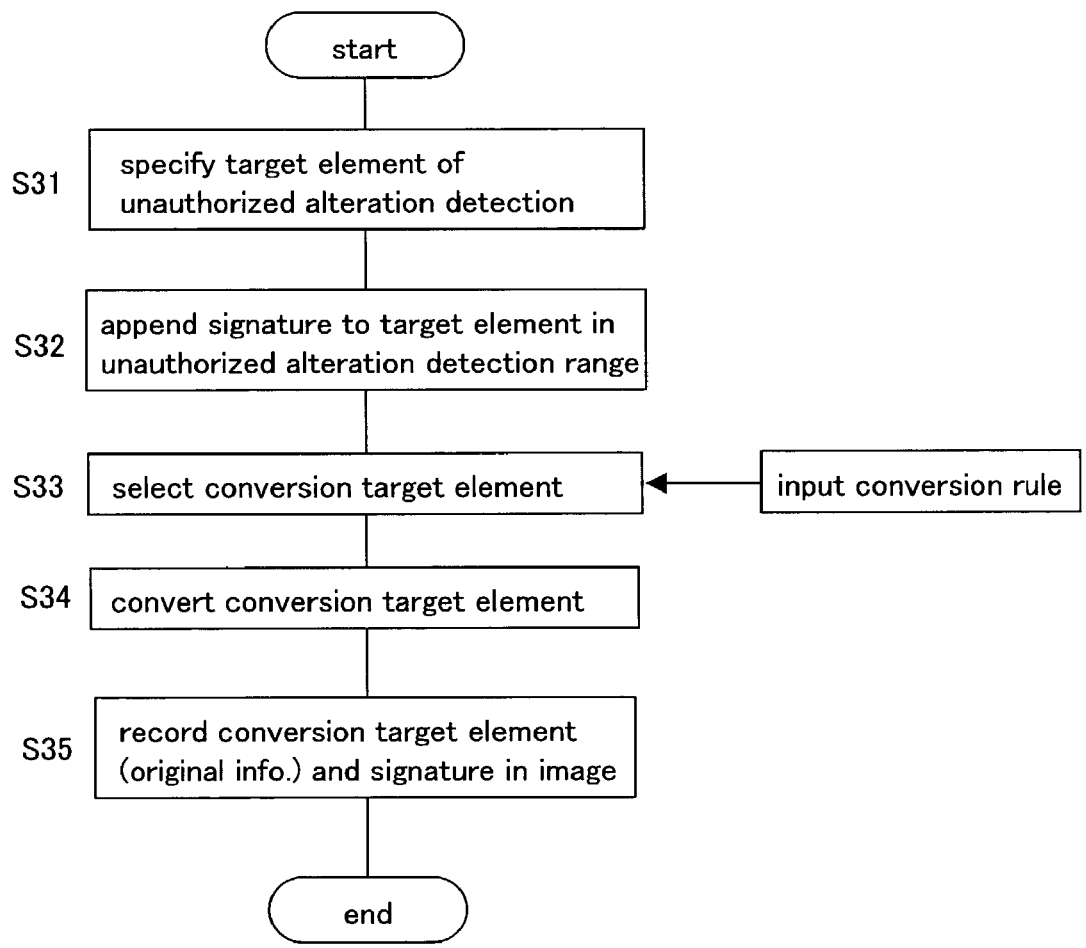
FIG. 12 is a flowchart depicting a process of creating document data.

FIG. 12 shows a flowchart depicting the process of creating digitally signed document data.

In step S31, an element that is to be a target of the range of unauthorized alteration detection is designated. For example, the input from the data input section 101 is accepted to designate an information item contained in the document data, and it is determined which element should be assigned as the target of the range of unauthorized alteration detection. If there is an element that has been set in advance to be a target of the range of unauthorized alteration detection based on the filename of the digitized data contained in the document data, it is possible to automatically designate the element to be the target of the range of unauthorized alteration detection.

In step S32, the element that is a target of the range of unauthorized alteration detection is digitally signed. For example, a hash value of all the elements that have been designated to be a target of the range of unauthorized alteration detection is computed, and the computed value is saved as signature information.

In step S33, a conversion target element is selected from the document data. In this case, selection of a conversion target element as the image information sp is accepted.

In step S34, a conversion process is executed for the selected conversion target element. A conversion rule applied to the conversion target element may possibly be a predetermined conversion rule or a conversion rule that is input from the data input section 101.

In step S35, the conversion target element and signature information are recorded in image data. In this case, the conversion target element is original information, and the original information and the signature information are embedded as an invisible watermark into the image data.

Access to the Digitally Signed Document

Figure 13:
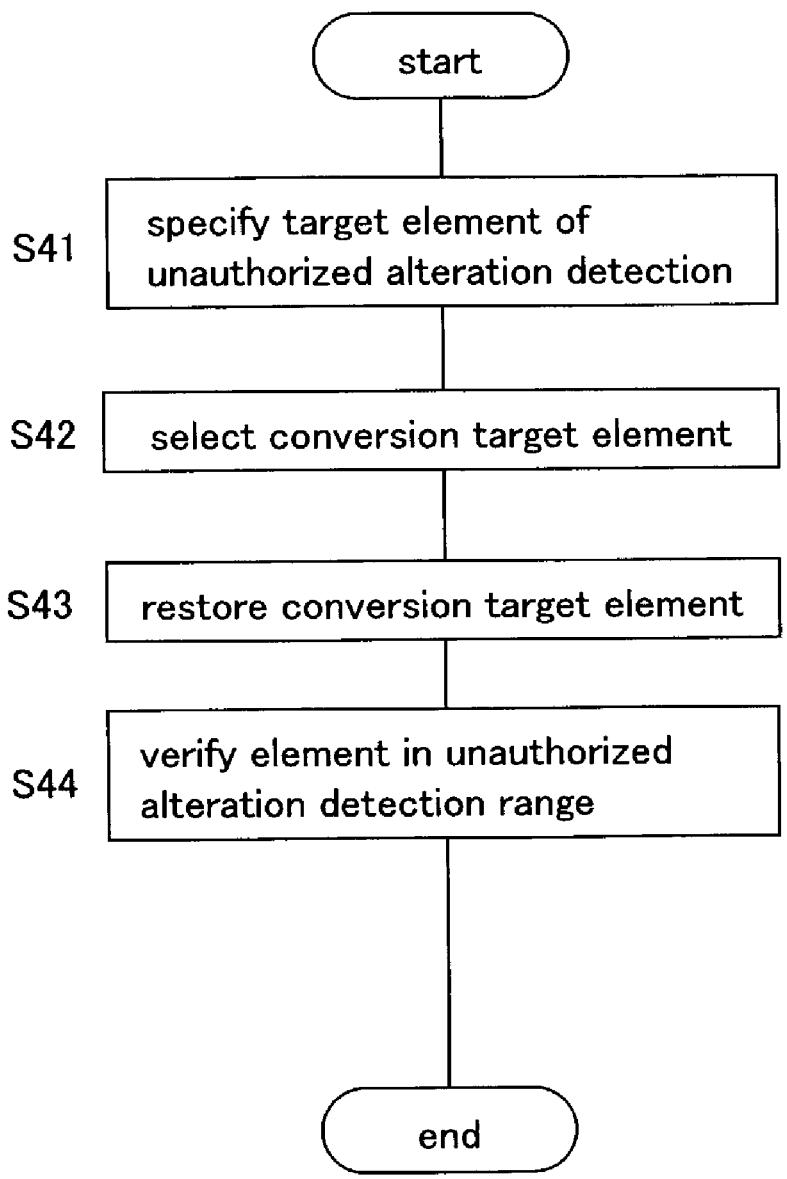
FIG. 13 is a flowchart depicting a process of accessing document data.

FIG. 13 shows a flowchart depicting the process of accessing the digitally signed document.

In step S41, an element is specified to be a target of the range of unauthorized alteration detection. In this case, an element that is a target of the range of unauthorized alteration detection can be specified by parsing the document and detecting the element that is assigned as a target of the range of unauthorized alteration detection from the information inside the tap sp.

In step S42, a conversion target element is selected. The information of the conversion target element is acquired from the information inside the tag sp, and the acquired information is assigned as the conversion target element.

In step S43, the converted element is restored. For example, the original information is extracted that corresponds to the embedded conversion target element in the image information sp.

In step S44, the element that is a target of the range of unauthorized alteration detection is verified. The element that is designated to be a target of the range of unauthorized alteration detection is extracted from information in the tag sp, and signature information is created for the element. For example, the hash value of all the elements that are designated to be the target of the range of unauthorized alteration detection is computed, and the computed value is verified with the signature information restored from the image information sp.

Verification of Signature Information

Figure 38:
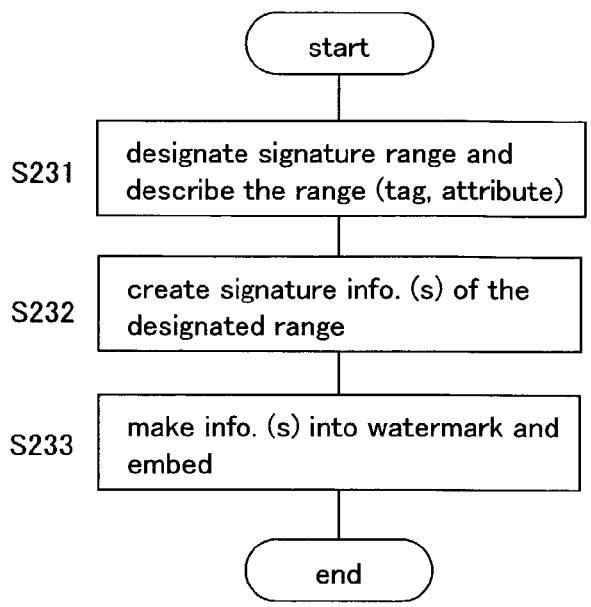
FIG. 38 is a flowchart depicting a process of verifying signature information.

The flowchart of FIG. 38 shows a method of creating signature information using a structured document such as an XML document.

In step S231, a signature range that is to be digitally signed is designated in the document data, and the designated range is described inside the tag sp. The signature range can be designated by selecting a tag in the document data. In addition, the signature range can be specifically determined by describing the information content of the signature range as an element or an attribute inside the tag sp.

In step S232, the signature information (s) of the specified signature range is created. Here, the signature information (s) is created by computing the hash value of all the elements contained in the signature range.

In step S233, the signature information (s) is embedded as watermark information into the image information sp.

Figure 39:
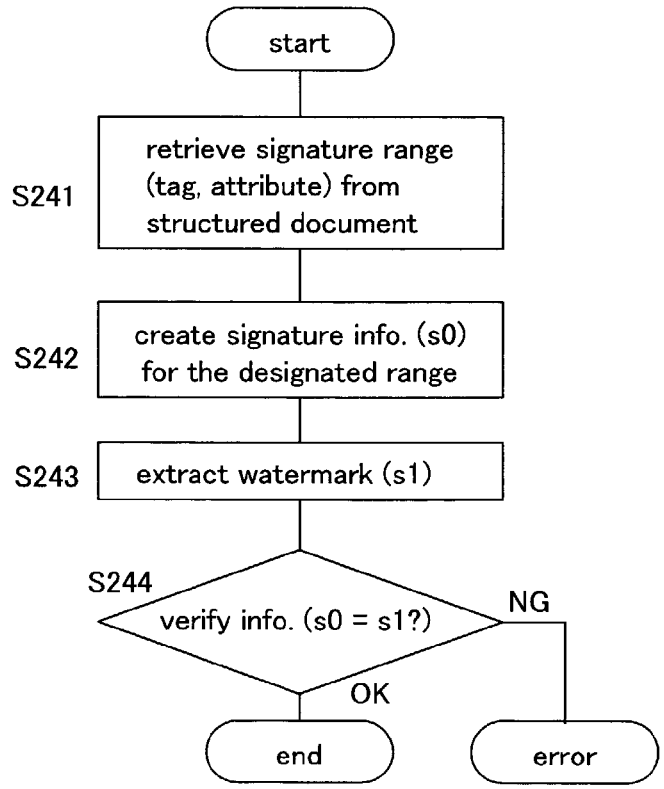
FIG. 39 is a flowchart depicting a process of verifying signature information.

FIG. 39 shows a flowchart for verifying the signature information of the distributed document data.

In step S241, the structured document is parsed, and the information about the signature range is acquired from the elements or attributes of the tag sp.

In step S242, signature information (s0) of the acquired signature range is created. In this case, the signature information (s0) is created by computing the hash value of all the elements contained in the signature range of the current document data.

In step S243, watermark data contained in the image information sp are extracted, and signature information (s1) is extracted from the watermark data.

In step S244, the signature information is verified. In this case, the signature information (s0) that has been obtained from the current document data is compared to the signature information (s1) that has been extracted from the watermark data, and if they match, the verification is successful. If they do not match, the verification is unsuccessful and an error handling is performed.

Creation of Concealing-processed Document

Figure 10:
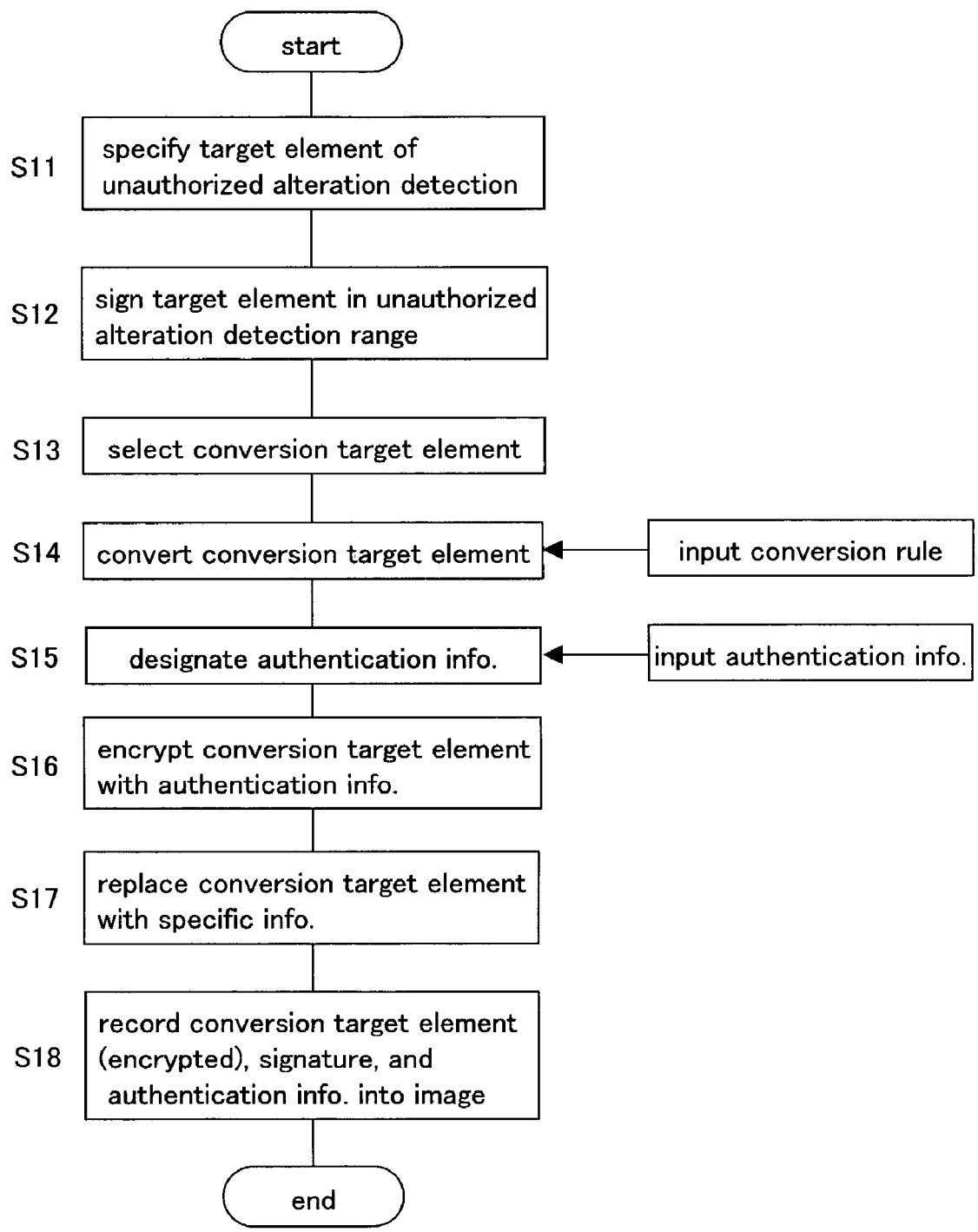
FIG. 10 is a flowchart depicting a process of creating document data.

FIG. 10 shows a control flowchart depicting the process of creating document data a portion of which is assigned as secret information by the document data-creating apparatus 100.

In step S11, an element is specified to be the target of unauthorized alteration detection. In this case, according to the information input from the data input section 101, it is decided which of the elements placed in the document data should be assigned as the target of unauthorized alteration detection.

In step S12, the element to be a target of the range of unauthorized alteration detection is signed. For example, the hash value of all the elements that have been assigned as the target of the range of unauthorized alteration detection is computed, and the computed value is saved as a signature value.

In step S13, a conversion target element is selected. Here, the conversion target element is selected as administrative information. For example, in cases where a portion of the document data is assigned as secret information and that portion is replaced with other particular information when distributing, a configuration is possible in which the target secret information is selected as the conversion target element. The conversion target element may be determined a predetermined conversion target element, or may be determined based on the information that is input from the data input section 101.

In step S14, a conversion process is executed for the selected conversion target element. The conversion rule applied to the conversion target element may be a predetermined conversion rule, or may be a conversion rule that is input from the data input section 101.

In step S15, authentication information is assigned based on the authentication information that has been input. The authentication information may be selected from a private key of a public key encryption system, a common key of a common key encryption system, personal information of the user, identification information of a storage medium, and other authentication information, and it may adopt the information that is input from the data input section 101.

In step S16, the conversion target element is encrypted using the assigned authentication information. Various encryption methods may be used for the encryption, and the encryption is performed in a method by which a rightful user can decrypt and access the document.

In step S17, the conversion target element is replaced with specific information. Here, specific information that is to be replaced with the conversion target element that is secret information is placed at the position of the conversion target element.

In step S18, the encrypted conversion target element, the signature information, and the authentication information are embedded as invisible watermark information into image data contained in the document data. For example, when the conversion target element has been encrypted with a common key of a common key encryption system, the encrypted information of the conversion target element, the common key information, the signature value of the element that is to be a target of the range of unauthorized alteration detection, and the like are embedded as an invisible watermark into the image data. When a portion of the image data is selected as the conversion target element, the portion of the image data that corresponds to the conversion target element is replaced with other specific information so that the other specific information is displayed instead, and the portion of the conversion target element of the original information is encrypted and embedded as watermark data into the image data together with the encryption key.

Access to the Concealing-processed Document

Figure 11:
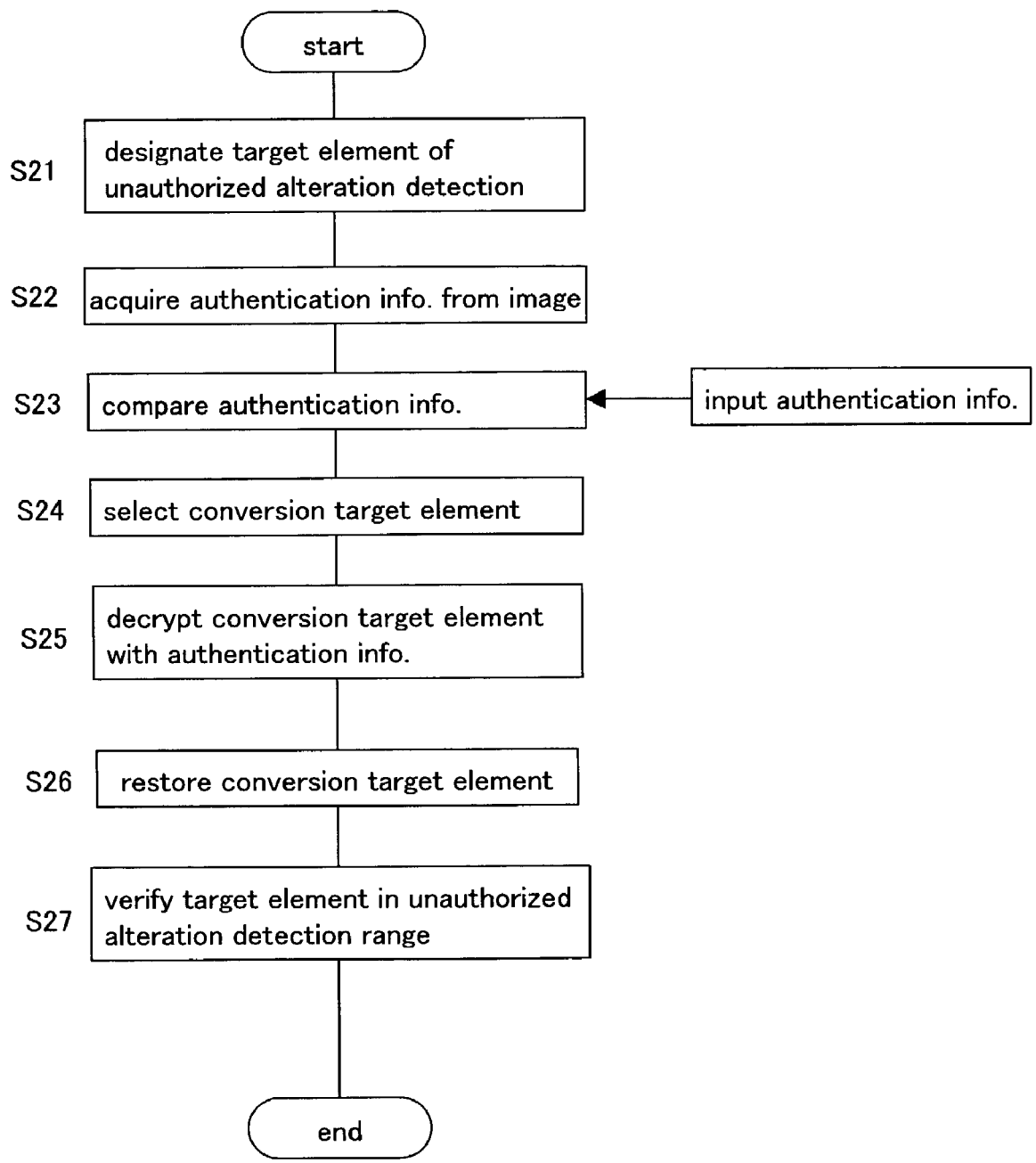
FIG. 11 is a flowchart depicting a process of accessing document data.

FIG. 11 shows a flowchart for accessing document data a portion of which is contained as secret information.

In step S21, an element is designated that is a target of unauthorized alteration detection. The document is parsed to detect an element that is assigned as a target of the range of unauthorized alteration detection from the information of the tag sp, and the detected element is designated as an element that is a target of unauthorized alteration detection.

In step S22, authentication information is acquired from image data. The first access control information embedded as invisible watermark data is extracted from the image data, and the authentication information contained therein is acquired.

In step S23, authentication information that is input by the user is accepted and the authentication information is compared to the authentication information extracted from the first access control information. For example, personal information of the user, identification information of a storage medium, or the like is input by the user, which is then compared to the authentication information extracted from the first access control information. If they do not match, the process is aborted.

In step S24, a conversion target element is selected. In this case, encrypted data contained in the document data are specified to be the conversion target element.

In step S25, the conversion target element is decrypted using the authentication information.

In step S26, digitized data are restored using the decrypted conversion target element.

In step S27, the element that is assigned as a target of the range of unauthorized alteration detection is verified. For example, a hash value is obtained for the range of unauthorized alteration detection in the document data that contains the restored digitized data, and the obtained value is compared to the hash of the original information that is contained in the first access control information. Thus, it is verified whether or not there has been unauthorized alteration.

Verification of the Concealing-processed Document

Figure 36:
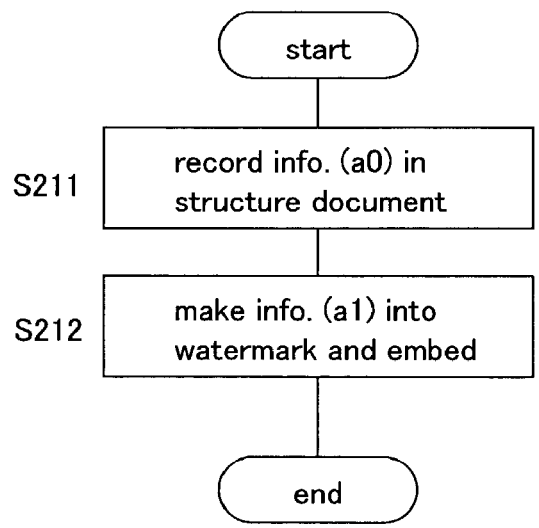
FIG. 36 is a flowchart depicting a process of verifying secret information.

The flowchart of FIG. 36 shows a method of creating concealing-processed information using a structured document such as the XML document.

In step S211, information (a0) is recorded in a structured document. For example, it is possible to record the information (a0) in a structured document by describing information (a0) in a tag that is set in the tag sp or in an attribute of the tag sp, or alternatively, by determining that a tag in the document data designates the information (a0).

In step S212, duplicate information (a1) of the information (a0) is embedded as watermark data into the image information sp, and data for extracting the watermark data are described in the tag sp.

Figure 37:
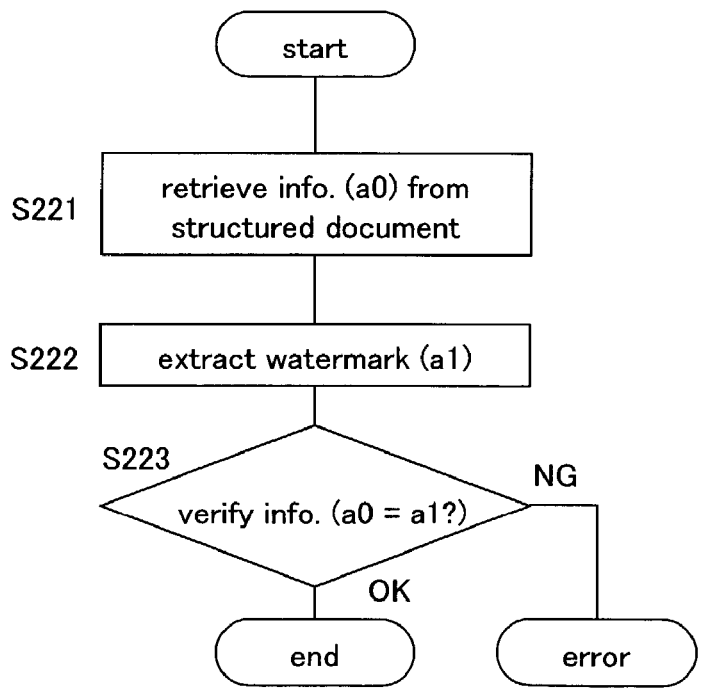
FIG. 37 is a flowchart depicting a process of verifying secret information.

FIG. 37 shows a flowchart for verifying secret information in distributed document data.

In step S221, a structured document is parsed and information (a0) is retrieved. In this case, the information (a0) is acquired based on the information contained in an element or an attribute in the tag sp.

In step S222, information (a1) is extracted from the watermark data. In this case, watermark control information is acquired by analyzing the information of the tag sp, and based on the acquired information, the information (a1) is extracted from the watermark data.

In step S223, the information (a0) in the structured document and the information (a1) that has been extracted from the watermark data are compared and verified. If the information (a1) that has been extracted from the watermark data matches the information (a0) in the structured document, the verification is successful. If they do not match, the verification is unsuccessful and an error handling is performed.

Creation of Tags in Structured Document

Figure 14:
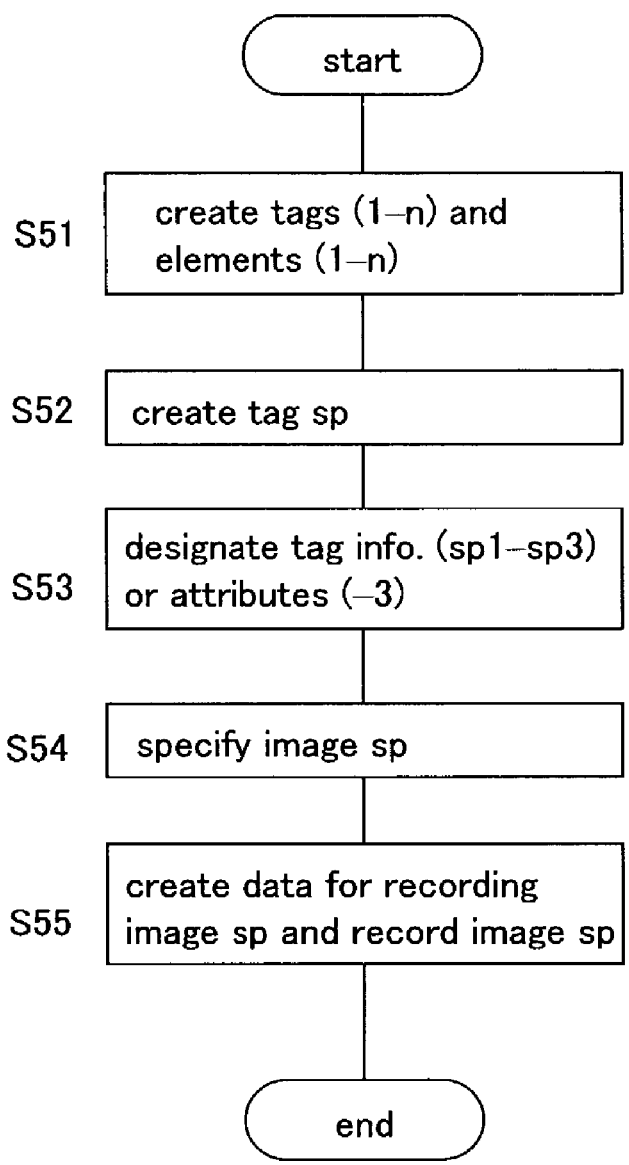
FIG. 14 is a flow chart depicting a process of creating document tags.

FIG. 14 shows a flowchart for creating document tags in cases where distributed document data are structured documents such as the XML and the HTML.

In step S51, tags (1 to n) are set for information items of digitized data contained in the document data, and elements (1 to n) are created that are information contents of the respective tags (1 to n).

In step S52, a tag sp is created for enclosing the information about image information sp, which is administrative information-enclosing data.

In step S53, a plurality of tags (sp1, sp2, . . . ) or attributes (1, 2, . . . ) that are set in the tag sp are determined. As described previously, it is possible to set a plurality of tags as shown in FIG. 6, or a plurality of attributes as shown in FIG. 7 as second access control information.

In step S54, image information sp is designated. In this case, image information sp is designated in which the first access control information is enclosed.

In step S55, the first access control information is created that is to be enclosed in the image information sp, and this first access control information is enclosed in the image information sp; at the same time, second access control information, which is for extracting the first access control information from the image information sp and for accessing document data together with the first access control information, is enclosed in the tag sp.

Access to Structured Document Tags

Figure 15:
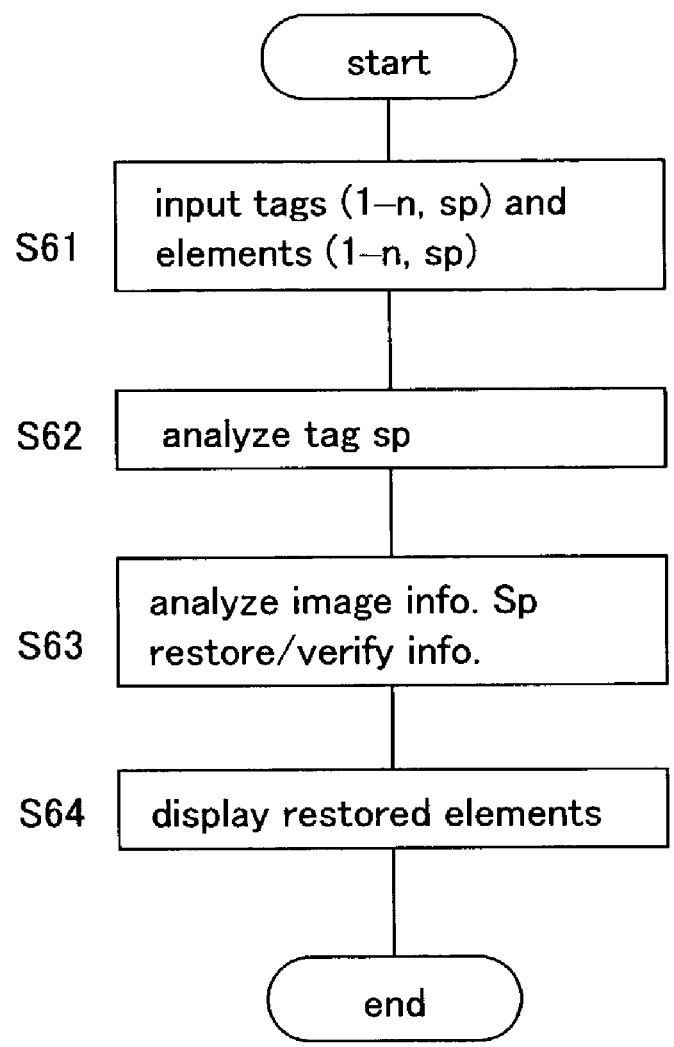
FIG. 15 is a flowchart depicting a process of accessing document tags.

FIG. 15 shows a flowchart of the method of analyzing tags that is used when accessing a distributed structured document.

In step S61, tags (1-n and sp) and elements (1-n and sp) are input. In this case, the tags (1-n and sp) in the distributed structure document are parsed, and at the same time, the elements in the tags are retrieved.

In step S62, the tag sp is analyzed. The tag sp encloses information (second access control information) related to image information sp, and by analyzing the tag sp, it is possible to extract the first access control information enclosed in the image data.

In step S63, the image information sp is analyzed, and information restoration/verification is performed. Based on the second access control information enclosed in the tag sp, the first access control information contained in the image data is extracted, and decryption of the encrypted data and verification of the signature information and the secret information are performed.

In step S64, the restored elements are displayed. In this step, the structure document data such as an XML document or an HTML document are displayed in accordance with the style sheet that is specified in the document data.

Access Policy

FIG. 18 shows examples of the data used when the access control information is an access policy.

An access policy can be divided into a plurality of policy types, for example as shown in FIG. 18, such as expiration, remaining number of times of access, user attribute, process permission, and others.

When expiration is designated as an access policy, its information content may be the data indicating an expiration such as "~YY. MM. DD", "Forever", and "Today", as shown in FIG. 18 for example. When remaining number of times of access is designated as an access policy, the information content may be the remaining number of times that is counted down from a predetermined initial value at each time of access. When user attribute is designated as an access policy, the information content may be such data as "single user access only (+S)" and "group access permitted (+G)". When process permission is designated as an access policy, the information content may be such data as "read only (+R)", "rewrite permitted (+W)", and "addition permitted (+A)".

Creation of Document Tags for Access Policies

Figure 16:
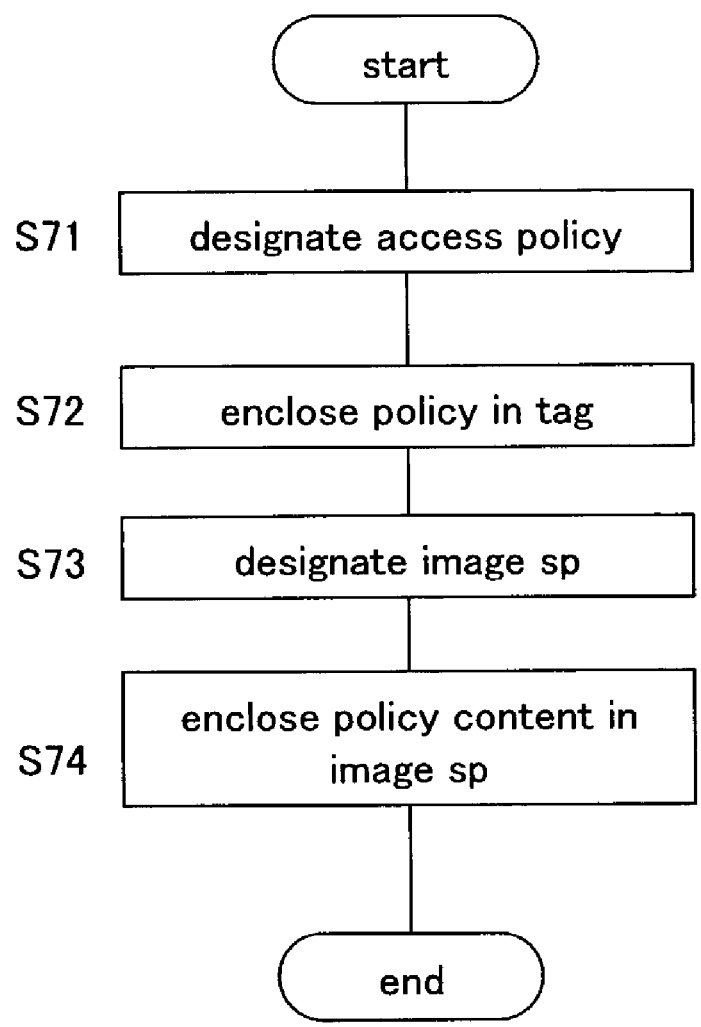
FIG. 16 is a flowchart depicting a process of creating document tags.

FIG. 16 shows a flowchart for creating document tags used when an access policy is designated in the tap sp.

In step S71, an access policy is specified. For example, one or more of access policy types are selected from expiration, remaining number of times of access, user attribute, and process permission, and policy contents are determined for the access policy types.

In step S72, the access policy is enclosed in the tag sp. For example, the tag sp4 in the tag sp is designated to be a tag for the access policy, and the policy content is enclosed as an element of the tag sp4. It is also possible to describe the information content of the access policy as an attribute of the tag sp.

In step S73, image information sp is specified. In this case, the image information sp is determined for embedding the policy content of the access policy as the first access control information.

In step S74, the information content of the access policy is enclosed in the image information sp. In this case, the information content designated as the access policy is embedded as invisible watermark data into the image information sp.

Access to the Tag for an Access Policy

Figure 17:
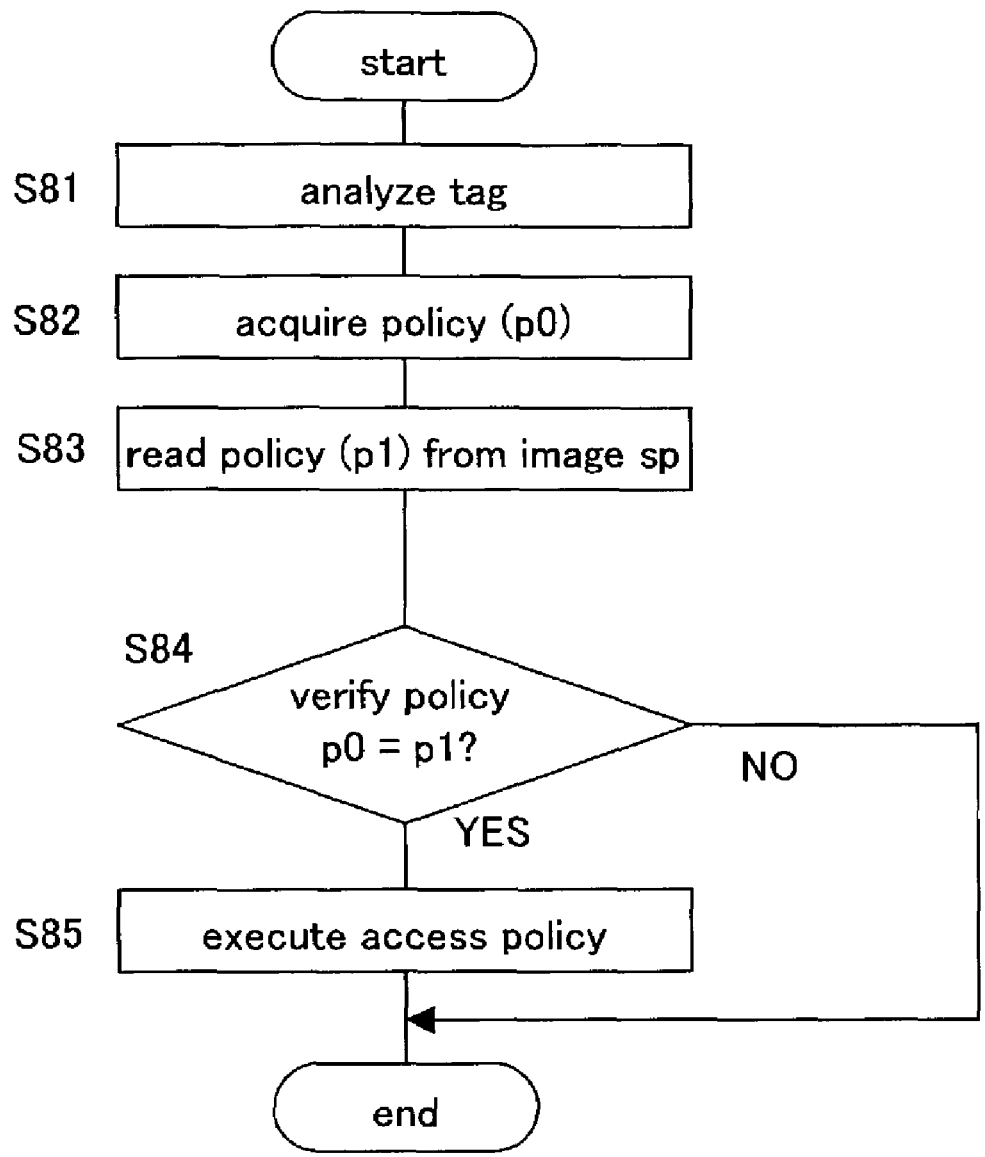
FIG. 17 is a flowchart depicting a process of accessing document tags.

FIG. 17 shows a flowchart depicting the process of accessing the document data in which an access policy is designated as access control information.

In step S81, tags are analyzed in the distributed document data.

In step S82, based on the result of the tag analysis, access policy information content (p0) enclosed in the tag sp is acquired.

In step S83, access policy information content (p1) embedded as invisible watermark data in the image information sp is extracted.

In step S84, the access policy information content (p0) that was enclosed in the tag sp is compared to the access policy information content (p1) is extracted from the image information sp, and it is determined whether they match or not. If the access policy information content (p0) and the access policy information content (p1) match, the flow proceeds to step S85.

In step S85, a user is allowed to access the document data according to the access policy. For example, when the access policy information content is "+R+Today", the user's access to the document data is restricted to "read-only and only today". In cases where a remaining number of times of access is designated as the access policy, the current remaining number of times of access is counted to update the access policy information content, the access policy information content is changed in the tag sp, and at the same time, the updated access policy information content is embedded as invisible watermark data into the image information sp.

Distribution Channel Information

In cases where distribution channel information is designated as access control information, data as shown in FIG. 21 can be employed, for example. In this case, it is possible to designate a channel that is the origin of the distribution (From), a channel 1 (Through) and a channel 2 (Through) that are midway of the distribution, and a channel (To) that is the destination of the distribution. These channels can be expressed in the form of URL information, MAC address information, terminal information, and the like.

Creation of Tag for Distribution Channel Information

Figure 19:
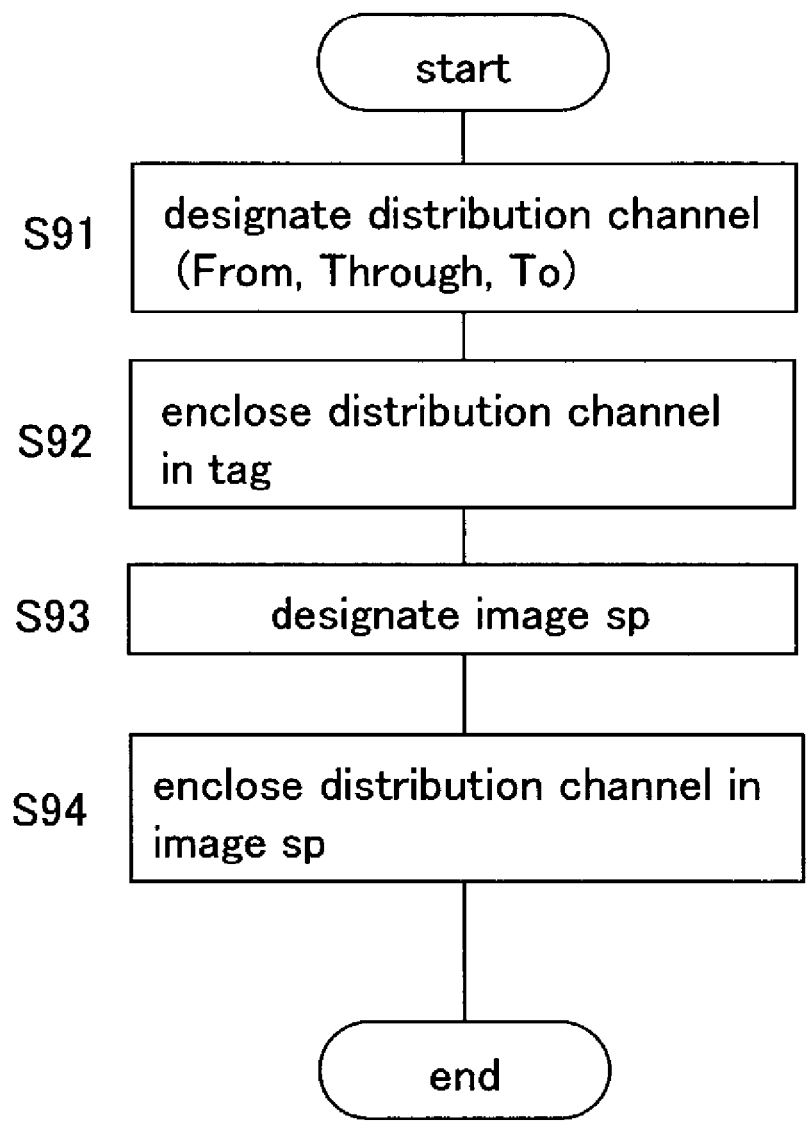
FIG. 19 is a flowchart depicting a process of creating document tags.

FIG. 19 shows a flowchart depicting the process of creating document data when distribution channel information is designated as a tag.

In step S91, the distribution channel is specified from a channel (From) that is the origin of the distribution, a channel (Through) that is midway of the distribution, and a channel (To) that is the destination of the distribution.

In step S92, the information of the type of the distribution channel is designated as a tag name in the tag sp, and the information content of the tag, which is identifying information such as a URL and a MAC address is enclosed as the second access control information.

In step S93, image information sp is designated for enclosing the distribution channel information as the first access control information.

In step S94, the distribution channel information is enclosed in the image information sp. In this case, the distribution channel information can be embedded as invisible watermark data into the image information sp.

Access to the Tag for Distribution Channel Information

Figure 20:
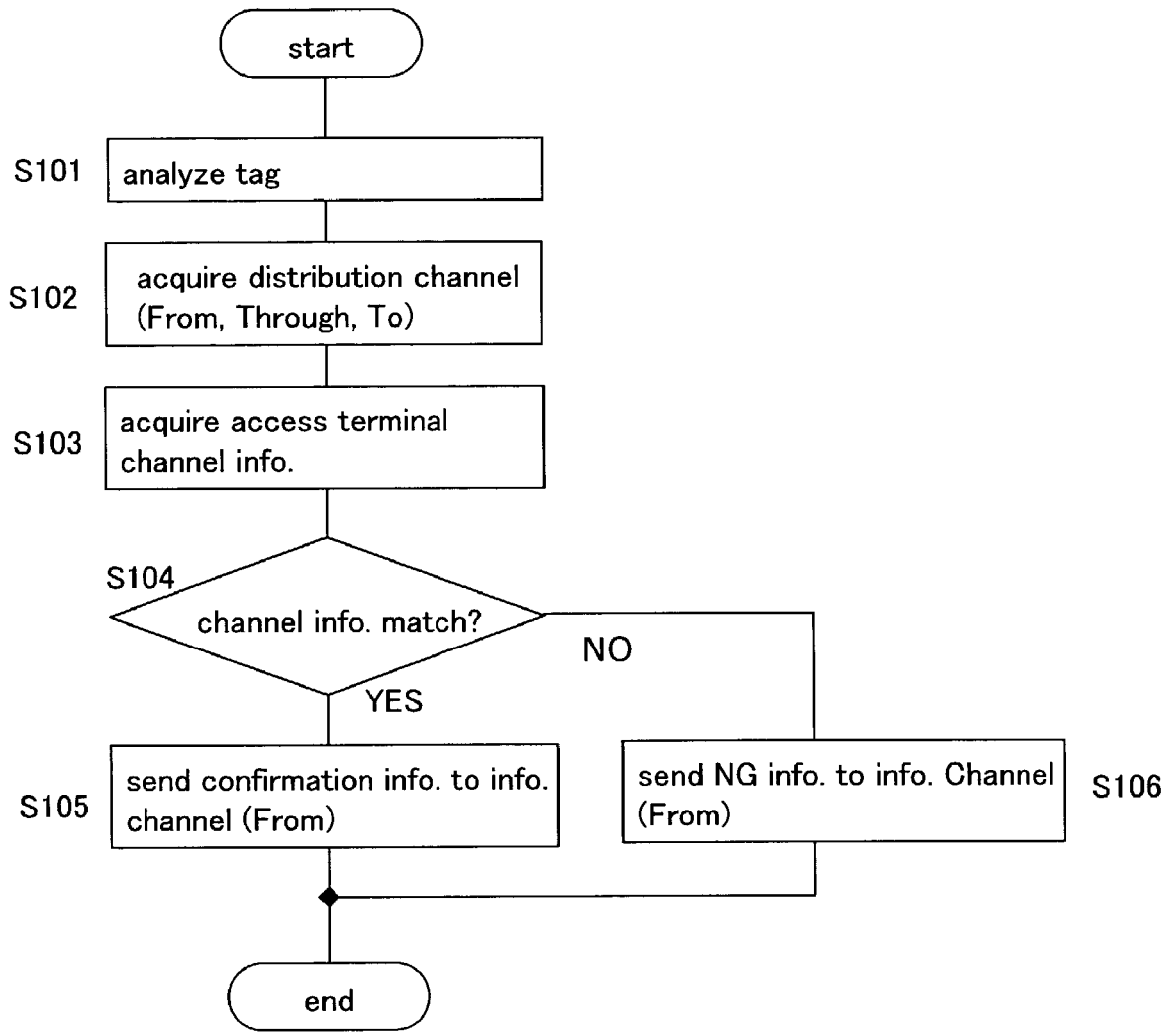
FIG. 20 is a flowchart depicting a process of accessing document tags.

FIG. 20 shows a flowchart depicting the process of accessing document data in which distribution channel information is designated as access control information.

In step S101, tags are analyzed in the distributed document data.

In step S102, the information content of the distribution channel information that is enclosed in the tag sp is acquired based on the result of the tag analysis.

In step S103, access terminal channel information embedded as an invisible watermark is extracted from the image information sp.

In step S104, the distribution channel information that has been enclosed in the tag sp is compared to the access terminal channel information extracted from the image sp, and it is determined whether they match or not. If the distribution channel information that has been enclosed in the tag sp and the access terminal channel information extracted from the image information sp match, the flow proceeds to step S105. If they do not match, the flow proceeds to step S106.

In step S105, confirmation information is sent out to the channel (From) specified in the access terminal channel information that has been extracted from the image information sp.

In step S106, NG information is sent out to the channel (From) specified in the access terminal channel information that has been extracted from the image information sp.

Creation of Document Data in Which Program Control is Performed

Figure 22:
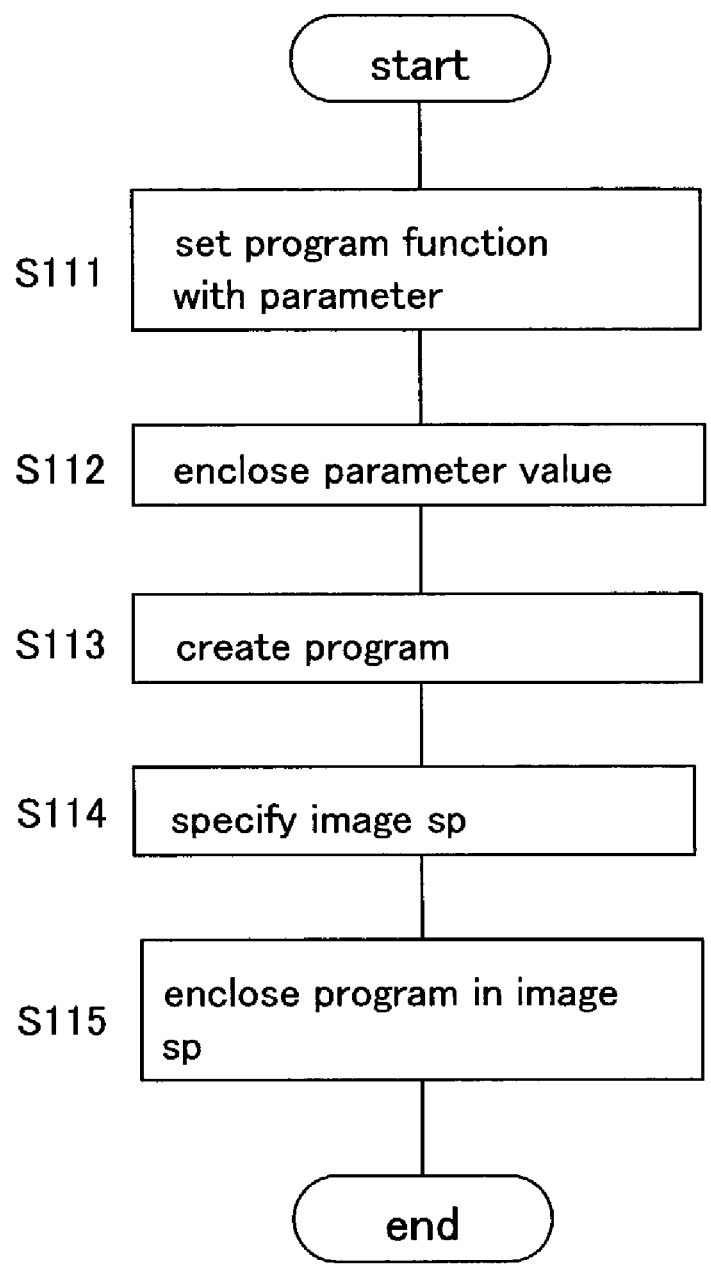
FIG. 22 is a flowchart depicting a process of creating document data.

A configuration is possible in which a program is enclosed in the image information sp and the program is started up to execute a process corresponding to a designated parameter when the document data are accessed. FIG. 22 shows a flowchart depicting the process of creating such document data.

In step S111, the function setting is performed by designating a parameter indicating what process the program executes for the document data.

In step S112, the designated parameter value is enclosed as the second access control information in the tag sp.

In step S113, program data are created. In this case, program data are created for executing a process corresponding to the designated parameter when the document data are accessed.

In step S114, digitized data are designated as the image information sp. In this case, it is possible to select either the digitized data in the document data or other digitized data.

In step S115, the program data and the designated parameter are enclosed in the image information sp. In this case, the program data and the parameter value maybe enclosed in the image information sp as invisible watermark data. It is also possible that the program data are encrypted and enclosed in an extension portion of the image information sp.

Access to Document Data in which Program Control is Performed

Figure 23:
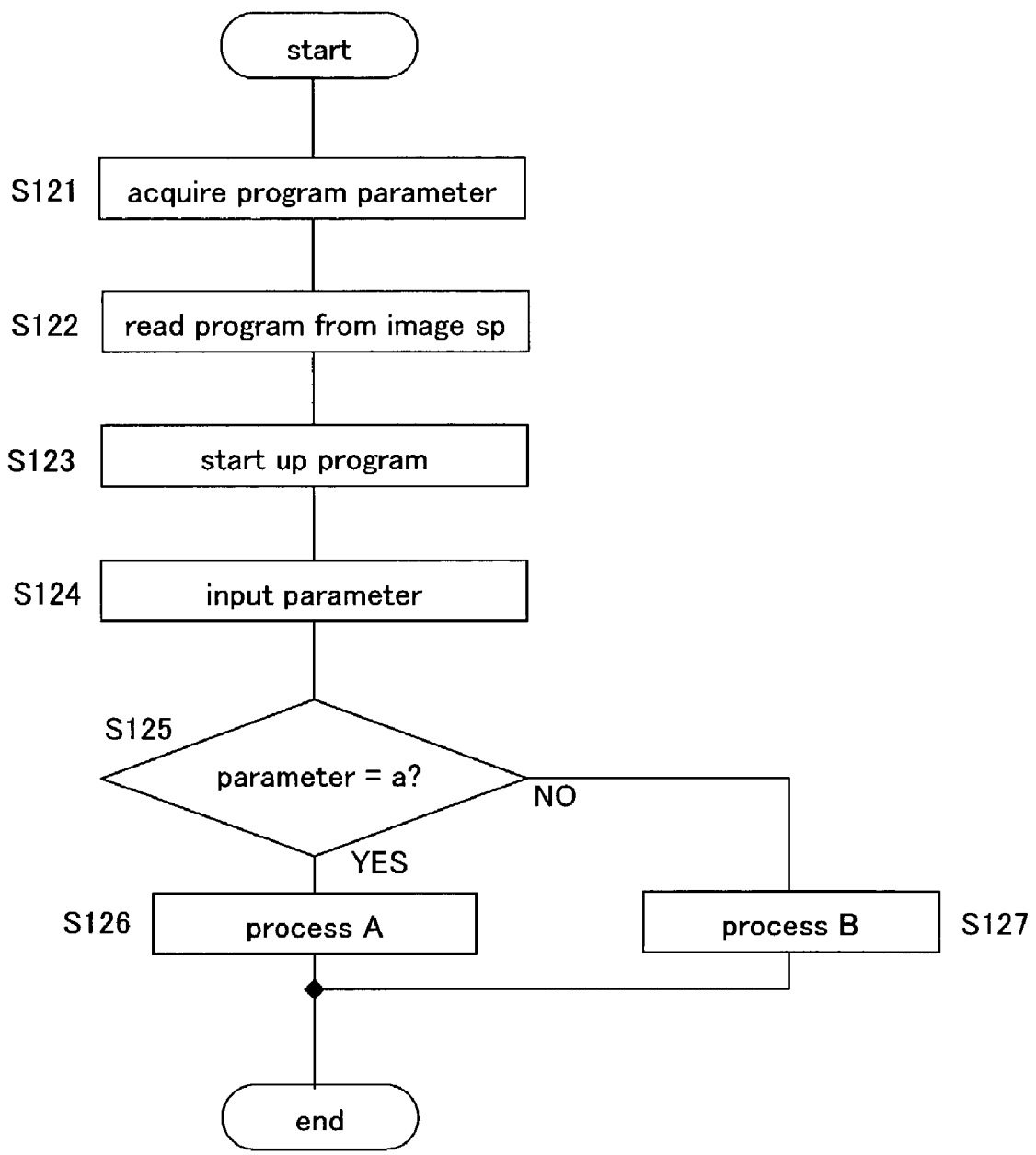
FIG. 23 is a flowchart depicting a process of accessing document data.

FIG. 23 shows a flowchart depicting the process of accessing document data in which a program is enclosed in the image information sp.

In step S121, a program parameter is acquired. The program parameter can be acquired from the information enclosed in the tag sp or from the information that is embedded in the image information sp as watermark information. It is also possible to have a configuration in which they are compared to verify if there has been unauthorized alteration or not.

In step S122, program data are read from the image information sp. In cases where the program data are embedded as watermark data in the image information sp, the program data can be read out by extracting the program data therefrom. In cases where the program data are encrypted, decryption is performed using an encryption key. Various encryption keys are conceivable, such as an encryption key that is enclosed as an invisible watermark in the image information sp and an encryption key using user identifying information, and in each case, decryption is performed using a corresponding encryption key appropriately.

In step S123, the program that has been read is started.

In step S124, a parameter is input. In this case, the parameter acquired at step S121 is input to the program.

In step S125, the input parameter is determined. For example, if the input parameter is "a", the flow proceeds to step S126 to execute a process A, but if not, the flow proceeds to step S127 to execute a process B.

Creation of Document Data Containing Encrypted Image

Figure 24:
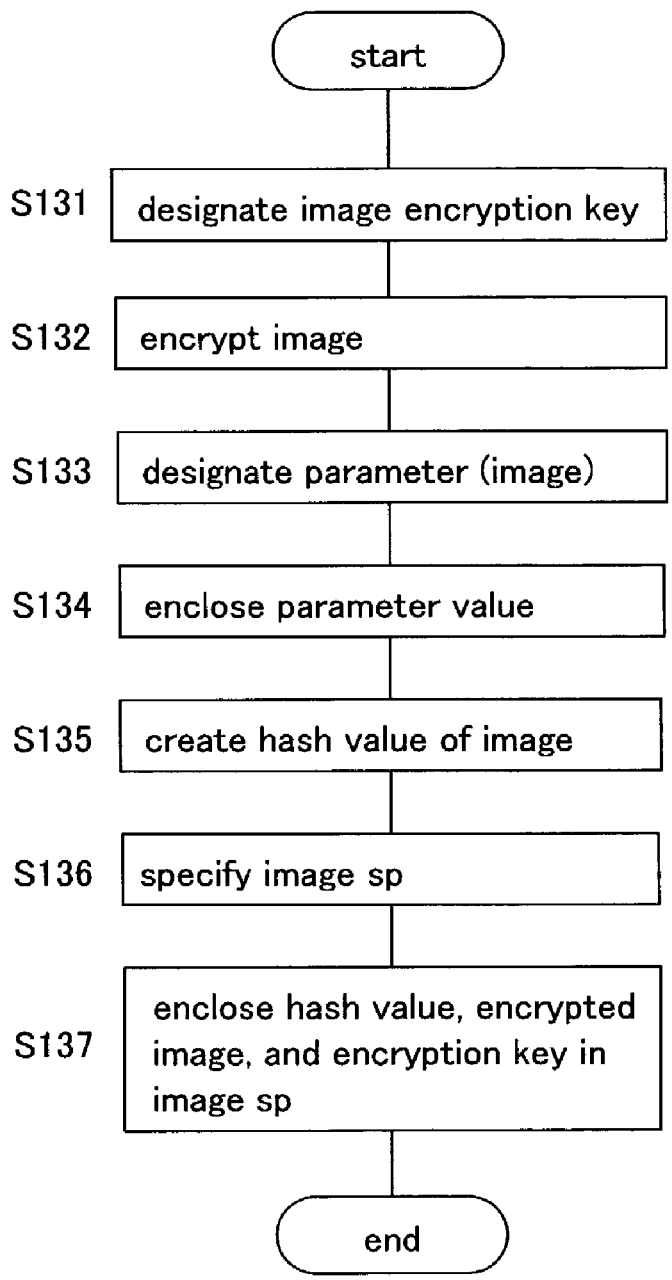
FIG. 24 is a flowchart depicting a process of creating document data.

FIG. 24 shows a flowchart depicting the process of creating document data containing encrypted image data.

In step S131, an encryption key is designated for encrypting the image data. The encryption key may be, for example, an encryption key that is arbitrarily selected as a private key of a common key encryption system, user identifying information, recording media identifying information, or other information.

In step S132, image data are encrypted using the designated encryption key.

In step S133, a parameter is designated. In this step, a parameter relating to the algorithm of the encryption is designated in the tag sp, and at the same time, a parameter for specifying image data to be enclosed in the image information sp is designated in the tag sp.

In step S134, the designated parameter value is enclosed in the tag sp.

In step S135, a hash value of the image data is created. In this case, a hash value of the image data that have been encrypted is computed.

In step S136, digitized data are designated as the image information sp.

In step S137, the hash value of the image data, the encrypted image data, the encryption key, and so forth are enclosed in the image information sp. It is possible to enclose the encrypted image data in the extension portion of the image information sp and embed the hash value of the image data and the encryption key as invisible watermark data into the designated digitized data. It is also possible to embed the encrypted image data as well as the hash value of the image data and the encryption key as invisible watermark data into the digitized data.

Access to the Document Data Containing Encrypted Image

Figure 25:
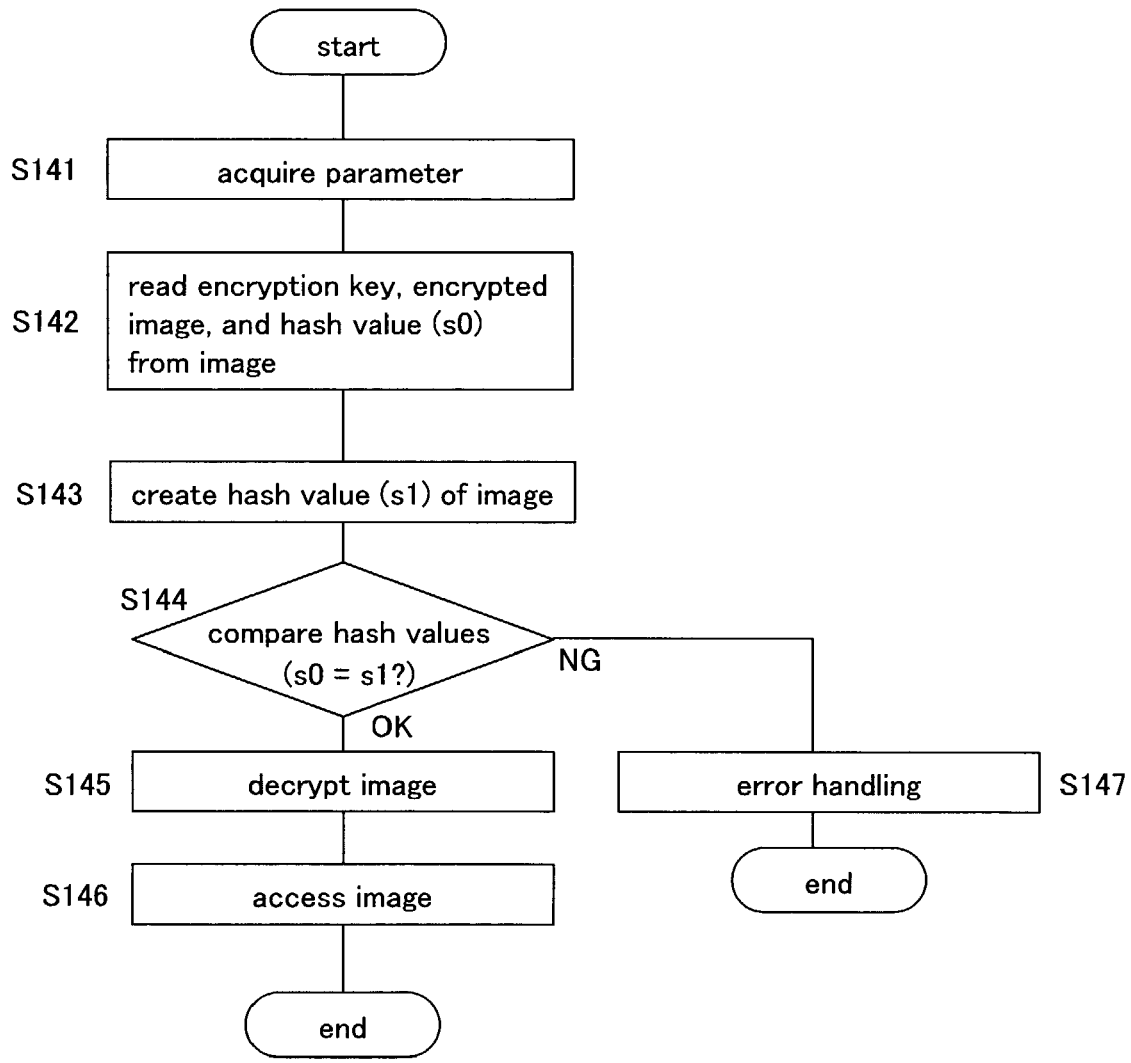
FIG. 25 is a flowchart depicting a process of accessing document data.

FIG. 25 shows a flowchart depicting the process of accessing document data containing encrypted image data.

In step S141, a parameter is acquired based on the information enclosed in the tag sp. In this step, a parameter is acquired for specifying the encryption algorithm and the encrypted image data.

In step S142, an encryption key, encrypted image data, and a hash value (s0) are read from the image information sp. Based on the parameter acquired from the tag sp, the encryption key and hash value embedded as an invisible watermark in the digitized data are extracted, and the encrypted image data are read that have been enclosed in the extension portion of the image information sp or that have been embedded as an invisible watermark in the digitized data.

In step S143, a hash value (s1) is computed of the encrypted image data that has been read out.

In step S144, the hash value (s0) that has been read from the image information sp is compared to the hash value (s1) that has been computed from the encrypted image data. If they match, the flow proceeds to step S145. If not, the flow proceeds to step S147.

In step S145, the encrypted image data are decrypted using the encryption key that has been read out, and in step S146, the image data are accessed.

In step S147, it is determined that there has been unauthorized alteration of the data, and accordingly, an error handling is executed and the process is terminated.

Figure 27:
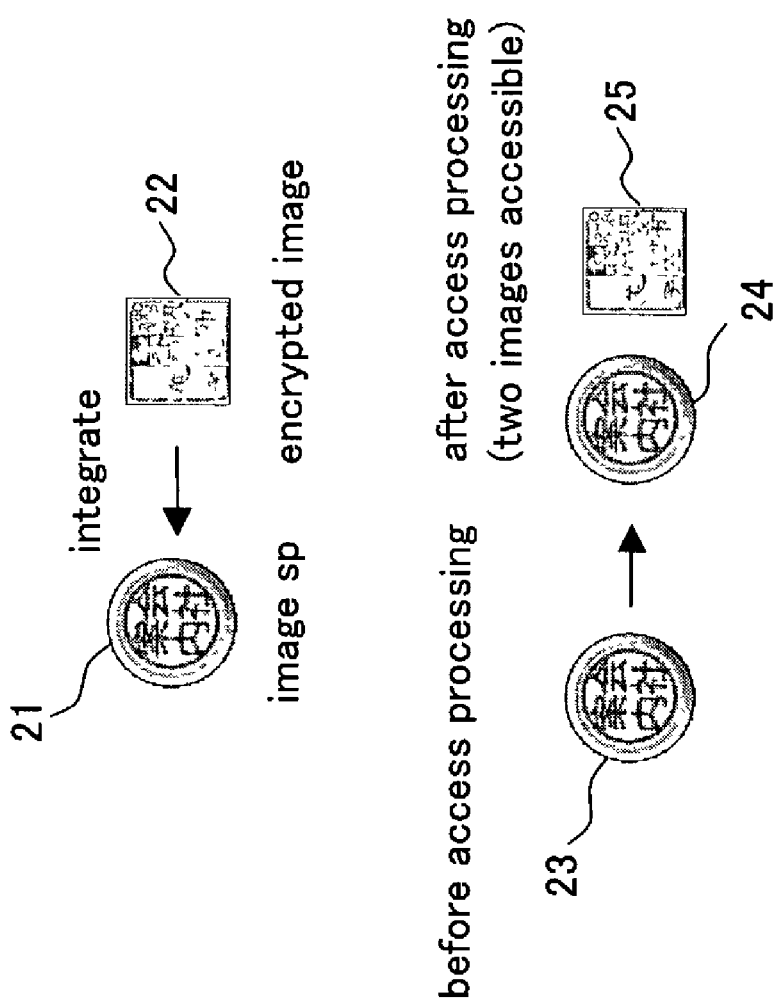
FIG. 27 illustrates creation of and access to an encrypted image.

For the encrypted image data, it is possible to use selected image data 21 depicting a seal for the image information sp as shown in FIG. 27, for example. These image data 21 are encrypted using an encryption key to create encrypted image data 22. The encrypted image data 22 serving as invisible watermark data are overlapped with the image data 21, and the overlapped image is enclosed as the image information sp.

Before the distributed document data are accessed, the image information sp, serving as pre-access-process image data 23, appears as image data depicting a seal, because the encrypted image data 22 are embedded as invisible watermark data. When accessed, this image information sp is separated into image data 24 and encrypted image data 25, and thus both of them can be accessed.

Image data that are usable for the authentication include facial images (including photographs and illustrations), hand-written signatures, fingerprint images, and the like.

Management of Paper Documents by Digitization

Figure 49:
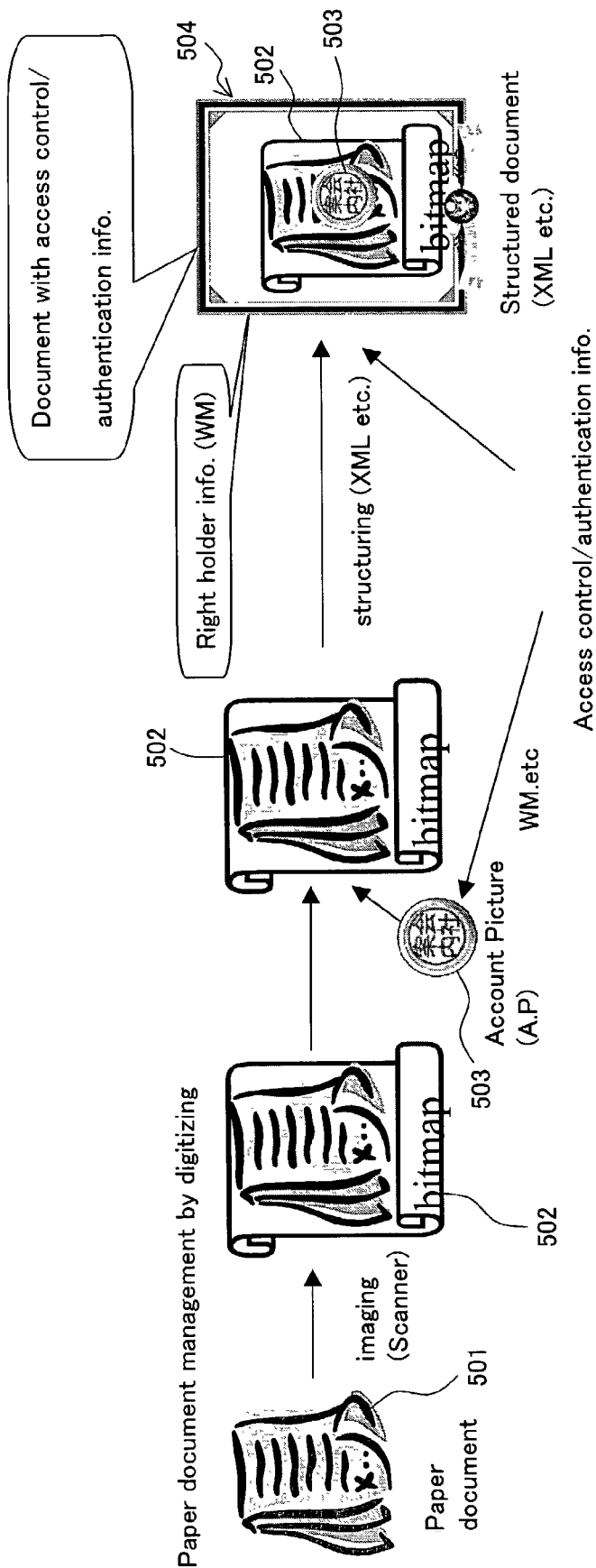
FIG. 49 illustrates a digitization management process of paper documents.

With reference to FIG. 49, an example is discussed in which paper documents are managed by digitizing in the above-described methods.

A paper document 501 can be turned into image data using a scanner, and for example, bit map data 502 are produced. The bit map data 502 are integrated with an account picture 503 in which the encrypted image data of access control/authentication information or the like are embedded, and then, document data 504 containing the bit map data 502 and the account picture 503 are created as a structured document.

If it is determined that the access is made by a rightful user, the account picture 503 is removed and browsing or the like of the bit map data 502 is permitted.

When the access to the document data 504 has ended, such information as data about the user who has accessed the document data 504 and the date of the access may be added to the encrypted data that are embedded in the account picture 503 and be integrated and managed with the bit map data 502 again.

Figure 69:
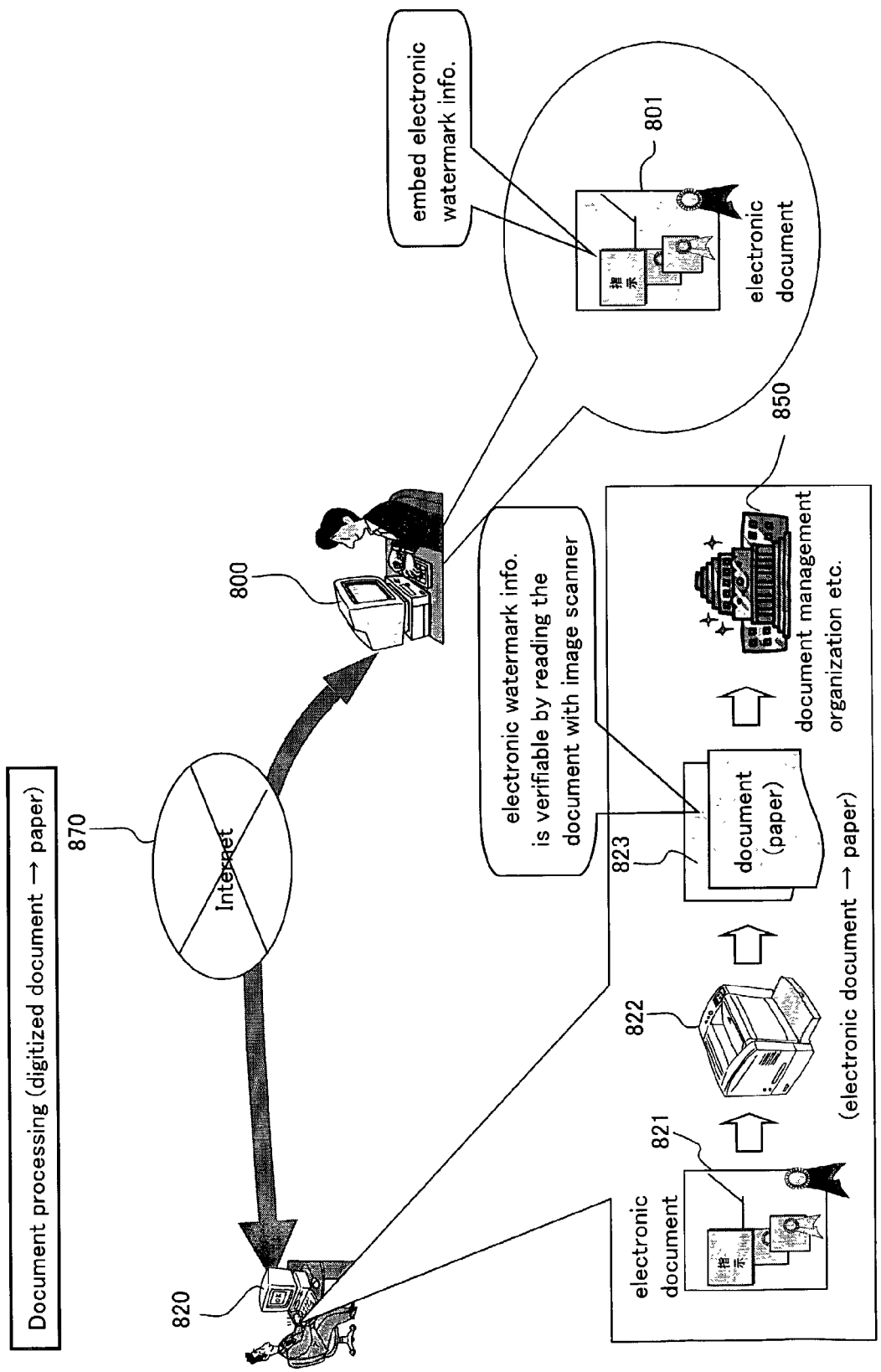
FIG. 69 illustrates an example in which the authentication information of digitized document is reflected in a paper document.

Reflection of Authentication Information of Digitized Documents on Paper Documents In institutions or the like where digitization of documents has not been introduced, management is made with paper documents and authentication is carried out by, for example, hand-written signatures appended to the documents. Assuming that, for example, an electronic document with document creator's electronic signature appended thereto is sent overseas via the Internet and has to be made into a paper document that is to be submitted to government organizations such as custom offices, it is difficult to verify authenticity of the hand-written signature appended to the document. In the following, a method of processing documents that is capable of authenticating a creator of a document even in such cases is explained with reference to FIG. 69.

In this case, a document creator or a document sender transmits an electronic document from a first user terminal 800 to a second user terminal 820 of a document submitter via an Internet network 870. The electronic document that is transmitted is an electronic document 801 to which document creator's electronic signature is appended, and, for example, the document can be a digitized document for electronic commerce.

The electronic document 801 is transmitted from the first user terminal 800 to the second user terminal 820 via the Internet network 870.

At the second user terminal 820 side, a received electronic document 821 (which is identical to the electronic document 801 at the transmitting side) is printed as a paper document with a printer 822 to produce a paper document 823. At this stage, secret information for authenticating the document creator, such as an electronic signature, is printed onto the paper document 823 in the form of electronic watermark information that can be read through an image scanner or the like.

The paper document 823 thus created makes it possible to authenticate the document creator by reading the electronic watermark with an image scanner at a document managing organization 850, and thus it is possible to determine whether a fraudulent act such as unauthorized alteration has been carried out or not. When the document for electronic commerce needs to be submitted to a government office, the document submitter submits the printed document (paper document 823) for electronic commerce to the government office (document managing organization 850), and thus the government office can authenticate this document for electronic commerce.

Management of Digitized Data

Figure 50:
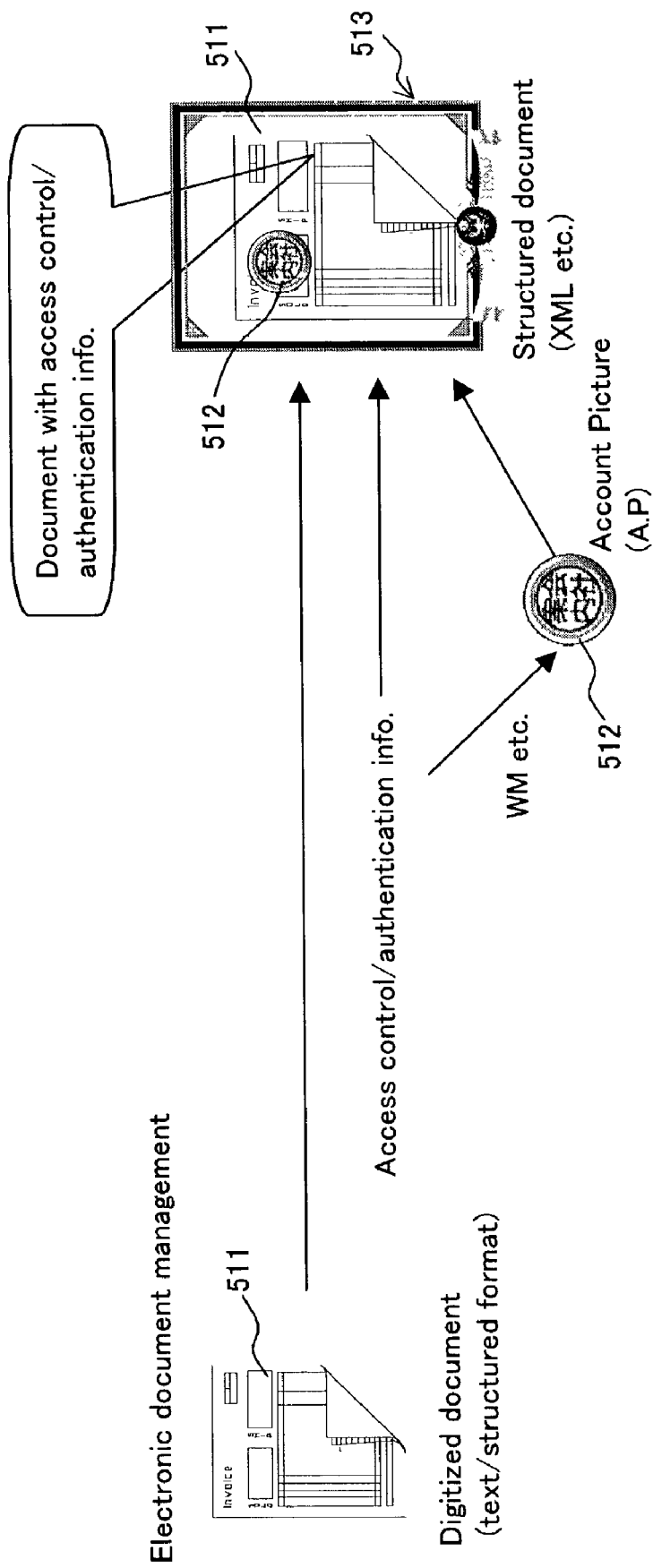
FIG. 50 illustrates a management process of electronic documents.

In a similar manner to the above, using digitized data 511 such as text data, an account picture 512 is produced in which access control information and authentication information are embedded as encrypted data, and document data 513 are created in a structured document format, as shown in FIG. 50.

In this case as well, if the access is determined to be properly made, the account picture 512 is removed or turned to be invisible and browsing or the like of the digitized data 511 is permitted. In addition, after the access has ended, such information as the user of the document data 513 and the date of the access can be embedded as watermark data into the account picture 512 and be integrated and managed with the digitized data 511 again.

Creation of Document Data Containing Encapsulated Information

Figure 28:
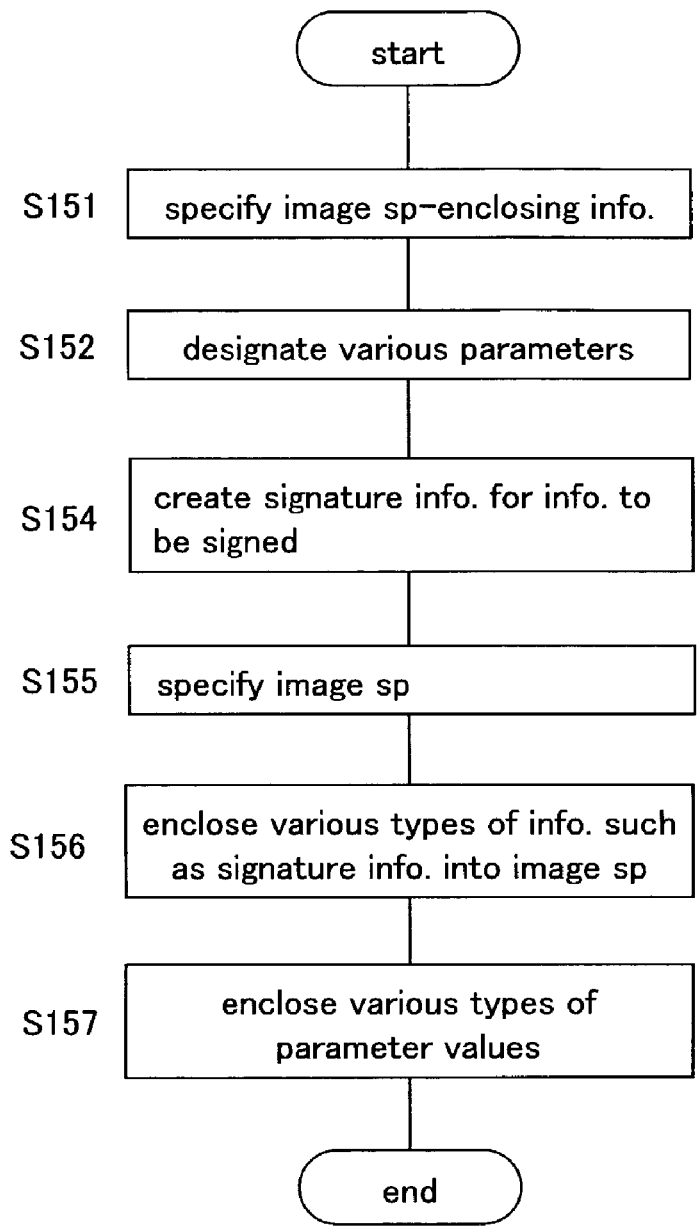
FIG. 28 is a flowchart depicting a process of creating document data.

FIG. 28 shows a flowchart depicting the process of creating document data in which a plurality of types of access control information are enclosed in the tag sp and the image information sp.

In step S151, access control information is specified that is to be enclosed in image information sp. For example, encrypted data, authentication information, encryption key information, control programs, and other information are designated that are to be enclosed as the first access control information in the image information sp.

In step S152, various parameters are designated. In this case, the second access control information to be enclosed in the tag sp is designated as a parameter.

In step S154, signature information is created for the signature target information to be signed. In this case, the signature information is created by specifying the signature target range to digitally sign the structured document data and computing a hash value of the elements in the signature target range.

In step S155, image information sp is specified. Digitized data are specified that are to be assigned as a management image, and the specified data are designated as the image information sp.

In step S156, the signature information computed by digital signing as well as various other types of access control information is enclosed in the image information sp.

In step S157, various parameter values are enclosed. In this case, various parameter values designated for the first control information to be enclosed in the image information spare enclosed in the tag sp.

Access to the Document Data Containing Encapsulated Information

Figure 29:
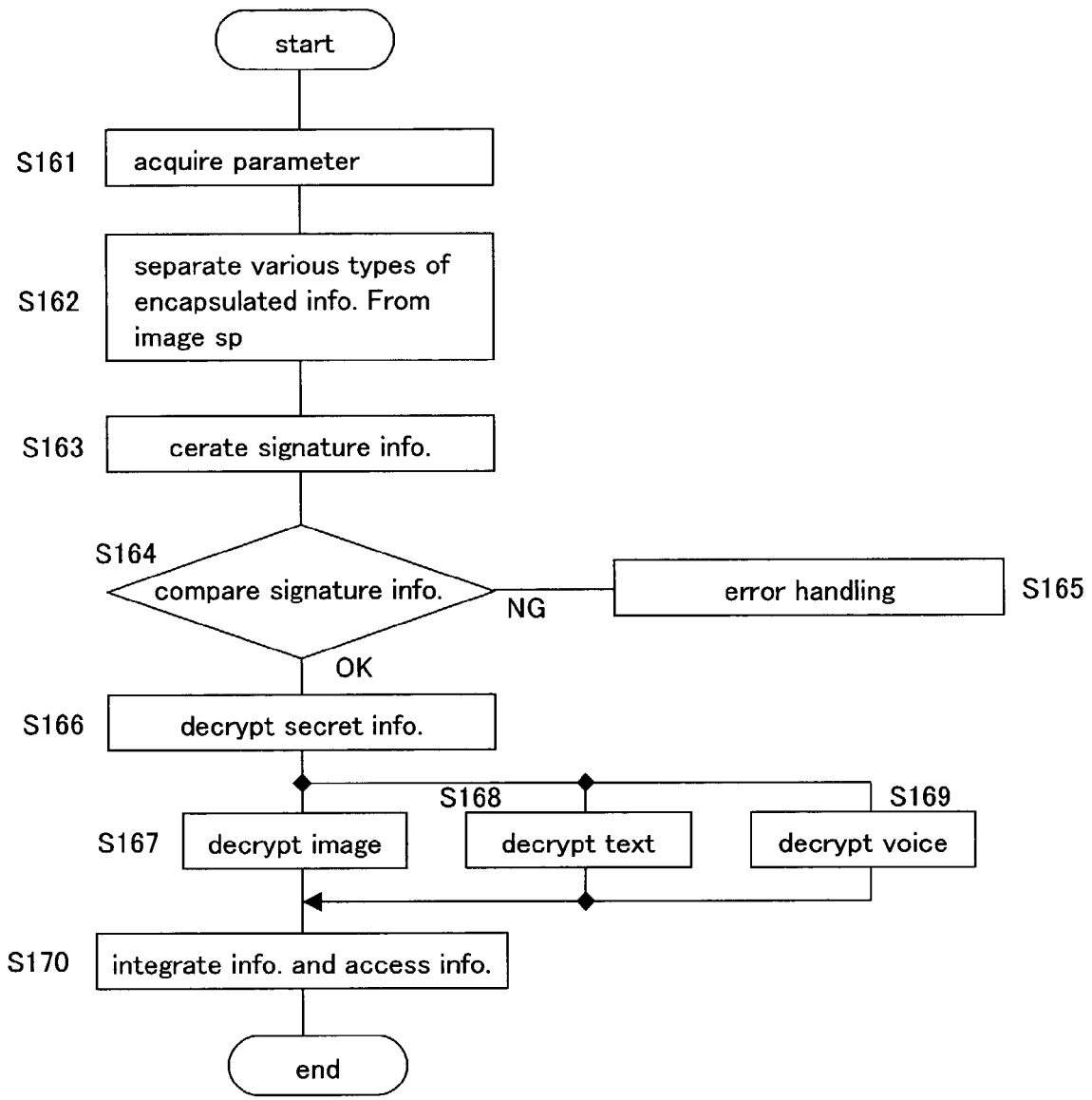
FIG. 29 is a flowchart depicting a process of accessing document data.

FIG. 29 shows a flowchart depicting the process of accessing the document data in which a plurality of types of access control information are enclosed in the tag sp and in the image information sp.

In step S161, various parameter values are acquired. In this case, by analyzing the information of the tag sp, various parameters are acquired for the first access control information enclosed in the image information sp.

In step S162, various types of information that has been encapsulated are separated from the image information sp. For example, various types of information are extracted, such as encrypted data, authentication information, encryption key information, control programs, and signature information computed by digital signing, which are enclosed in the image information sp.

In step S163, signature information is created. In this case, the elements in the document data are assigned as the signature range of the document, and the signature information is created.

In step S164, the signature information that has been separated from the image information sp is compared to the signature information that has been created based on the current document data. If these pieces of signature information for the signature target range do not match, the flow proceeds to step S165. If these pieces of signature information match, the flow proceeds to step S166.

In step S165, error handling is executed, and the process is terminated.

In step S166, secret information is decrypted. For example, the encrypted data that have been separated from the image information sp are decrypted using the encryption key that has likewise been separated from the image information sp.

When the secret information contains image data, the image data are decrypted in step S167. When the secret information contains text data, the text data are decrypted in step S168. When the secret information contains voice data, the voice data are decrypted in step S169.

In step S170, these decrypted image data, text data, and voice data are integrated, and these are allowed to access.

Association with OS Registration Screen

A configuration is possible in which user information is registered at the OS (Operating System) side of the publisher side, which distributes document data, and the user information is enclosed in the image information sp when the document data are distributed.

For example, an OS 406 of the publisher side manages user information for users A, B . . . X and manages OS management image files 404, 407, and 408 that have been created based on the respective user information. The publisher side creates an image file 402 and other digitized data 403 using various application programs 405, prepares the managing image file 404 for the user A that is managed by the OS 406, and distributes document data based thereon.

Registration to OS

Figure 42:
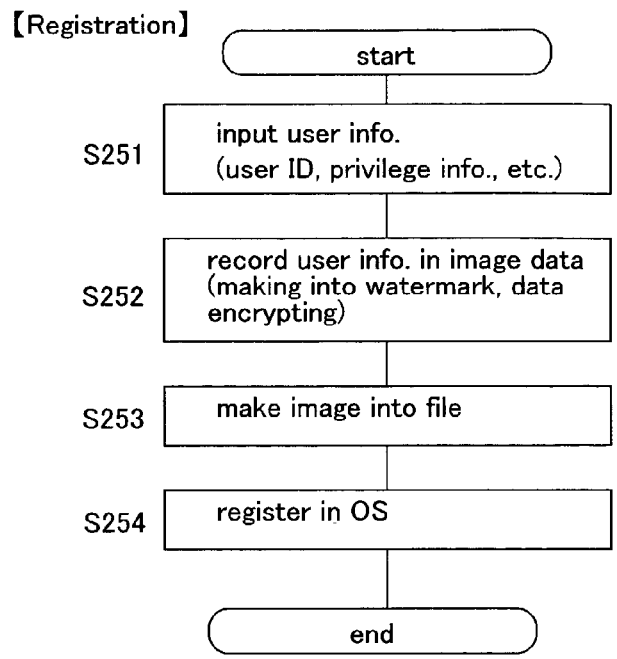
FIG. 42 is a flowchart depicting a process of registration of an OS registered image.

FIG. 42 shows a flowchart depicting the process for registering an OS management image file based on user information.

In step S251, user information is input. In this case, privilege information is input such as a user ID for identifying the user or permission information for the user.

In step S252, the user information is recorded in image data. In this case, the input user information is made into watermark data or is encrypted, and is then recorded in the image data. The image data may be any data selected arbitrarily by the publisher side, but it is also possible to use image data selected by the user.

In step S253, the image data are made into a file. In this case, the image data in which the user information is recorded are converted into a file format compatible with a database that is managed by the OS 406.

In step S254, the image file that contains the user information is registered in the database that is managed by the OS 406.

Access to the OS Registered Image File

Figure 43:
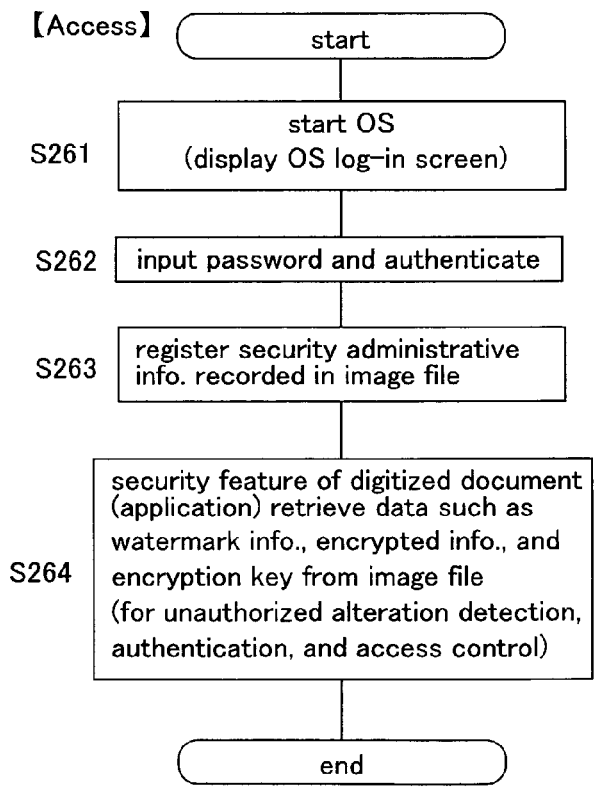
FIG. 43 is a flowchart depicting a process of access to an OS registered image.
Figure 44:
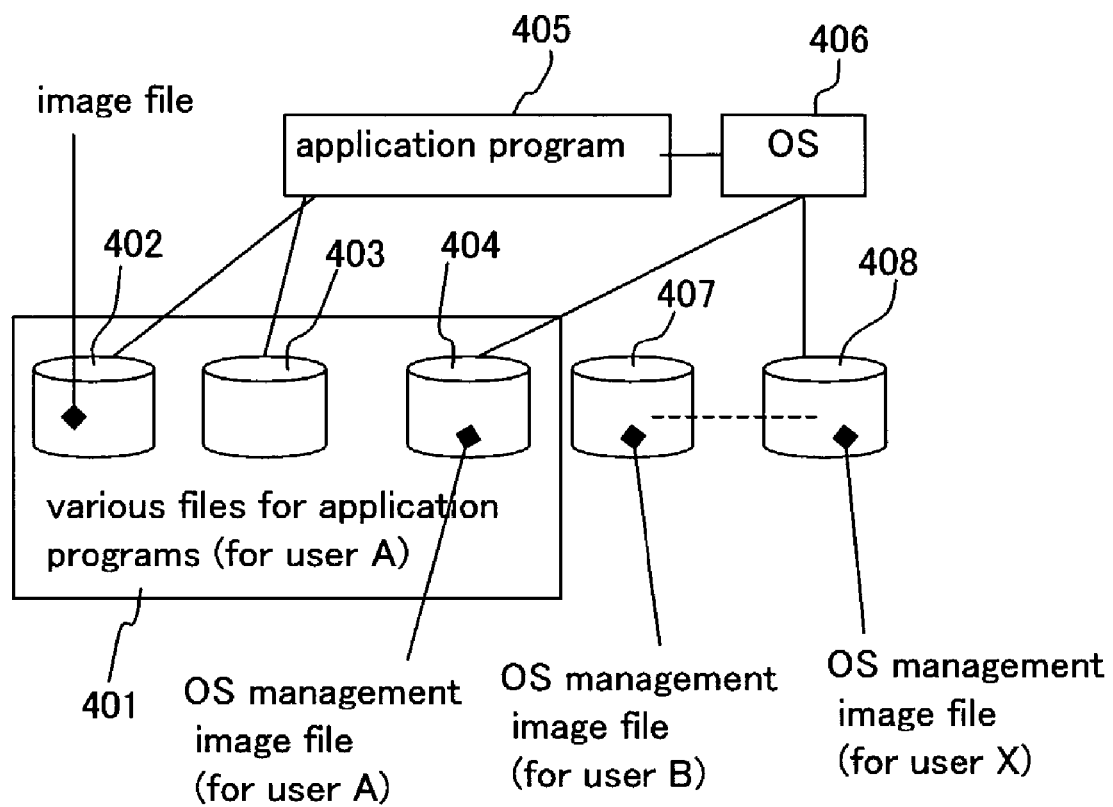
FIG. 44 is a control block diagram showing information management using an OS registered image.

FIG. 43 shows a flowchart depicting the process of accessing the image file that has been registered in the OS 406.

In step S261, OS is started and a log-in screen is displayed.

In step S262, password input is accepted and authentication is performed.

In step S263, security management data recorded in the image file are registered in the OS.

In step S264, data such as watermark data, encrypted data, and an encryption key are retrieved from the image file that is contained as the image information sp in the document data, and processes are performed such as unauthorized alteration detection, authentication, and access control process.

Creation of Document Data Using OS Registered Image

Figure 45:
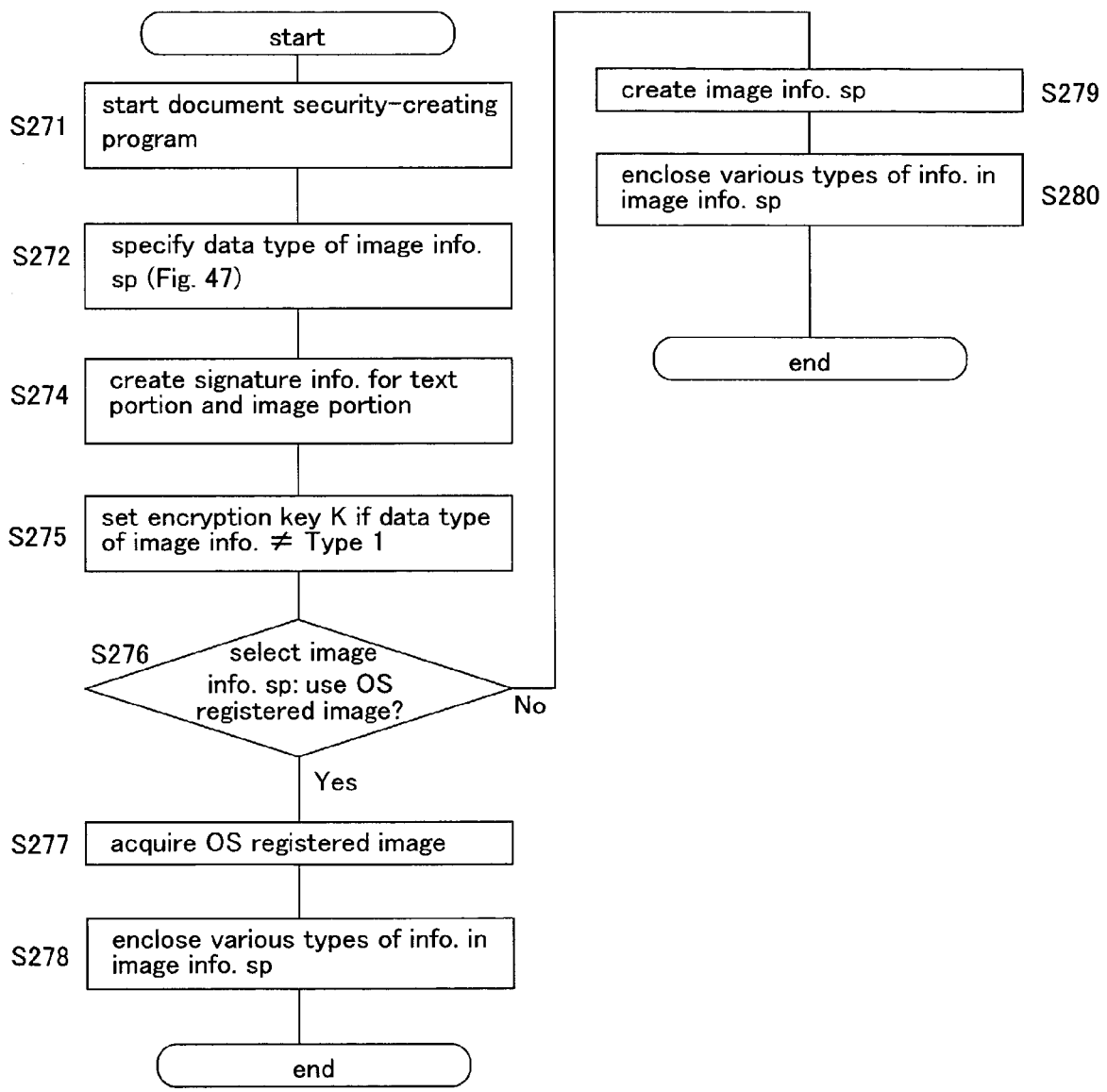
FIG. 45 is a flowchart for creating document data.

FIG. 45 shows a flowchart depicting the process of creating document data using the OS registered image.

In step S271, a document security-creating program is started.

Figure 46:
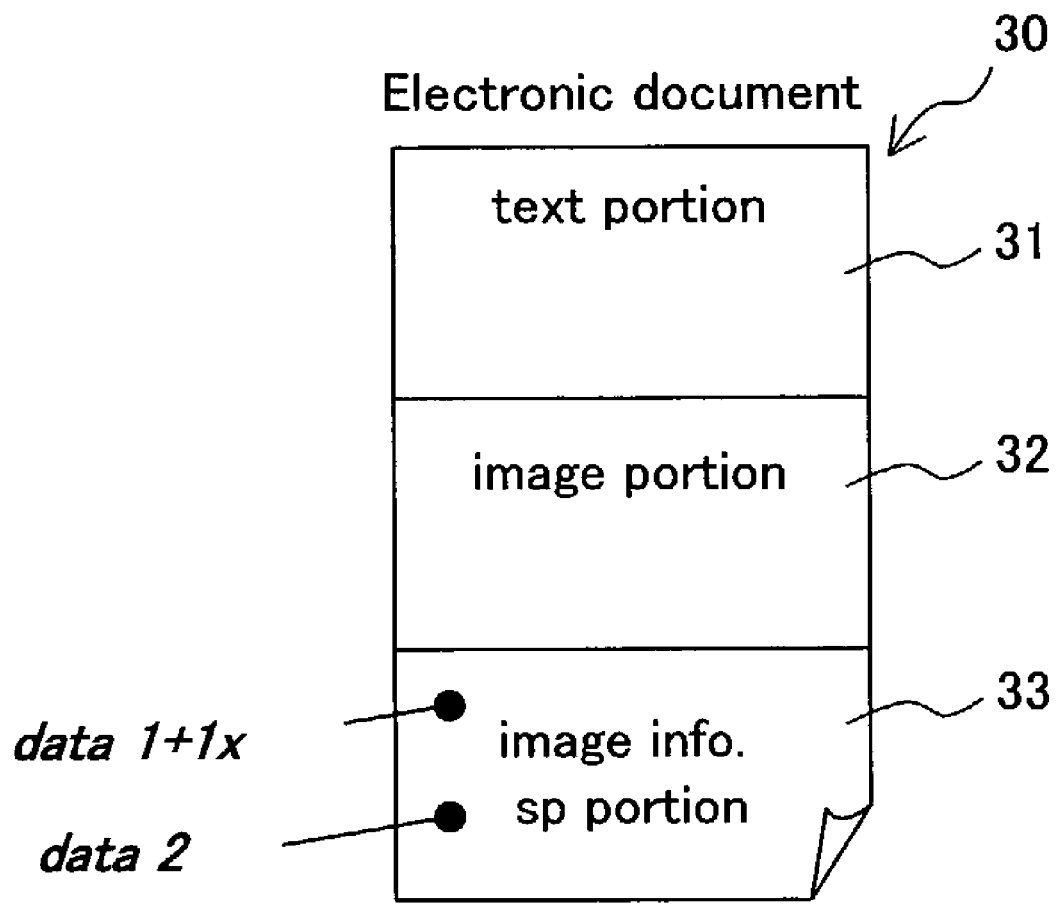
FIG. 46 illustrates the structure of document data.

In step S272, data type of the image information sp is specified. For example, document data 30 is considered containing a text portion 31, an image portion 32, and an image information sp portion 33 as shown in FIG. 46. As shown in FIG. 47, various types of data are conceivable for the image information 20.

Type 1 is such that signature information is created for the text portion 31 and the image portion 32, and the signature information is embedded as an invisible watermark (data 1X) into image data. In addition, the information to be signed is enclosed as (data 2X) in a data extension portion.

Type 2 is such that signature information is created from the text portion 31 and the image portion 32, then a secret encryption key and the signature information of the text portion 31 are embedded as an invisible watermark (data 1X) into image data, and the information to be signed/encrypted is enclosed as (data 2X) in a data extension portion.

Type 3 is such that signature information is created from the text portion 31 and the image portion 32, the signature information is embedded as an invisible watermark (data 1X) into image data, and the information to be singed/encrypted and the secret encryption key for the text portion 31 are enclosed as (data 2X) in an extension portion.

Type 4 is such that signature information is created from the text portion 31 and the image portion 32, a secret encryption key for the text portion 31 is embedded as an invisible watermark (data 1X) into image data, and the signature information and the information to be signed/encrypted are enclosed as (data 2X) in an extension portion.

In step S274, signature information is created from the text portion 31 and the image portion 32.

In step S275, an encryption key K is designated. When the data type of the image information sp is Type 1, it is not necessary to designate the encryption key K, so step S275 is skipped.

In step S276, image information sp is selected. When the OS registered image is used, the flow proceeds to step S277. When the OS registered image is not used, the flow proceeds to step S279.

In step S277, an OS registered image is acquired. In this case, an OS registered image is retrieved that designates the user information of the user who carries out distribution, and the retrieved OS registered image is designated as the image information sp.

In step S278, various types of information are enclosed in the image information sp. Various types of information are enclosed in the image information sp in accordance with the data type specified in step S272, and this process is carried out using the information-enclosing methods as illustrated in connection with FIGS. 30 to 35.

In step S279, given image data are selected for the image information sp, and administrative information-enclosing data are created.

In step S280, various types of information are enclosed in the image information sp. In this step as well, various types of information are enclosed in the image information sp in accordance with the data type specified in step S272, and the process can be carried out using the information-enclosing methods illustrated in connection with FIGS. 30 to 35.

Access to Document Data Using the OS Registered Image

Figure 48:
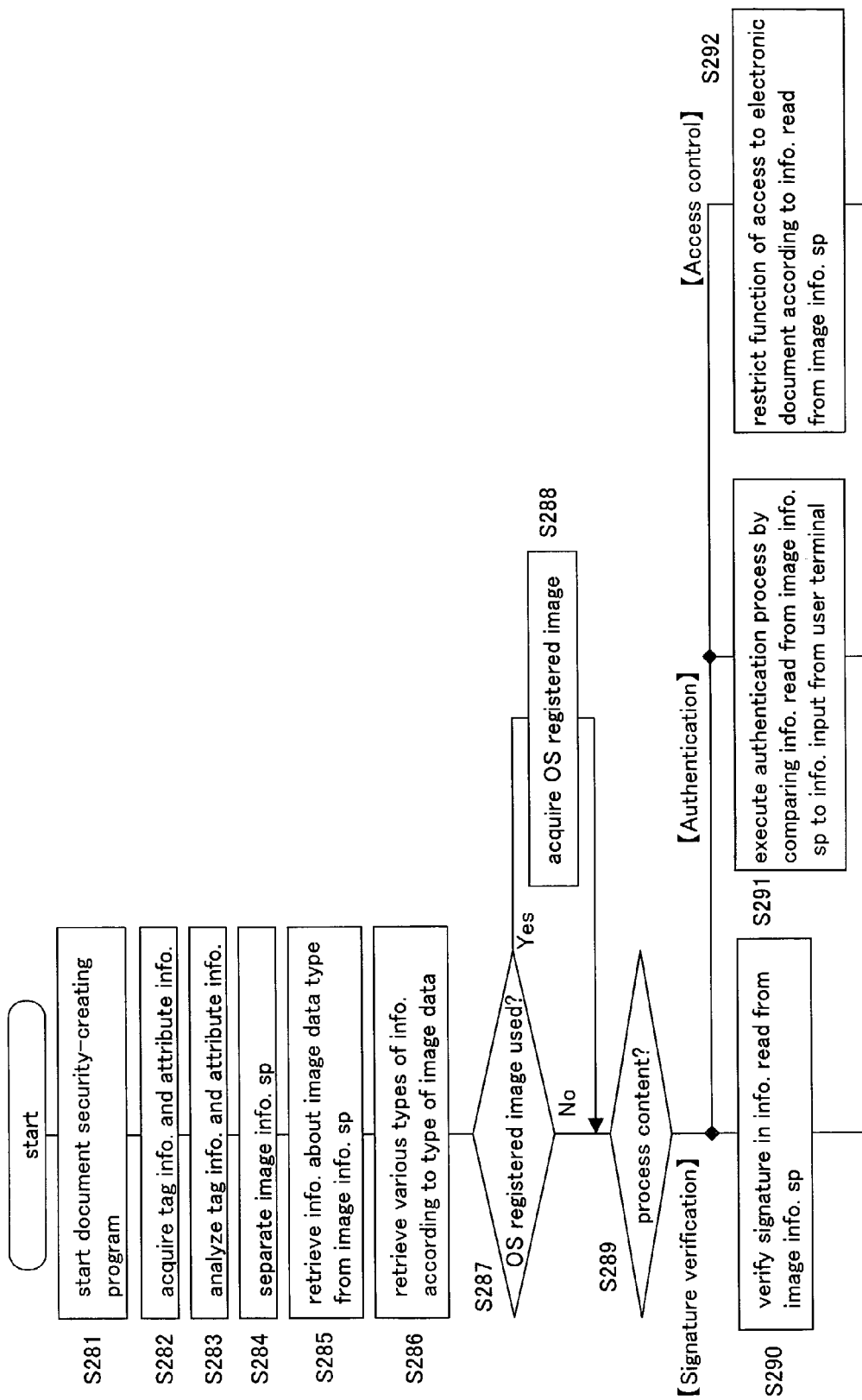
FIG. 48 is a flowchart for accessing document data.

FIG. 48 shows a flowchart depicting the process of accessing document data when the OS registered image is used in the distributed document data.

In step S281, a security feature program is started.

In step S282, document data are parsed, and tag information and attribute information inside the tags are acquired.

In step S283, the tag information and the attribute information are analyzed.

In step S284, image information sp is separated. Based on the result of the information analysis process for the tags and the attributes, image information sp is extracted.

In step S285, image data type-indicating information is retrieved from the image information sp. The information about image data type that is enclosed in the extension portion of the image information sp or the information about image data type that is embedded as watermark data in the image portion is extracted. If the information about the image data type is enclosed in the tag sp, it is also possible to use the information in the tag sp.

In step S286, various types of information enclosed in the image information sp are retrieved based on the information about image data type.

In step S287, it is determined whether an OS registered image is used or not. If it is determined that an OS registered image is used, the flow proceeds to step S288.

In step S288, the OS registered image is acquired. For example, the OS registered image can be acquired by accessing the server of the publisher via the Internet or the like and then downloading an OS registered image file therefrom.

In step S289, process content is determined. If a signature verification process is to be performed, the flow proceeds to step S290. If an authentication process is to be executed, the flow proceeds to step S291. If access control is to be performed, the flow proceeds to step S292.

In step S290, the verification process of signature information is executed by comparing the information that has been extracted from the image information sp to the information contained in the OS registered image.

In step S291, the user authentication process is executed by comparing the information that has been extracted from the image information sp to the information input from a user terminal.

In step S292, the access control process is executed by determining the access control information of the document data from the information that has been extracted from the image information sp.

Information Publication System

Figure 51:
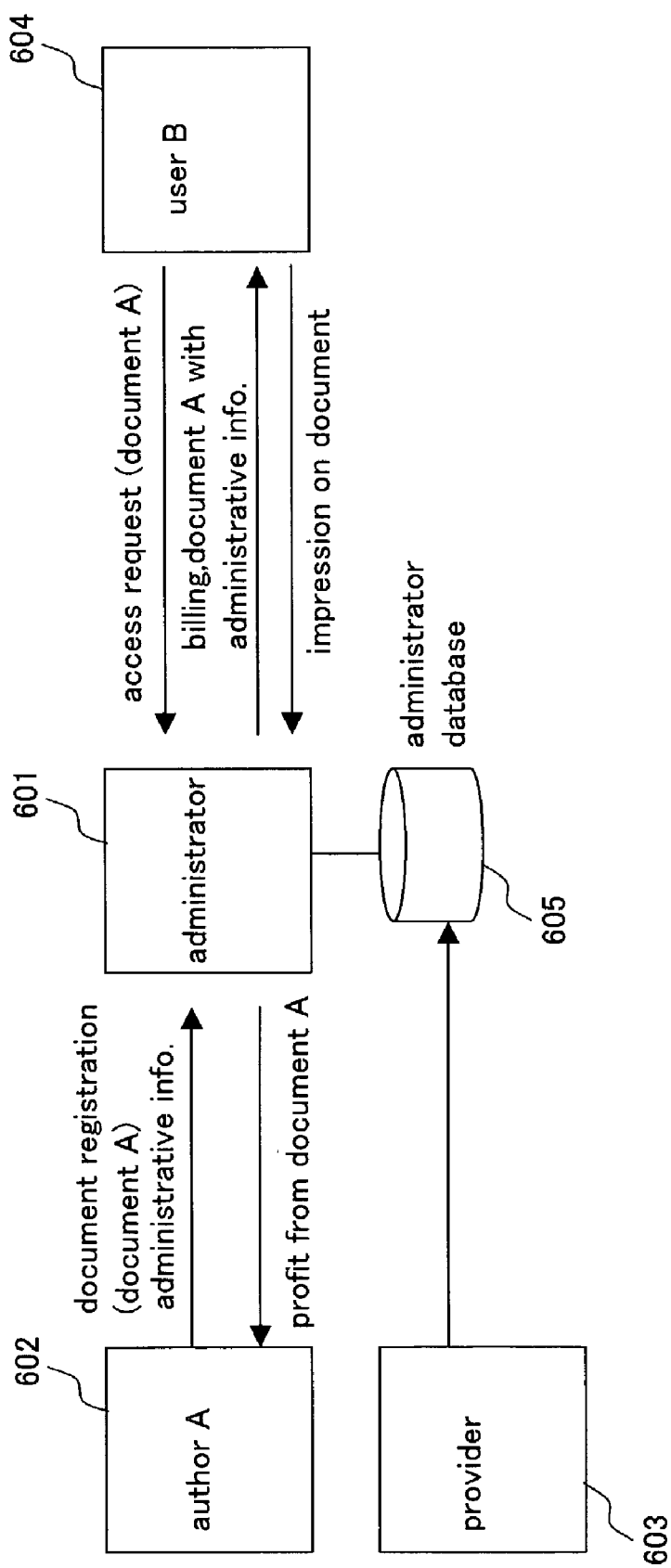
FIG. 51 illustrates an information publishing system.

A model of document data management in an information publication system is explained with reference to FIG. 51.

An author 602 sends a document, which is his/her own work, as well as administrative information to an administrator 601, and makes a registration request of a document A. In the administrative information that the author 602 submits to the administrator 601, billing information can be designated as access policy information for each document, as shown in FIG. 52.

The administrator 601 registers, in an administrator database 605, the document for which the author 602 has made a registration request, and publishes the registered document. In addition, the administrator 601 accepts an access request from a user 604 requesting access to published documents, and executes the billing process if the author 602 makes a billing request. After the billing process having been finished, the administrator 601 adds administrative information of the range specified by the author 602 to the document and sends it to the user 604. The administrator 601 passes the profit from the document to the author 602.

Figure 53:
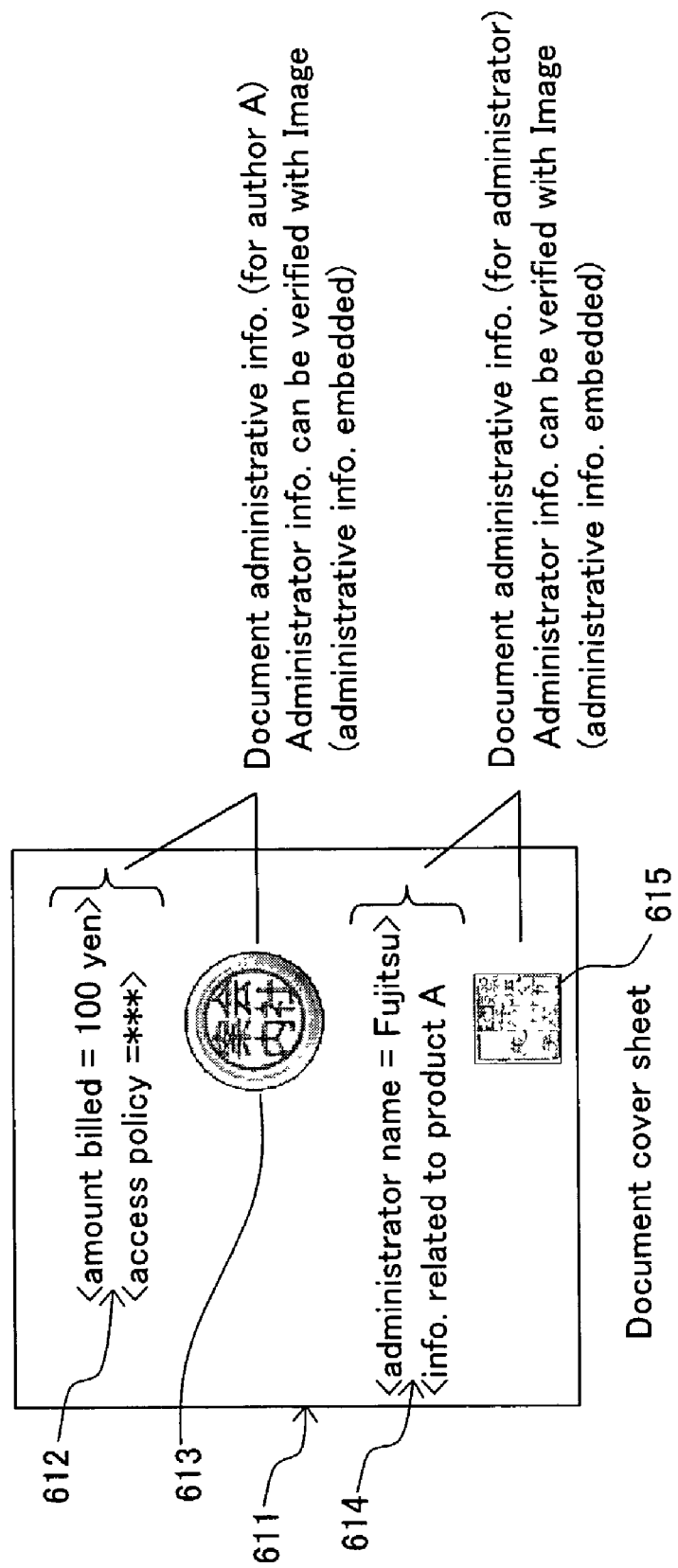
FIG. 53 illustrates an example of document data in which administrative information is embedded.

The administrative information attached to the document can be configured as shown in FIG. 53, for example. In this case, a document cover 611 is configured to display an administrative information-display portion 612 for displaying administrative information that the author 602 designates for the document, image data 613 in which the administrative information designated by the author 602 is embedded as watermark data, a document administrative information-display portion 614 for displaying document administrative information for the administrator, image information 615 in which the encrypted administrative information of the administrator 601 is embedded, and the like.

The administrator 601 creates a user log that records the user name, the time and date of access, the number of times of access, and the like, as shown in FIG. 52, and stores administrative information such as information about popularity ranking and the like in an administrator database 605. The administrative information maybe configured to contain such information as user's impression that is received from the user 604 or the like, and such information may be sent to the author 602 as needed.

With the permission of the administrator 601 or the author 602, a provider 603 who distributes documents obtains the right to publish the document and the privileged right to publish the production that are stored in the administrator database 605. The provider 603 may perform the distribution and the billing process of the documents on behalf of the administrator 601.

Flowchart of the Information Publishing System

Figure 68:
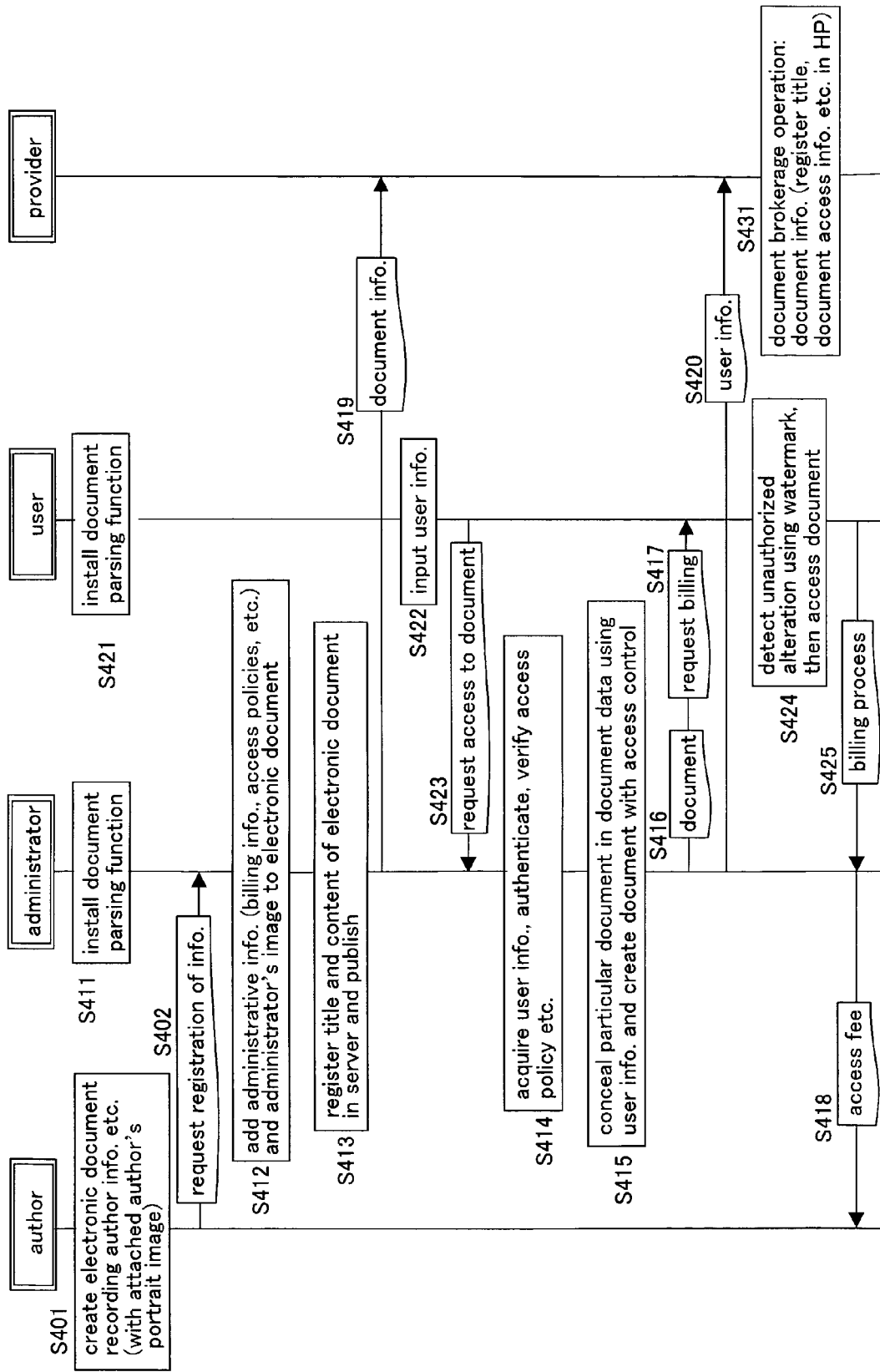
FIG. 68 is a flowchart of an information publishing system.

FIG. 68 shows the operation of each of the parties in this information publishing system.

The author creates document data in which author information and the like are recorded in step S401. In this case, document data are created in which the author's personal information, a portrait image of the author, the administrative information such as access policies, so forth are added to the author's own work.

In step S402, an information registration request is made to the administrator.

The administrator installs a document parsing function in step S411. In step S412, administrator information, a portrait image of the author, and so forth are added to the document data according to the registration request made from the author. In this case, billing information and administrative information such as an access policy are created and added to the document based on the administrative information such as the access policy that has been sent from the author.

In step S413, the title and content of the document data are registered in the server, and they are published.

The user installs a document-parsing function in step S421. In step S422, user information is input, and an access request to the document data is made in step S423 based on the input.

Based on the access request to the document data from the user, the administrator acquires the user information, performs user authentication, and verifies access policies and the like. In addition, a given document in the document data is concealed using the user information, and document data are created with the access control function added. Thereafter, in steps S416 and S417, document data are distributed and a billing request is made.

In step S424, the user carries out unauthorized alteration detection using the watermark data in the distributed document data and accesses the document. In step S425, a billing process is performed.

The administrator performs a process of passing access fees to the author based on the billing process from the user in step S418.

In step S419, the administrator sends the information of the document data, which is registered in the server, to the provider. In step S420, the administrator sends the user information to the provider.

In step S431, the provider carries out a document brokerage operation based on the information of the document data that has been obtained from the administrator.

Implementation of Security Features

Figure 54:
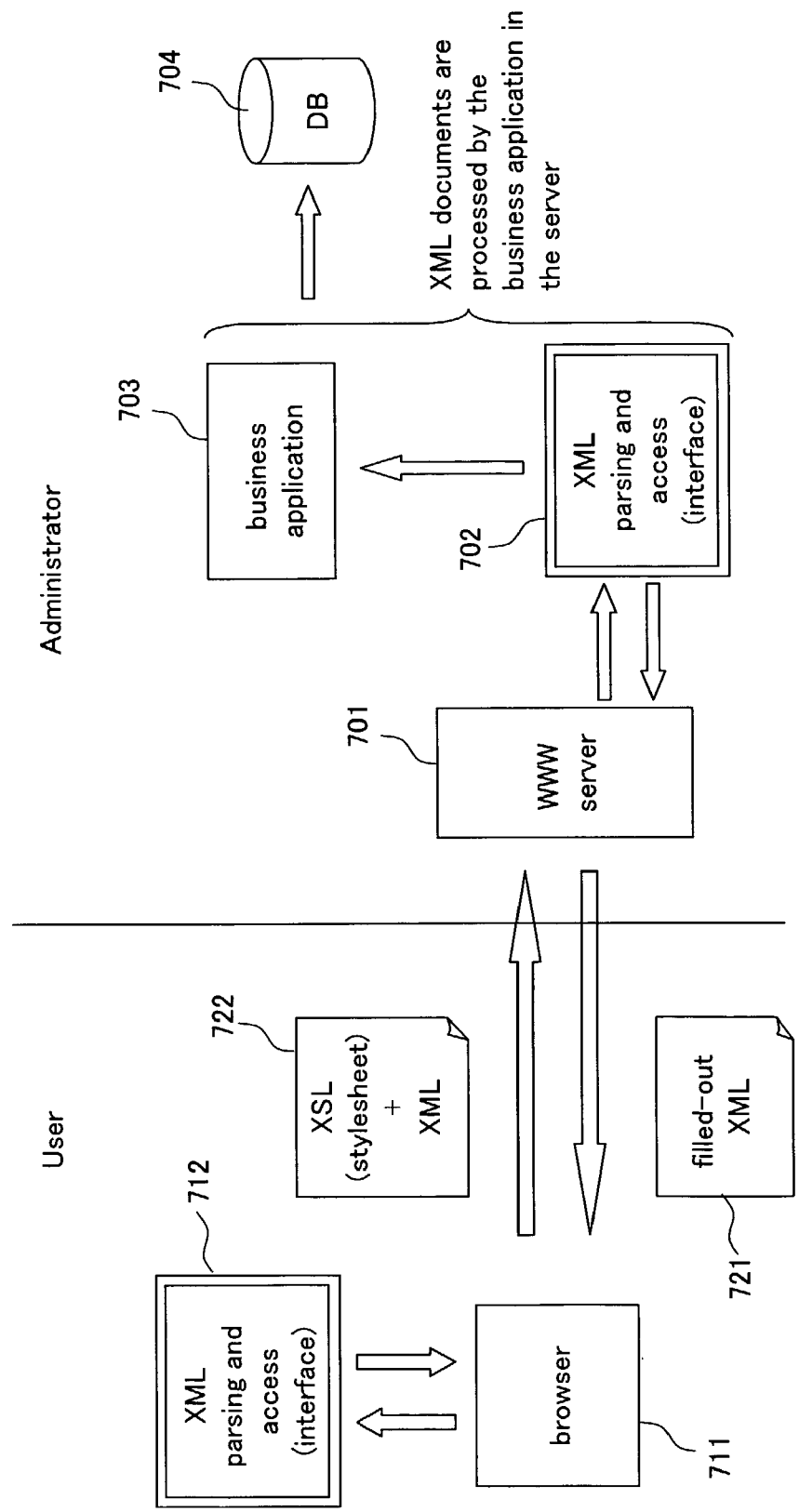
FIG. 54 illustrates an example of implementation of security features.

FIG. 54 shows an example of implementation of security features such as described above that are used when document data are distributed via a communication function such as the Internet.

An administrator side has a WWW server 701, an interface 702 that performs XML parsing and access, and a business application 703, which are linked to various types of databases 704.

A user side has a browser 711 by which various data distributed from the WWW server 701 can be browsed, and an interface 712 that performs XML parsing and access.

At the user side, document data 722 that have an XML document and an XSL style sheet and are distributed from the WWW server are displayed in the browser 711, and input data to the displayed data are returned to the WWW server 701 in the form of an XML document.

Encryption and Invisible Watermark

FIG. 55 shows an example of the tag sp used when browsing control is carried out by embedding encrypted secret information as the image information sp.

Figure 57:
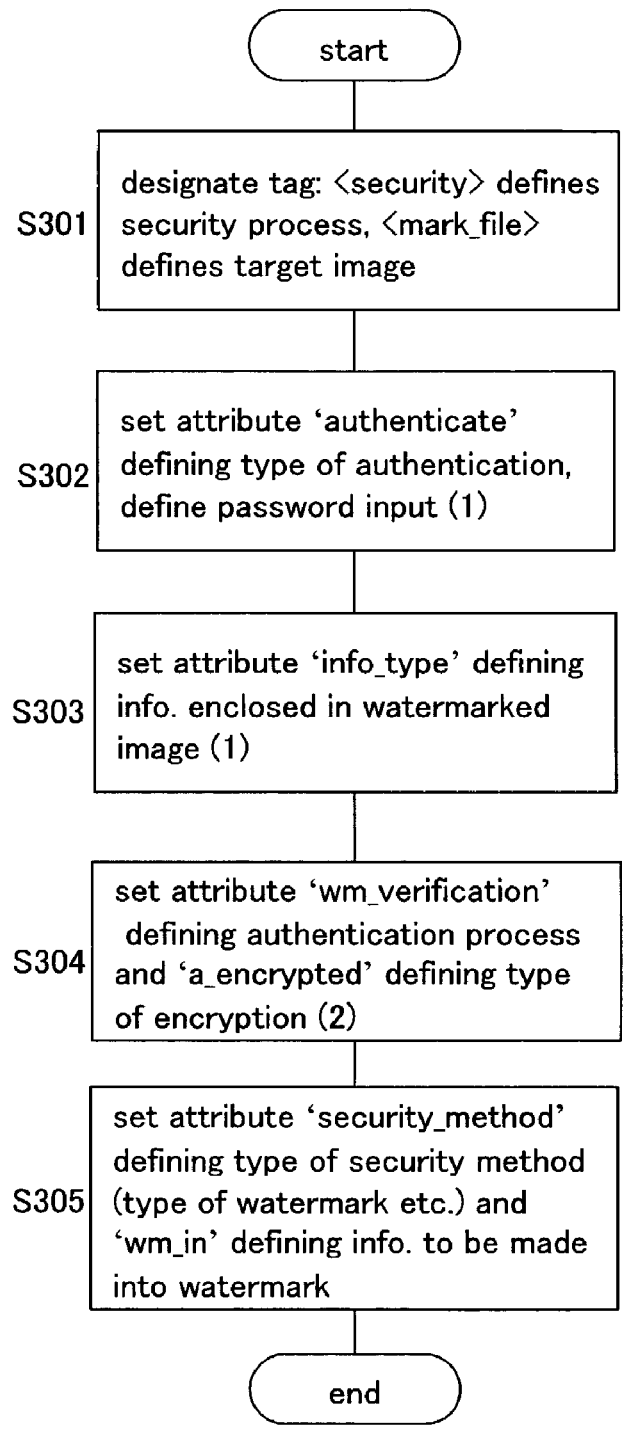
FIG. 57 is a flowchart for defining document types.

FIG. 57 shows a flowchart depicting the process of defining an XML document as shown in FIG. 55.

In step S301, tags are designated. In this step, a tag <security> for defining a security process and a tag <mark_file> for defining an object image are designated as the tags in the tag sp.

In step S302, in the tag <security>, "password" is set for an attribute 'authenticate' that indicates the type of authentication. In this case, the setting is made so as to accept user authentication information by the input from a keyboard.

In step S303, an attribute 'info_type' in the tag <security> is set to define information enclosed in the watermarked image data. Here, the attribute value "secret" indicates that the information is secret information, and the attribute value "authentication" indicates that authentication information is enclosed in the image specified by the tag <mark_file>.

In step S304, an attribute 'wm_verification' and an attribute 'a_encrypted' in the tag <security> are defined for indicating the process of authentication and for indicating the type of encryption, respectively. Here, "2001.8.30" set for the attribute 'wm_verification' indicates the expiry date of the authentication process, and "DES" set for the attribute 'a_encrypted' indicates that data were encrypted using DES encryption.

In step S305, an attribute 'security_method' and an attribute 'wm_in' in the tag <mark_file> are defined for indicating the type of security (such as the type of the watermark) and for defining the information embedded as watermark data, respectively. Here, "invisible_watermark_f" set for the attribute 'security_method' defines that the security method is an invisible watermark that meets the specification of Fujitsu Ltd., and "t0" set for the attribute 'wm_in' means that a file t0.txt is embedded.

FIG. 56 shows an example of the style sheet "demo.xsl" that is defined in "demo.xml" in FIG. 55. When displayed in a browser, "demo.xml" is displayed according to the content of the style sheet defined in the document.

Creation of Document Data

Figure 58:
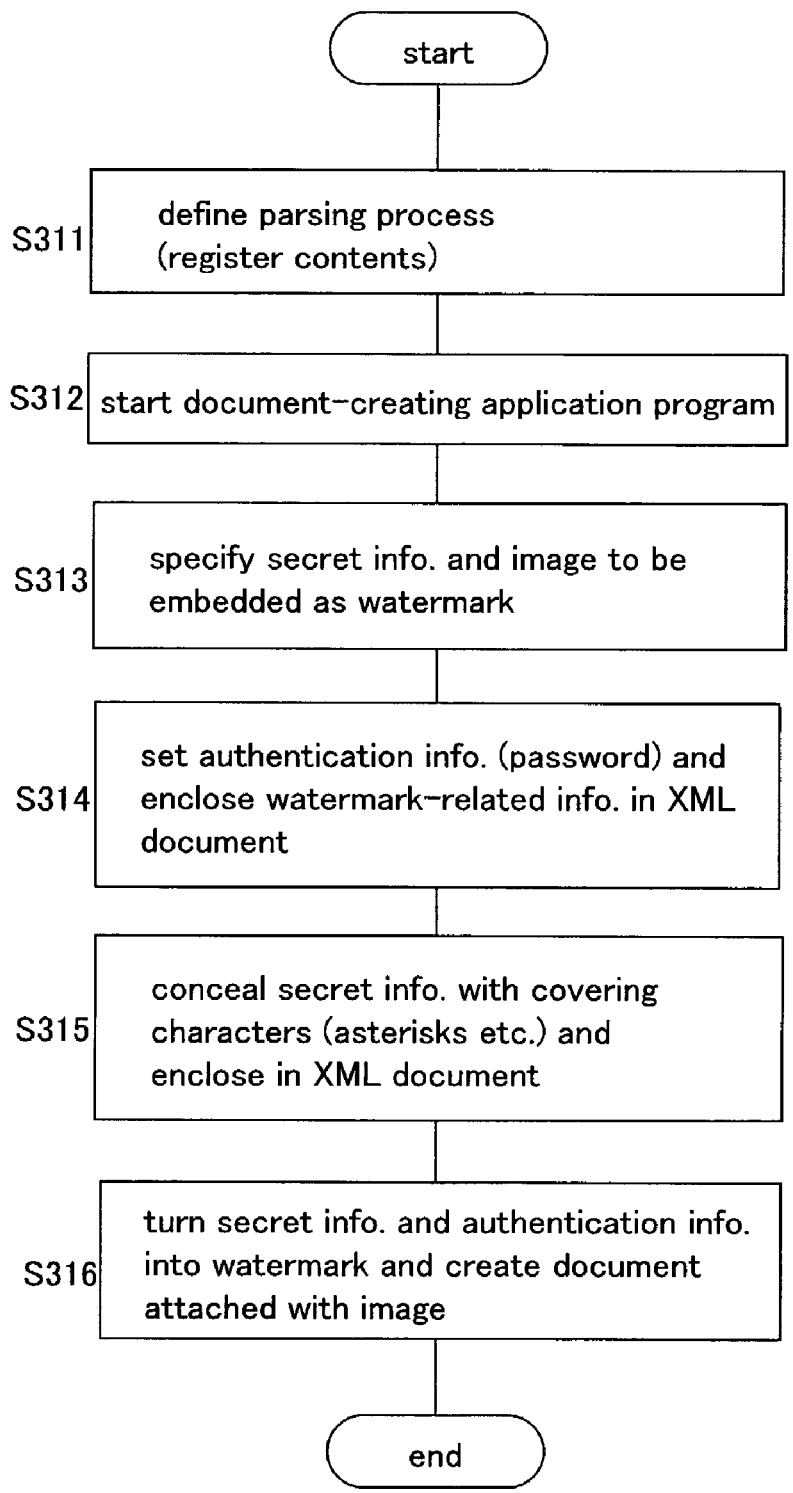
FIG. 58 is a flowchart for creating document data.

FIG. 58 shows a flowchart depicting the process of creating document data using encryption and invisible watermark.

In step S311, defining of a parsing process is performed. The contents of digitized data that are to be incorporated into the document data are registered, and preparation is made to create a structured document.

In step S312, a document-creating application program is started. For example, an XML parser is started and creation of a structured document is commenced.

In step S313, image data are specified in which secret information and invisible watermark data are to be embedded.

In step S314, authentication information is designated and watermark-related information is enclosed in the XML document. For example, a password is designated as the authentication information, and attribute values in the tags are set according to the procedure shown in FIG. 57.

In step S315, secret information is concealed with covering characters and is enclosed into the XML document. For example, the secret information set for an element of the tag <security> is concealed with covering characters as '******', and thus the data described in this element are made invisible.

In step S316, the secret information and the authentication information are turned into invisible watermark data and are embedded into the image data, and document data attached with image data are created.

Access to the Document Data

Figure 59:
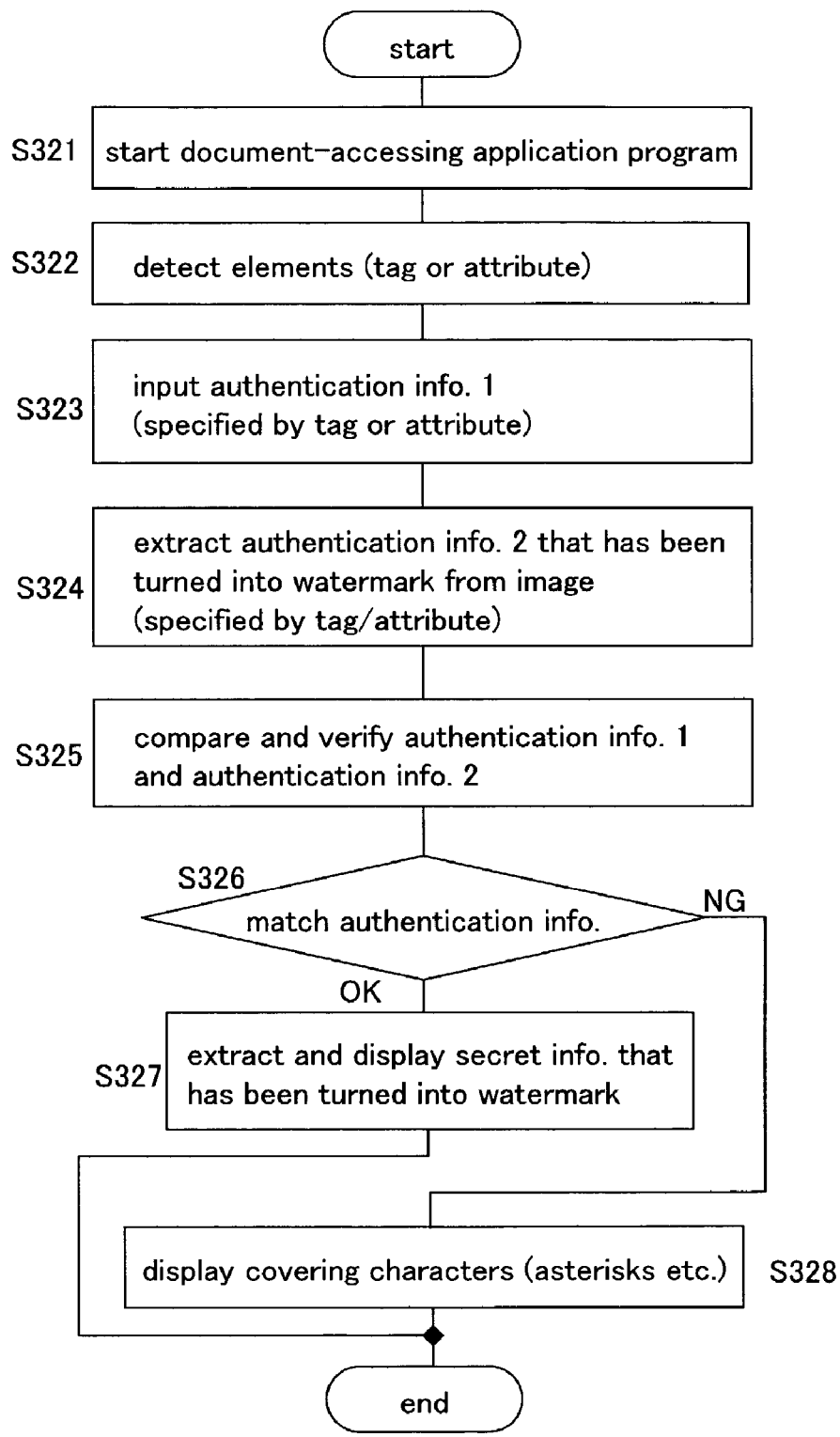
FIG. 59 is a flowchart for accessing document data.

FIG. 59 shows a flowchart depicting the process of accessing the document data using encryption and invisible watermark data.

In step S321, a document-accessing application program is started. An application program such as an XML parser is stared to parse a structured document, and preparation is made for accessing the document.

In step S322, elements and attributes in the tags are detected. In this step, the structured document is parsed and the elements and attributes described in the tags are analyzed.

In step S323, the authentication information is detected that is described as an element or an attribute in a tag.

In step S324, the invisible watermark data embedded in the image data are extracted, and the authentication information contained in the watermark data is detected.

In step S325, the authentication information that has been detected from the tag element or attribute is compared to the authentication information that has been extracted from the image data for verification.

In step S326, if the authentication information that has been detected from the tag element or attribute match the authentication information that has been extracted from the image data, the flow proceeds to step S327. If they do not match, the flow proceeds to step S328.

In step S327, the secret information embedded as invisible watermark data in the image data is extracted therefrom and displayed.

In step S328, the content of the secret information is displayed with covering characters.

Encryption, Invisible Watermark, and Signature Information

FIG. 60 shows an example of the tag sp in which secret information and signature information that have been encrypted as image information sp are embedded. In this example, the configuration is generally the same as that of "demo.xml" shown in FIG. 55, but the line indicated by (4) is added.

Figure 61:
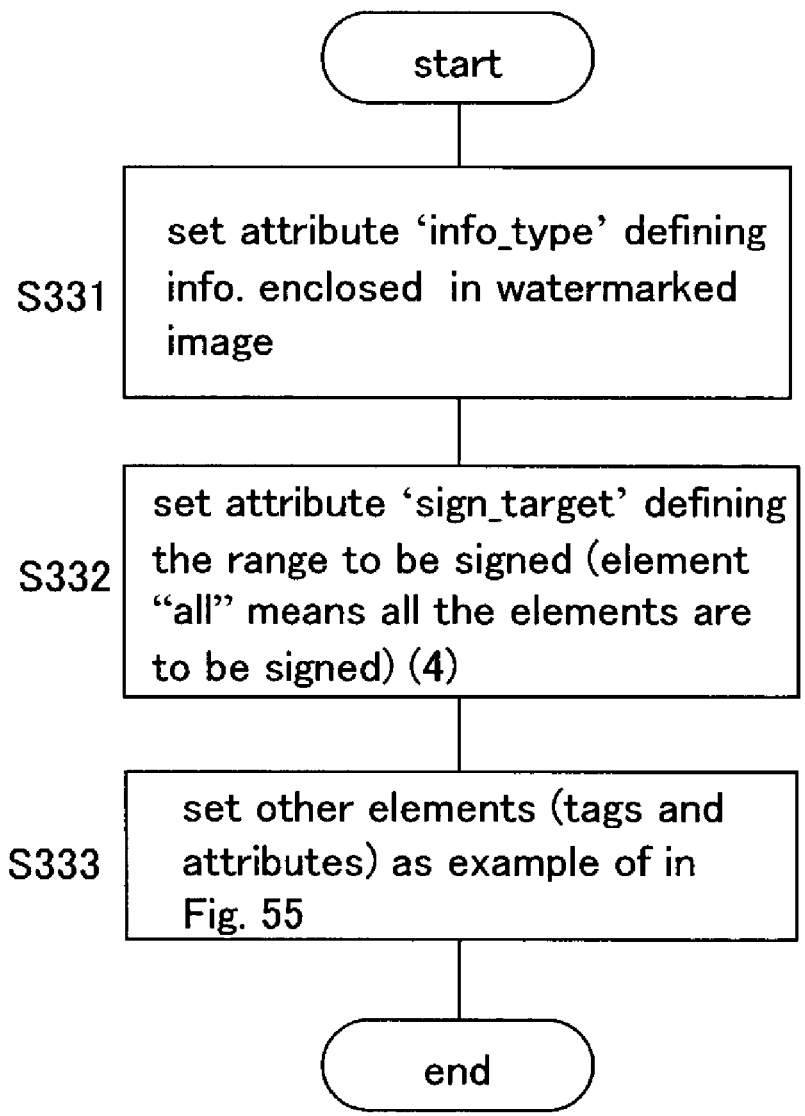
FIG. 61 is a flowchart for defining document types.

The process flowchart of this example is shown in FIG. 61.

In step S331, an attribute 'info_type' in the tag <security> is set for defining the information enclosed in the water-marked image data. Here, in a similar manner to step S303 of FIG. 57, an attribute value 'secret' and an attribute value 'authentication' is set for indicating that the information is secret information and for indicating that authentication information is enclosed in the image specified by the tag <mark_file>, respectively, and also, an attribute value 'sign' is set for indicating that signature information is enclosed in the image specified by the tag <mark_file>.

In step S332, an attribute 'sign_target' is set for defining the range to be singed. Here, the attribute value "all" set for the attribute 'sign_target' indicates that the information to be singed is all the elements in the XML document.

In step S333, other tag elements are set in a similar manner as the tag elements shown in FIG. 55.

Creation of Document Data having Encrypted Data and Signature Information

Figure 62:
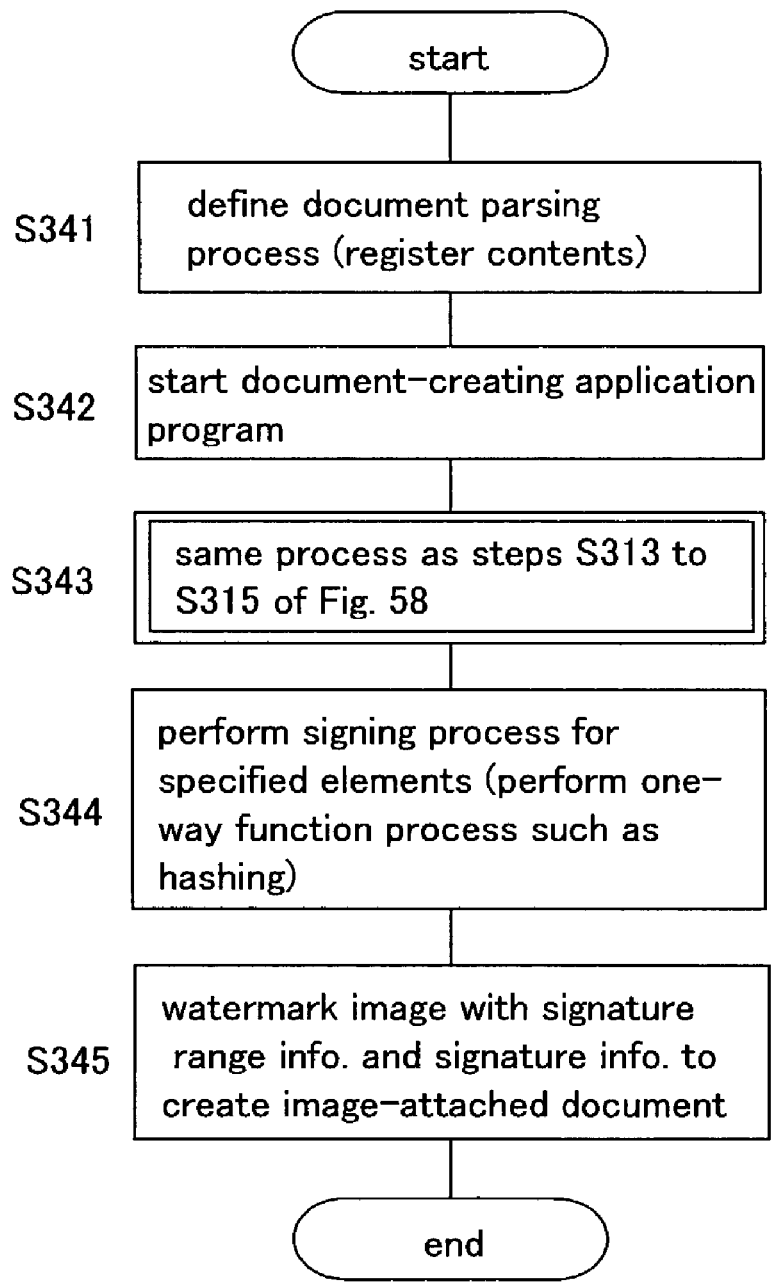
FIG. 62 is a flowchart for creating document data.

FIG. 62 shows a flowchart of the process of creating the document data in which encrypted data and signature information are turned into invisible watermark data.

In step S341, a parsing process is defined. The contents of digitized data that are to be document data are registered, and preparation is made to create a structured document.

In step S342, a document-creating application program is started. For example, an XML parser is started and creation of a structured document is commenced.

In step S343, processes are executed that are similar to steps S313 to S315 of FIG. 58.

In step S344, a digital signing process is performed for the specified elements. In this case, a one-way function process such as hash function is executed for all the elements in the XML document to create signature information.

In step S345, the signature range information and the signature information are embedded as invisible watermark data into image data to create image data-attached document data.

Access to the Document Data Having Encrypted Data and Signature Data

Figure 63:
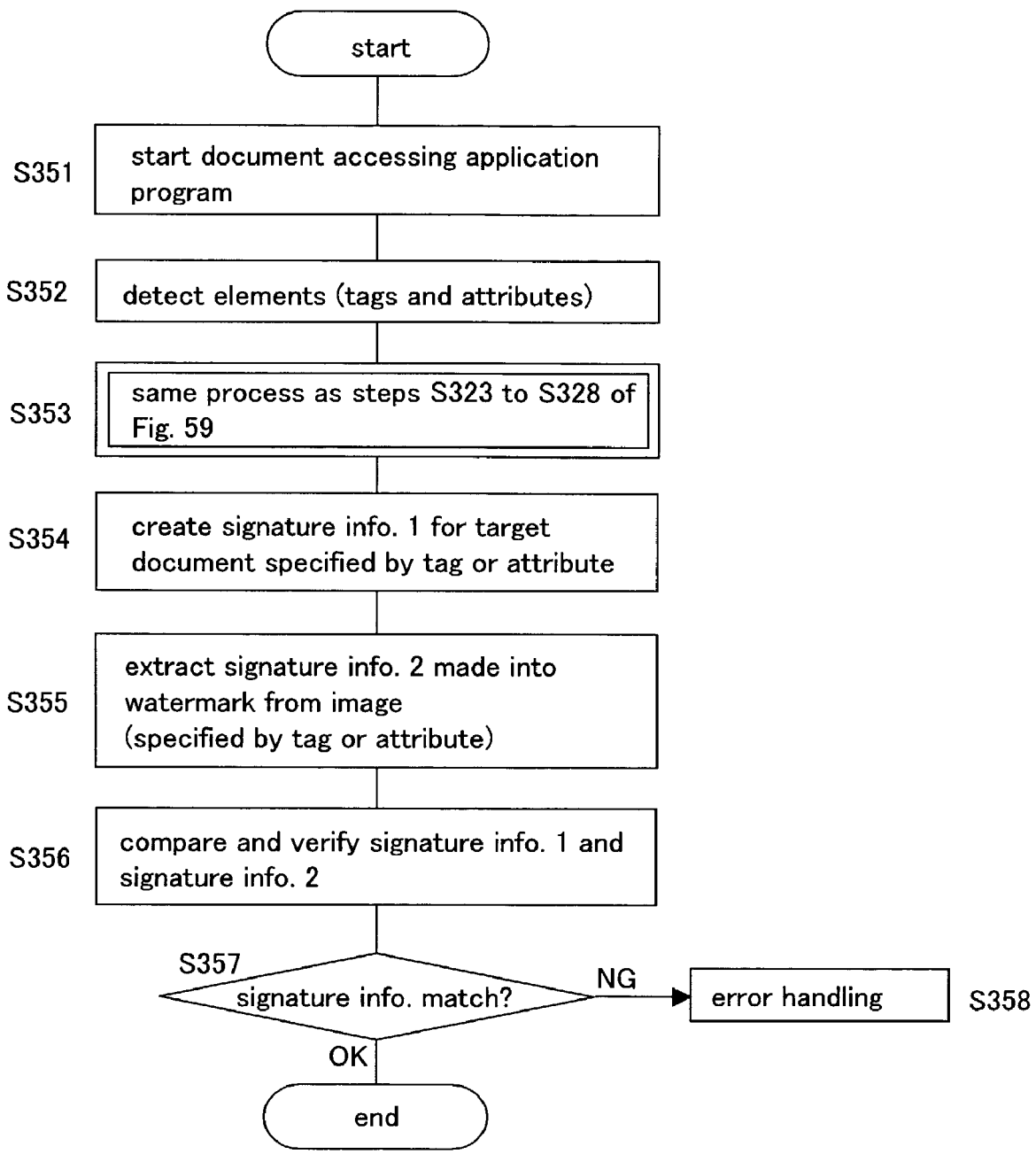
FIG. 63 is a flowchart for accessing document data.

FIG. 63 shows a flowchart of the process of accessing the document data having encrypted data and signature data.

In step S351, a document-accessing application program is started. For example, an XML parser is started to parse the structured document, and preparation is made for accessing the document.

In step S352, elements and attributes in the tags are detected. In this step, the structured document is parsed to analyze the elements and attributes described in the tags.

In step S353, a verification process for authentication information is performed in a similar manner to steps S323 to S328 of FIG. 59.

In step S354, signature information is created for the target document specified in the tag sp of the document data. Here, a hash value is computed for specified elements.

In step S355, the signature information embedded as watermark data in the image data is extracted therefrom.

In step S356, a verification process is performed by comparing the signature information created from the document data to the signature information extracted from the watermark data.

In step S357, if the signature information created from the document data matches the signature information extracted from the watermark data, the user is allowed to access the document. If they do not match, the flow proceeds to step S358.

In step S358, an error handling is performed. Conceivable examples of the error handling include such a process as giving a warning to the user by displaying a message showing that the signature information does not match, or giving a notification to the administrator.

Encryption and Visible Watermark

FIG. 64 shows an example of the tag sp of the document data in which invisible watermark data are embedded as the image information sp to prevent unauthorized access.

Figure 65:
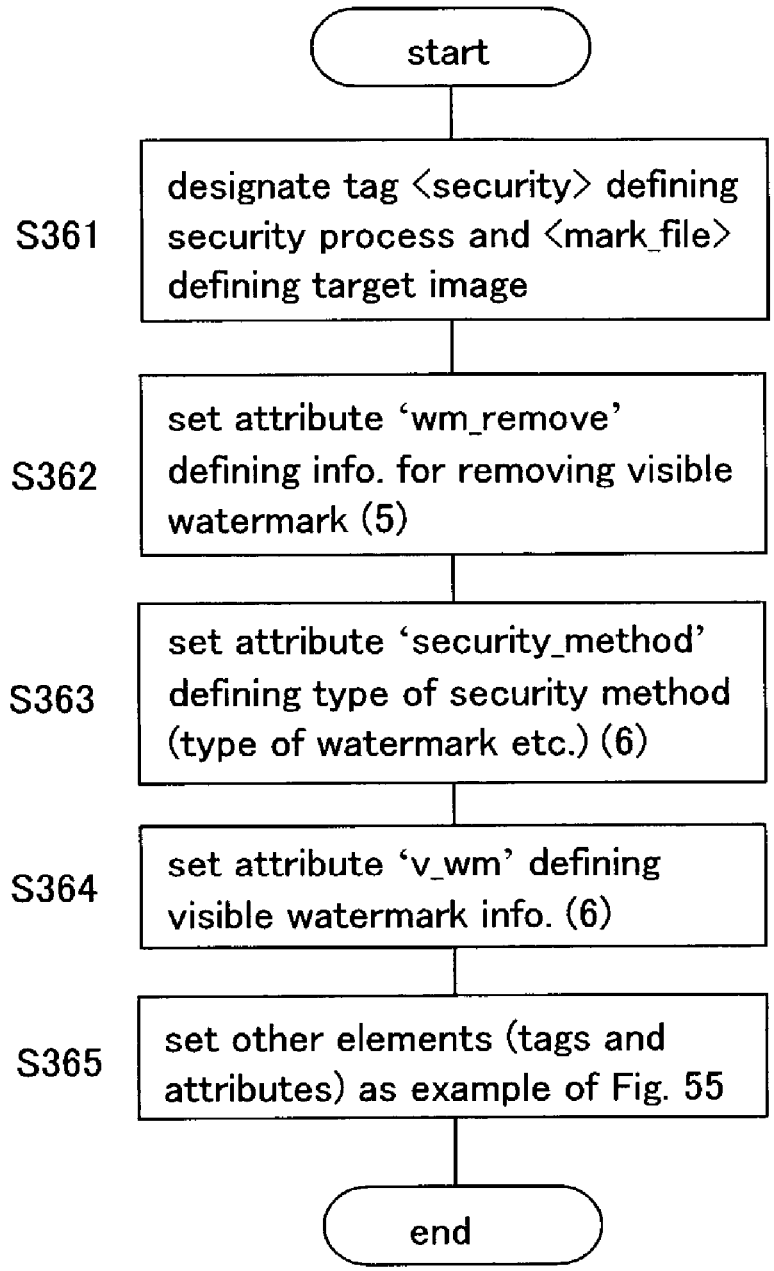
FIG. 65 a flowchart for defining document types.

FIG. 65 shows a flowchart depicting the process of defining the XML document shown in FIG. 64.

In step S361, tags are designated. Here, a tag <security> for defining a security process and a tag <mark_file> for defining a target image are designated as tags inside the tag sp.

In step S362, an attribute 'wm_remove' in the tag <security> is set for defining removal information of visible watermark data. Here, "@password" set for the attribute value of the attribute 'wm_remove' defines the information (encrypted password information that has been input) for removing visible watermark data 'FJ'.

In step S363, an attribute 'security_method' is set for defining a security type in the tag <security>. The attribute value 'visible_watermark_f' set here indicates visible watermark data that meet the specification of Fujitsu Ltd.

In step S364, an attribute 'v_wm' in the tag <mark_file> is set for defining the information of the visible watermark data. Here, 'FJ' set for the attribute 'v_wm' indicates that the visible watermark data are 'FJ'.

In step S365, other elements and attributes are set in a similar manner to those in the document data shown in FIG. 55.

Creation of the Document Data

Figure 66:
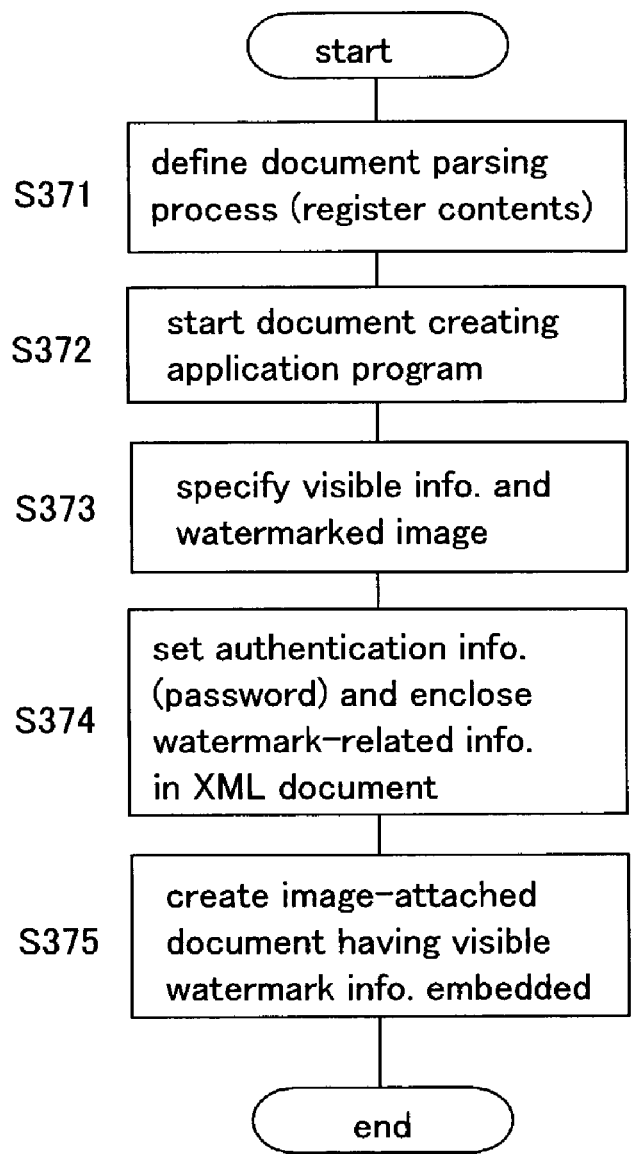
FIG. 66 is a flowchart for creating document data.

FIG. 66 shows a flowchart depicting the process of creating the document data using encrypted data and visible watermark data.

In step S371, a document parsing process is defined. The contents of the digitized data that are to be document data are registered, and preparation is made to create a structured document.

In step S372, a document-creating application program is started. For example, an XML parser is started to create a structured document.

In step S373, visible watermark data and image data in which the data are embedded are specified.

In step S374, authentication information is set, and watermark-related information is enclosed in an XML document. For example, 'password' is set for the authentication information, and the attribute values inside the tags are set according to the procedure shown in FIG. 65.

In step S375, visible water mark data are produced and embedded into the image data to create document data with attached image data.

Access to the Document Data

Figure 67:
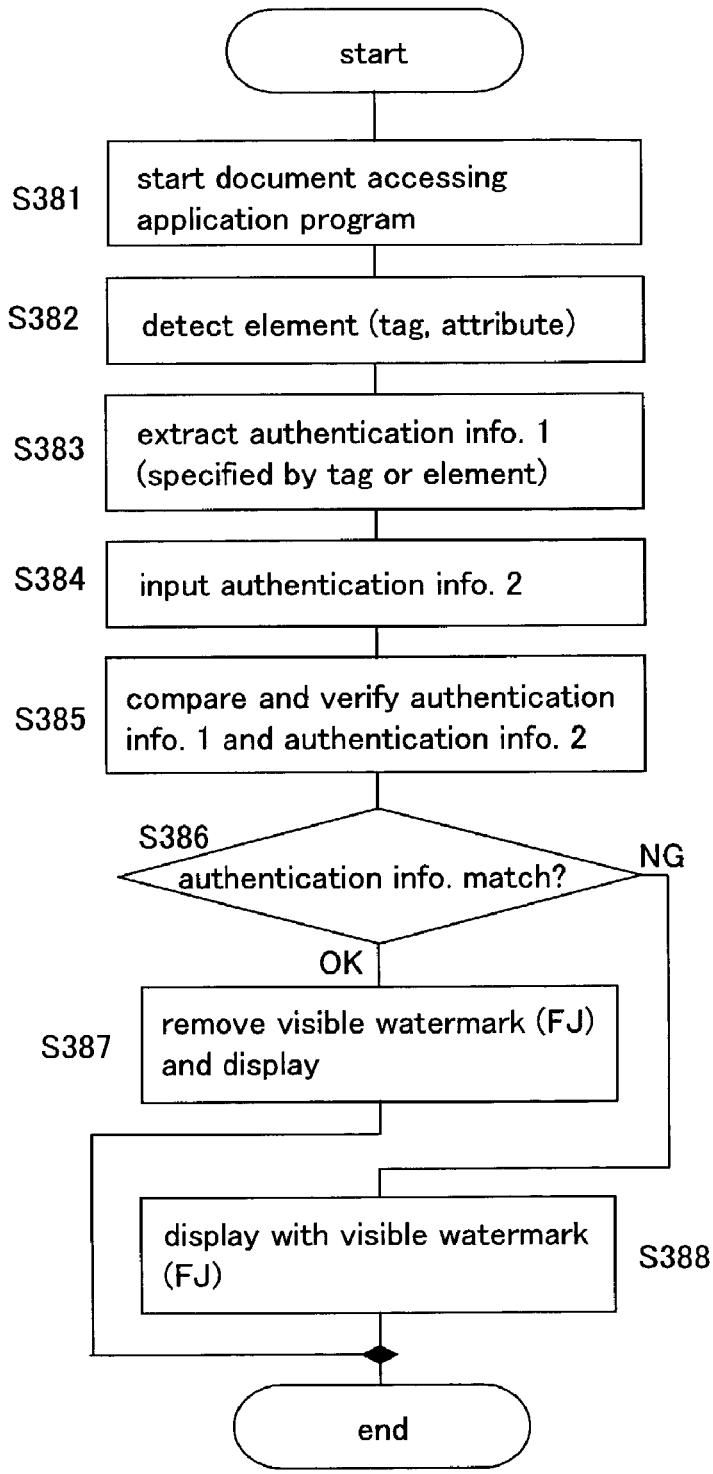
FIG. 67 is a flowchart for accessing document data.

FIG. 67 shows a flowchart depicting the process of accessing the document data employing encrypted data and visible watermark data.

In step S381, a document-accessing application program is started. For example, an application such as an XML parser is started to parse the structured document, and preparation is made for accessing the document.

In step S382, elements and attributes are detected in the tags. In this case, the structured document is parsed to analyze the elements and attributes described in the tags.

In step S383, authentication information is detected that is described as an element or an attribute in a tag.

In step S384, authentication information that is input by the user is accepted.

In step S385, the authentication information detected from the element or attribute in the tag is compared to the authentication information input by the user for verification.

In step S386, if the authentication information detected from the element or attribute in the tag matches the authentication information input by the user, the flow proceeds to step S387. If they do not match, the flow proceeds to step S388.

In step S387, the visible watermark data are removed, and image data are displayed.

In step S388, image data are displayed as the visible watermark data remain embedded.

Document Access Control

Figure 70:
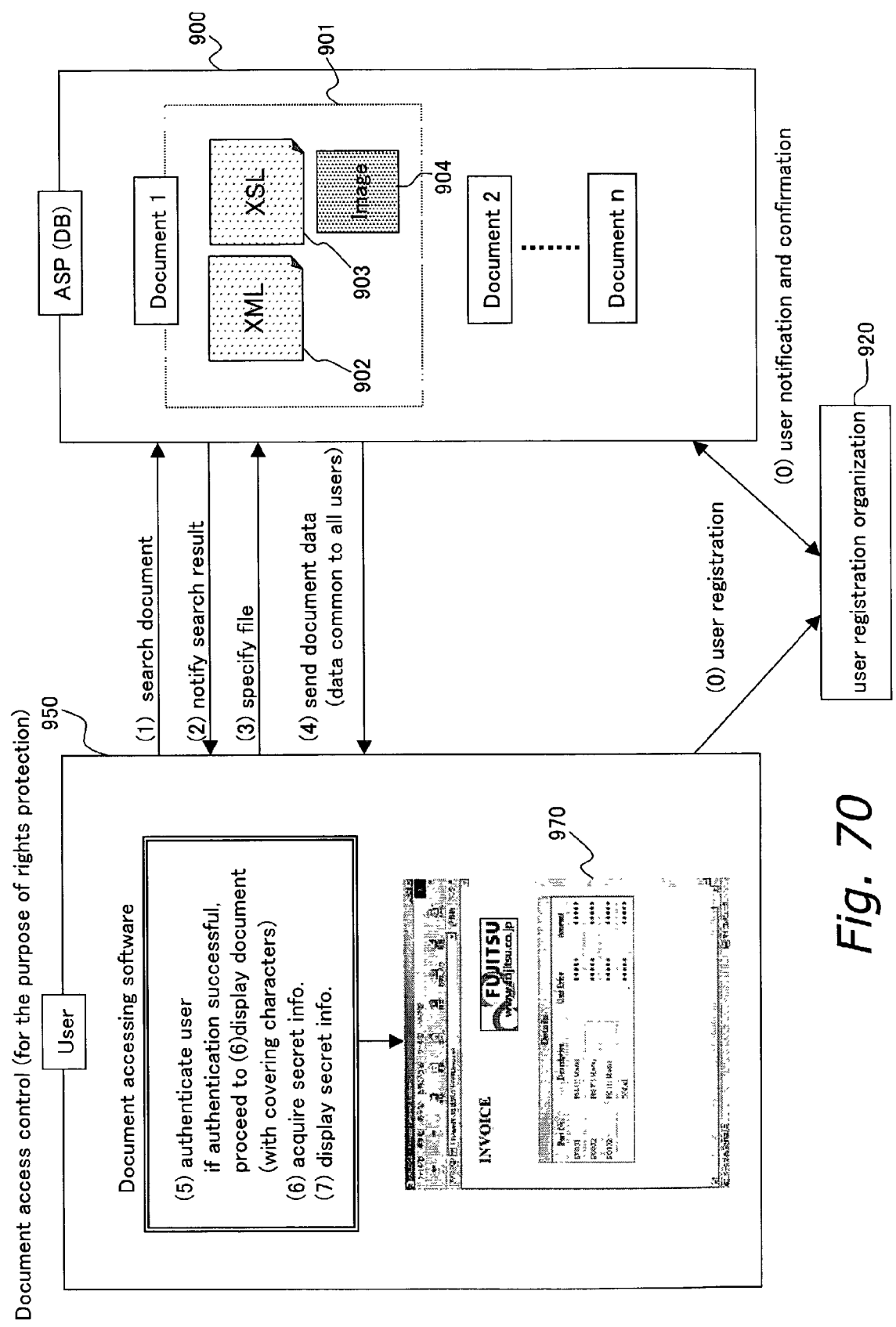
FIG. 70 illustrates an example in which access control to documents is performed.

FIG. 70 shows an example of document access control that is performed for the purpose of right protection.

In a server 900 of the administrator side, a database is built in which a plurality of documents 901 are managed. Each of these documents 901 includes a structured document (XML document) 902, a style sheet (XSL document) 903, and image data 904 having secret information in the form of electronic watermark.

In a user computer 950 of the user side, an application software is installed for accessing the documents 901 that are managed by the server 900 of the administrator side, and this application is used for searching for, downloading of, and accessing the documents are carried out.

The user computer 950 performs user registration with a user registration organization 920 in order to access the documents in the database of the server 900. Here, personal information or the like of the user is sent to the user registration organization 920, and notification of the user information is sent from the user registration organization 920 to the administrator's server 900.

The user computer 950 accesses the server 900 of the administrator side via the Internet network, public switched networks, or other networks and performs a document search process. In this case, for example, it is possible to use existing search engines for the search. It is also possible to use a search engine provided in the server 900 for the search.

The result of the search performed based on the categories, keywords, or the like that have been notified from the user computer 950 is notified from the server 900 to the user computer 950. The notification of the search result is displayed in a browser or the like of the user computer 950 so that it can be recognized by the user.

When the user selects a document that he or she desires to access among the notifications of the search results displayed on the user computer 950 side, file-specifying information is sent to the server 900.

Based on the file-specifying information sent from the user computer 950, the server 900 creates image data 904 that corresponds to the user based on the user information notified from the user registration organization 920, and then sends the document 901 to the user computer 950.

In the user computer 950, authentication process is carried out by allowing the user to input a password or other user authentication information. If the user authentication has not been completed successfully as the result of the authentication process, the portion of the secret information is concealed by covering characters, such as asterisks.

If the user authentication has been completed successfully, the secret information is acquired. For example, the secret information embedded as an electronic watermark in the image data 904 is retrieved. If the secret information has been encrypted, the information is decrypted.

If the secret information is successfully acquired, the secret information is integrated with the document data and displayed.

Figure 71:
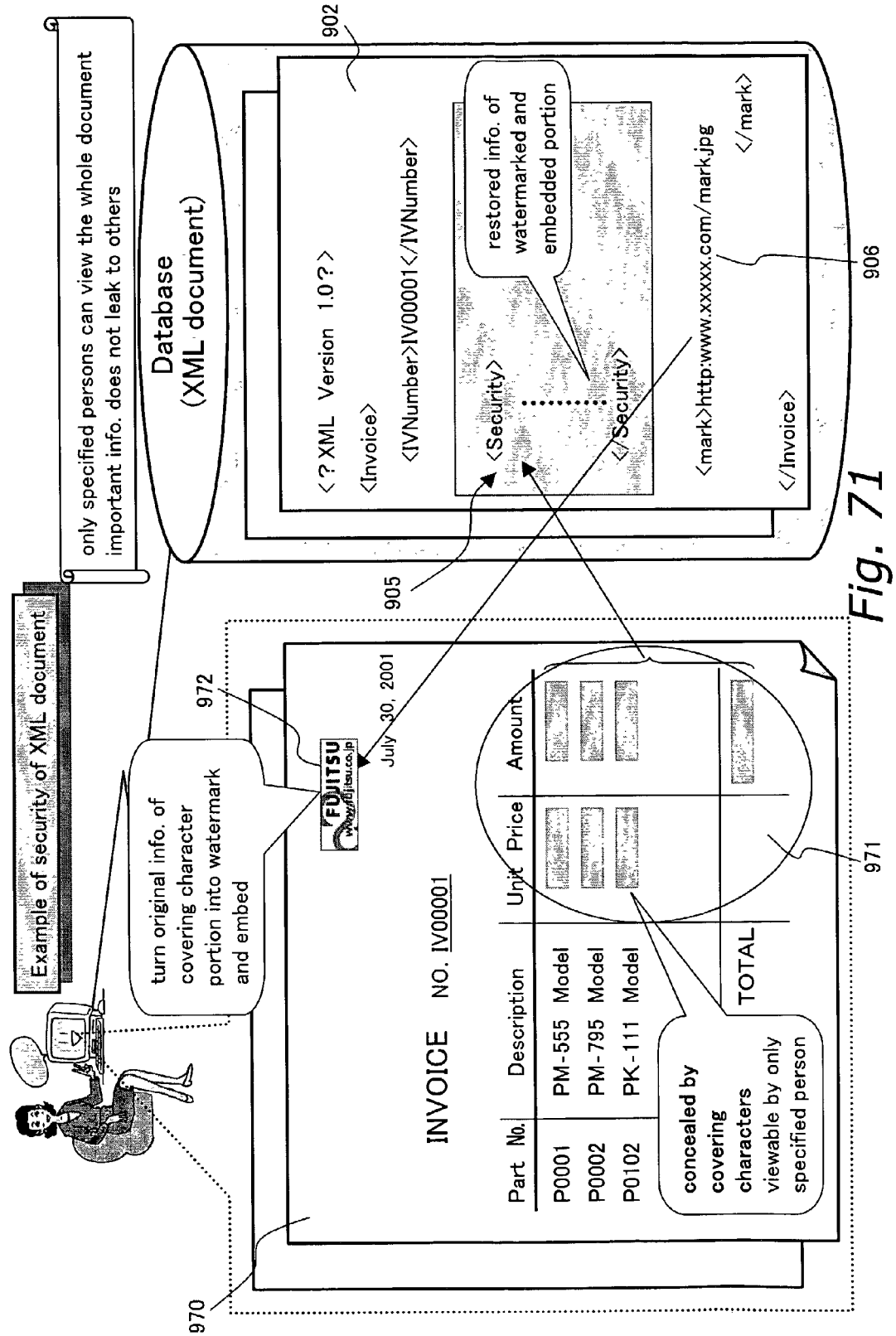
FIG. 71 illustrates an example of security for an XML document.

As an example, a configuration as shown in FIG. 71 is discussed in which the structured document 902 in the database managed by the server 900 contains restoring information 905 for an electronic watermark and enclosed information 906 that indicates the location of the original information that has been embedded as an invisible watermark.

In this case, the document 901 that is sent to the user computer 950 based on the file-specifying information from the user side contains the structured document 902, the style sheet 903, and the image data 904 in which secret information is embedded as an electronic watermark. On the user computer 950, a display document 970 is displayed having an image display portion 972 for displaying image data containing the original information of the secret information in the form of an electronic watermark and a secret information display portion 970 for displaying either covering characters or the original information of the secret information.

Figure 72:
FIG. 72 illustrates an example of a display based on the result of user authentication.
Figure 73:
FIG. 73 illustrates an example of a display based on the result of user authentication.

If the user authentication is unsuccessful, the secret information display portion 971 of the display document 970 displays covering character display 973, as shown in FIG. 72. On the other hand, if the user authentication is successful, the secret information display portion 971 of the display document 970 displays original information 974, as shown in FIG. 73.

In this configuration, the original information of secret information is displayed only to rightful users, and rights protection is achieved for copyright owners and distribution right owners. In addition, a configuration is possible in which user authentication is required each time the document is accessed even after the document has been downloaded to the user computer 950 at the user side. Thus, unauthorized access is difficult to carry out, and it is possible to reduce damages to the benefits of copyright owners and distribution right owners.

Acquisition of Access Control Information from Printed Matter

The following describes a data management apparatus in which an image with access control information embedded as an invisible watermark is captured as digitized data with the user of a digital camera, an image scanner, or the like so that the data can be accessed.

Figure 74:
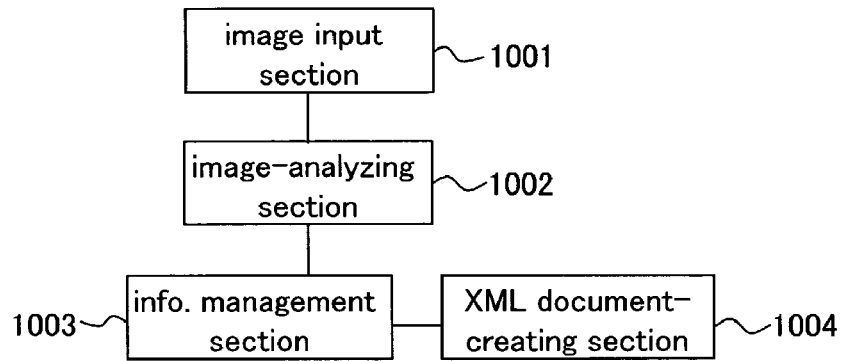
FIG. 74 is a functional block diagram showing the schematic construction of a document management apparatus for performing data access in a printed matter or the like in which watermark data are embedded.

FIG. 74 is a functional block diagram showing a schematic construction of the data management apparatus.

This data management apparatus has an image input section 1001, an image analyzing section 1002, an information management section 1003, and an XML document-creating section 1004. The image input section 1001 is for acquiring digitized data. The image analyzing section 1002 analyzes the digitized, data captured by the image input section 1001 and extract access control information therefrom. The information management section 1003 acquires document data made of text data, image data, music data, and/or other digitized data that correspond to the access control information extracted by the image analyzing section 1002. The XML document-creating section 1004 creates a structured text based on the document data acquired by the information management section 1003.

The image input section 1001 acquires digitized data that have been converted by a digital camera, an image scanner, or the like, which contain an image having access control information embedded as an invisible watermark.

Figure 75:
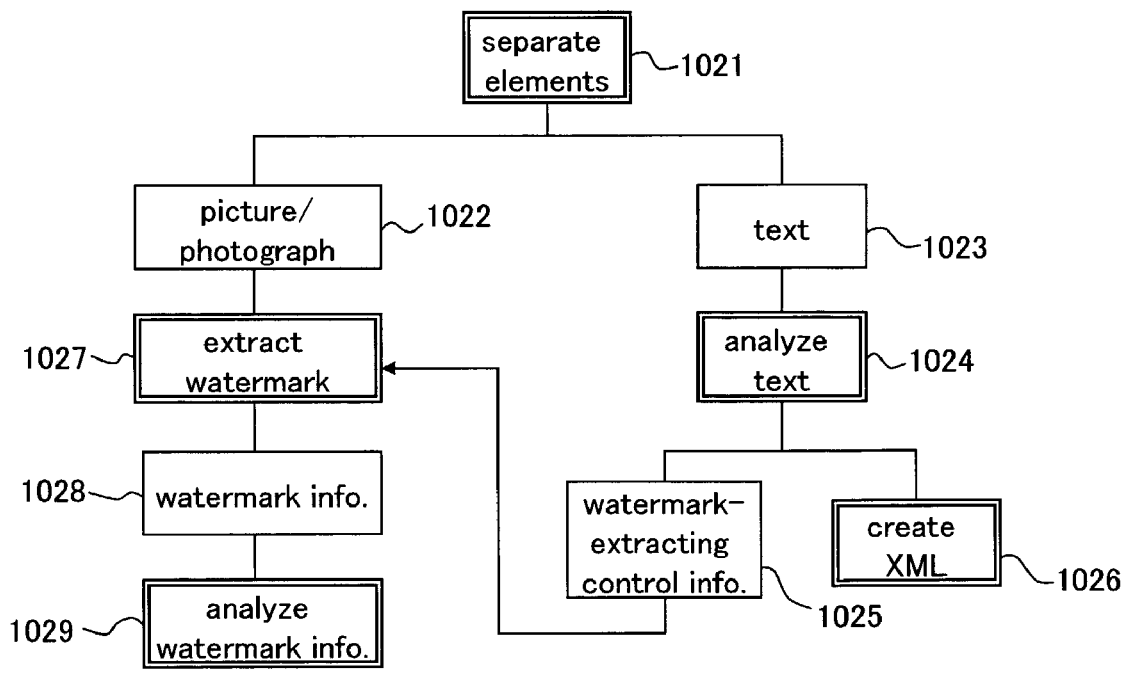
FIG. 75 is a functional block diagram of an image analyzing section.

The image analyzing section 1002 retrieves information elements from the digitized data acquired by the image input section 1001 and extract the access control information, and it executes, for example, an analysis process for each of the digitized data according to the procedure shown in FIG. 75.

First, by an element-separating function section 1021, an element-separating process is executed in which the acquired digitized data are separated into image data 1022 such as pictures or photographs and text data 1023 containing control information for extracting an watermark.

The separated text data 1023 are analyzed by a text-analyzing function section 1024 and control information 1025 is extracted for extracting a watermark therefrom. The text data 1023 is made into an XML document by an XML document-creating function section 1026 in order to create a structured document.

A watermark-extracting function section 1027 extracts watermark information 1028 from the image data 1022 using the watermark-extracting control information 1025 that has been extracted from the text data 1023.

The watermark information 1028 extracted from the image data 1022 is analyzed by a watermark information-analyzing function section 1029. The watermark information 1028 contains access control information such as data access restriction, address information of linked web sites, and others.

Figure 76:
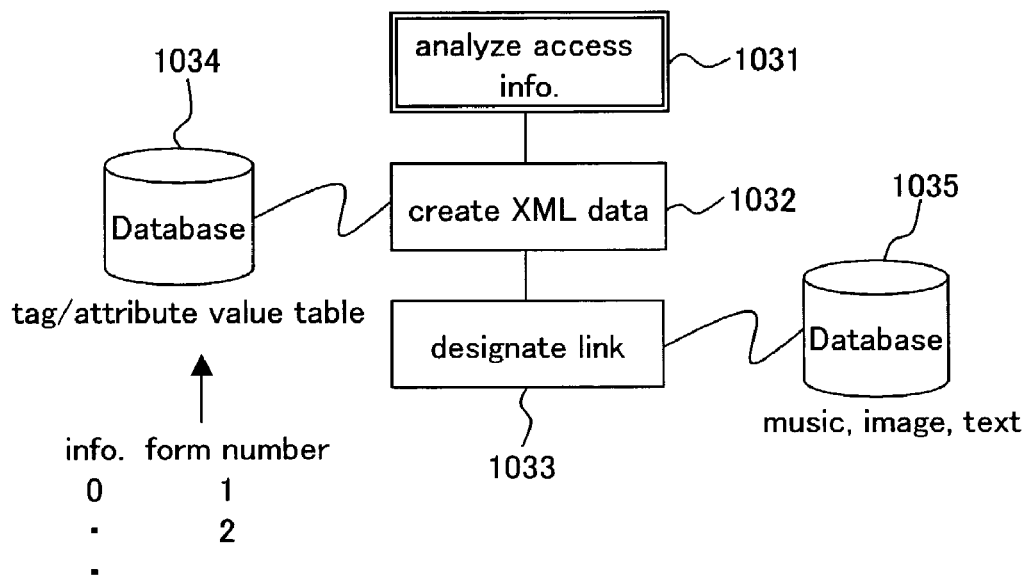
FIG. 76 is a functional block diagram of an information management section.

Based on the access control information in the watermark information 1028, the information management section 1003 acquires document data made of digitized data such as text data, image data, music data, and other digitized data that correspond to the access control information. For example, the information management section 1003 executes data processing according to the procedure shown in FIG. 76.

Based on the access control information extracted by the image analyzing section 1002, the access information analyzing function section 1031 acquires corresponding document data made of digitized data such as text data, image data, music data, and other digitized data.

For example, such a configuration is possible that, if the access control information contains data related to access restriction, user authentication is carried out and access restriction is imposed based on the result of the authentication.

If the access control information contains address information of a linked website, access to the website is executed to acquire document data of text data, image data, music data, and so forth contained therein.

An XML data-creating function section 1032 sets tags and attributes for the document data acquired by the access information analyzing function section 1031 and creates data of a structured document. For the document data acquired from websites, a tag and attribute value table is produced referring to the form numbers, and the table is stored in an attribute value database 1034.

In cases where the document data acquired from websites or the like further contain attached link information, a link-designating function section 1033 acquires the link information to incorporate it as the data of the structure document and stores these data in a link information database 1035.

Figure 77:
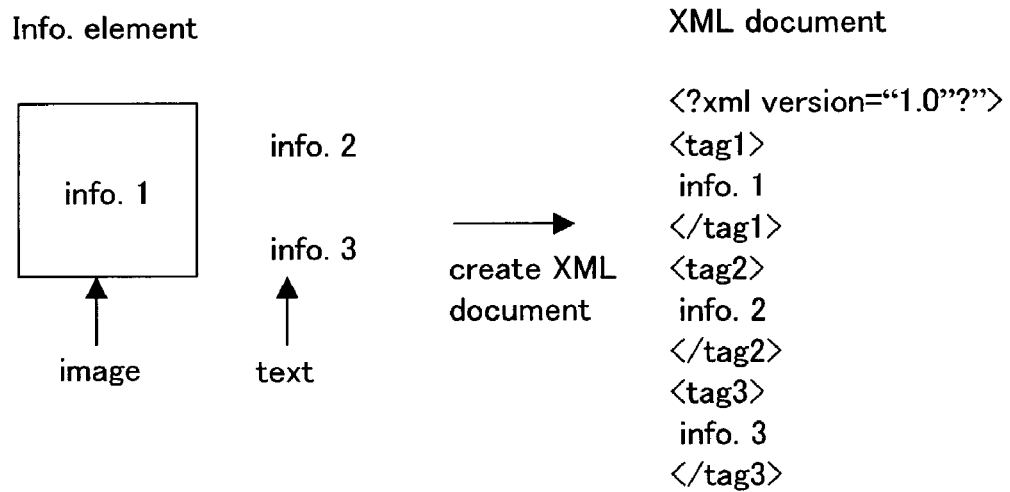
FIG. 77 illustrates an example of the construction of an XML document to be created.

The XML document-creating section 1004 creates an XML document based on the XML data created by the information management section 1003. For example, a structured document shown in the right hand portion of the figure is created when the XML data created by the information management section 1003 contain information elements of information 1 that is made of image data and information 2 and information 3 that are made of text data, as shown in FIG. 77.

Figure 78:
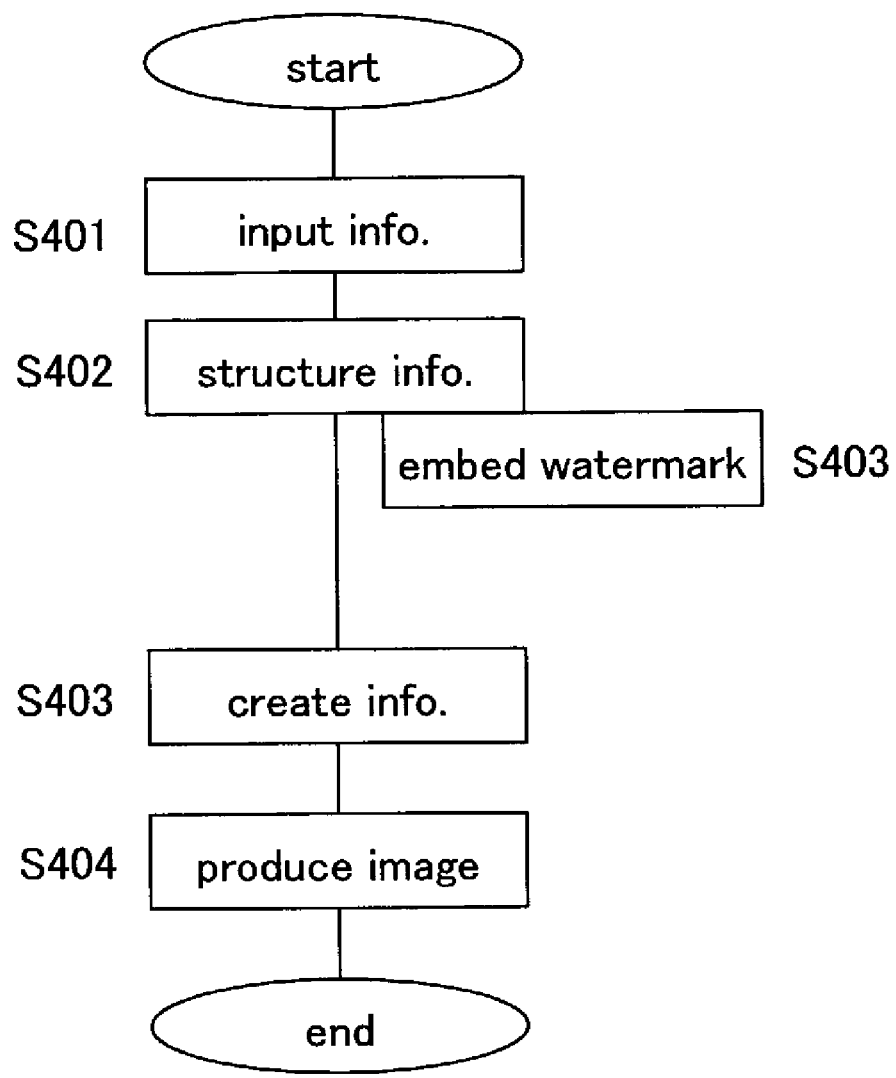
FIG. 78 is a flowchart depicting a process of creating such data as printed matter in which watermark data are embedded.

FIG. 78 shows the process flow for creating image data in which the access control information is embedded as an invisible watermark.

In step S401, data input is accepted for such data as text data and image data that is the source of the image data to be output.

In step S402, a structuring process is executed for each data that has been accepted in step S401. In this step, arrangement and configuration of the data are determined, and the structure of image data to be output is determined. At this time, in step S403, access control information is created and a process is executed for embedding it as an invisible watermark into the image data.

In step S404, watermark-extracting control information is created for extracting the access control information that is embedded as an invisible watermark into the image data. Here, location information that indicates the location of the embedded watermark information in image data, information about the type of the watermark, information about the version of the watermark, and the like are created to serve as the watermark-extracting control information.

In step S405, image data are integrated based on the structured data and the created watermark-extracting control information, and final image data are output.

Figure 79:
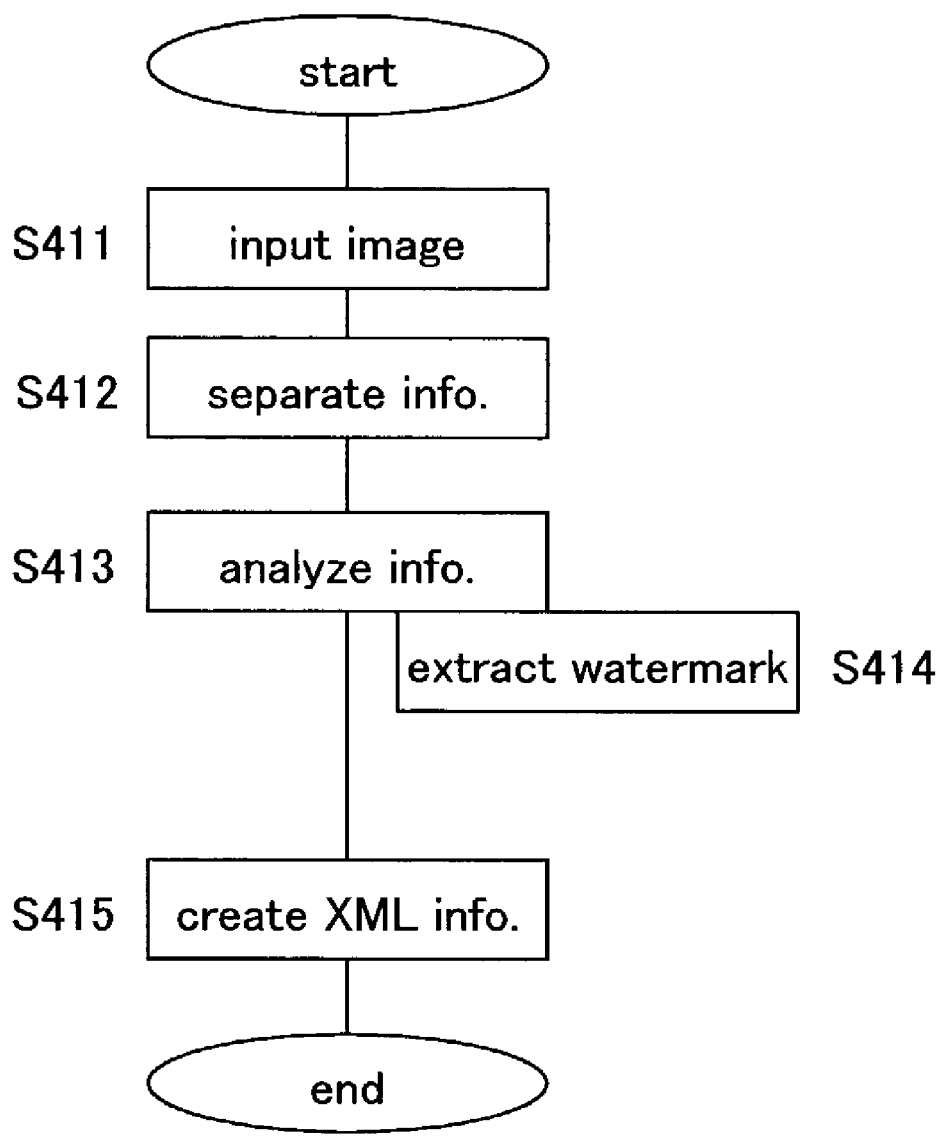
FIG. 79 is a flowchart depicting a process of creating an XML document from a printed matter in which watermark data are embedded.

The image data thus created are distributed as a printed matter by, for example, printing the data on paper with a printer. The image data on the distributed printed matter can be captured as digitized data with a digital camera, an image scanner, or the like, and thus various data corresponding to the access control information can be accessed. FIG. 79 shows the process flow of the document management apparatus when data are accessed.

In step S411, image data are acquired by the image input section 1001. As described above, it is possible to capture the image data distributed as a printed matter are as digitized data with the user of a digital camera, an image scanner, or the like and acquire these digitized data by the image input section 1001.

In step S412, the data are separated into the image data 1022 and the text data 1023 by the element-separating function section 1021 of the image analyzing section 1002.

In step S413, an analyzing process is executed for the separated image data 1022 and text data 1023. Here, the text data 1023 is analyzed by the text analyzing function section 1024, and the watermark-extracting control information is extracted.

In step S414, based on the extracted watermark-extracting control information, an invisible watermark embedded in the image data is extracted and the access control information is acquired.

In step S415, various data corresponding to the access control information are acquired, and based on the acquired data an XML structured document is created.

Although the above-described embodiments employ the XML document as an example of the structured document, it is also possible to employ various other types of structured documents such as HTML and the like.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A method of distributing a structured document in which identifiers are respectively set for a plurality of information items in document data made of digitized data including text data, image data, music data, and/or other digitized data, and information content of each information item is enclosed in each respective identifier, the method comprising:

creating access control information necessary to access the document data and separating the access control information into a first access control information and a second access control information, the first access control information is any one of encrypted data, authentication information, encryption key information, a control program, or distribution channel information;

specifying given data as administrative information-enclosing data and embedding the first access control information into the administrative information-enclosing data;

setting an administrative identifier for making the administrative information-enclosing data in which the first access control information is embedded be an information item in the document data; and enclosing, in the administrative identifier, information content of the administrative information-enclosing data in which the first access control information is embedded, and the second access control information for extracting the first access control information from the administrative information-enclosing data to create the access control information for accessing the document data together with the first access control information, wherein the second access control information comprises at least one of range-specifying information specifying the range of unauthorized alteration prevention in the document data, data type-indicating information indicating the type of the digitized data in which watermark data have been embedded, control type-indicating information indicating the type of information of the first access control information, access policy information for digitized data contained in the document data, watermark control information used when converting the first access control information into watermark data, and a data name of the first access control information.

2. The method of distributing a document as set forth in claim 1, wherein the administrative information-enclosing data comprises digitized data including image data or music data, and the first access control information is embedded as visually or auditorily unrecognizable watermark data into the administrative information-enclosing data.

3. The method of distributing a document as set forth in claim 1, wherein the administrative information-enclosing data comprises digitized data including image data or music data, and the first access control information is embedded as visually or auditorily recognizable watermark data into the administrative information enclosing data.

4. The method of distributing a document as set forth in claim 1, wherein the administrative information-enclosing data has a first data portion and a second data portion, each portion comprising digitized data such as image data or music data; and encrypted access control information in which the first access control information has been encrypted is created and enclosed in the second data portion, and an encryption key information used to create the encrypted access control information is embedded as visually or auditorily unrecognizable watermark data into the first data portion.

5. The method of distributing a document as set forth in claim 1, wherein the first access control information includes at least one of image data, music data, encryption/authentication/signature-related data, and a control program, and has a file format of image data or music data.

6. The method of distributing a document as set forth in claim 1, further comprising a step of creating duplicate information by duplicating the information content enclosed in the administrative identifier and embedding the duplicate information as an electronic watermark into the administrative information-enclosing data.

7. The method of distributing a document as set forth in claim 1, wherein digitized data contained in a predetermined range of the digitized data in the document data are extracted as secret information, digitized data in which the secret information is replaced with other information for display are assigned as the administrative information-enclosing data, and the secret information is enclosed in the administrative information-enclosing data.

8. The method of distributing a document as set forth in claim 7, wherein the secret information is embedded as visually or auditorily unrecognizable watermark data into the administrative information-enclosing data.

9. The method of distributing a document as set forth in claim 7, wherein the secret information is encrypted and is then enclosed in the administrative information-enclosing data.

10. The method of distributing a document as set forth in claim 1, wherein a signature value is computed of digitized data within a predetermined range of the digitized data in the document data, and the signature value is enclosed in the administrative information-enclosing data.

* * * * *